(12) United States Patent
Mohassel et al.

(10) Patent No.: US 11,562,230 B2
(45) Date of Patent: Jan. 24, 2023

(54) PRIVACY-PRESERVING MACHINE LEARNING

(71) Applicant: Visa International Service Association, San Francisco, CA (US)

(72) Inventors: Payman Mohassel, San Jose, CA (US); Yupeng Zhang, College Park, MD (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 627 days.

(21) Appl. No.: 16/489,667

(22) PCT Filed: Mar. 22, 2017

(86) PCT No.: PCT/US2017/023652
§ 371 (c)(1),
(2) Date: Aug. 29, 2019

(87) PCT Pub. No.: WO2018/174873
PCT Pub. Date: Sep. 27, 2018

(65) Prior Publication Data
US 2020/0242466 A1    Jul. 30, 2020

(51) Int. Cl.
*G06N 3/08* (2006.01)
*G06F 21/62* (2013.01)
(Continued)

(52) U.S. Cl.
CPC .......... *G06N 3/08* (2013.01); *G06F 21/6245* (2013.01); *H04L 9/008* (2013.01); *H04L 9/085* (2013.01)

(58) Field of Classification Search
CPC ........ G06N 3/08; G06N 3/084; G06N 3/0454; G06N 3/0481; G06F 21/6245;
(Continued)

(56) References Cited

U.S. PATENT DOCUMENTS 7,689,520 B2 *  3/2010  Burges ................. G06F 16/951
                                                706/12
2014/0279742 A1   9/2014  Forman
(Continued)

FOREIGN PATENT DOCUMENTS

WO    2015103514    7/2015
WO    2016061628    4/2016

OTHER PUBLICATIONS

EP17901848.6, "Extended European Search Report", dated Mar. 18, 2020, 6 pages.
(Continued)

*Primary Examiner* — Jean B Jeanglaude
(74) *Attorney, Agent, or Firm* — Kilpatrick Townsend & Stockton LLP

(57) ABSTRACT

New and efficient protocols are provided for privacy-preserving machine learning training (e.g., for linear regression, logistic regression and neural network using the stochastic gradient descent method). A protocols can use the two-server model, where data owners distribute their private data among two non-colluding servers, which train various models on the joint data using secure two-party computation (2PC). New techniques support secure arithmetic operations on shared decimal numbers, and propose MPC-friendly alternatives to non-linear functions, such as sigmoid and softmax.

20 Claims, 16 Drawing Sheets

(51) Int. Cl.
*H04L 9/00* (2022.01)
*H04L 9/08* (2006.01)

(58) Field of Classification Search
CPC ..... G06F 21/6254; G06F 21/62; H04L 9/008; H04L 9/085; H04L 2209/46
See application file for complete search history.

(56) References Cited

U.S. PATENT DOCUMENTS

| | | |
|---|---|---|
| 2015/0254573 A1* | 9/2015 | Abu-Mostafa ......... G06N 5/003 706/12 |
| 2015/0381349 A1 | 12/2015 | Nikolaenko et al. |
| 2016/0283738 A1 | 9/2016 | Wang et al. |
| 2016/0379140 A1 | 12/2016 | Abu-Mostafa et al. |

OTHER PUBLICATIONS

Lazarevic et al., "Boosting Algorithms for Parallel and Distributed Learning", Distributed and Parallel Databases, vol. 11, No. 2, Mar. 2002, pp. 203-229.

PCT/US2017/023652, "International Search Report and Written Opinion", dated Dec. 21, 2017, 14 pages.

Application No. EP17901848.6, Notice of Decision to Grant, dated Feb. 17, 2022, 2 pages.

Application No. EP21196838.3, Extended European Search Report, dated Dec. 10, 2021, 6 pages.

\* cited by examiner

Protocol SGD_Linear($\langle \mathbf{X} \rangle, \langle \mathbf{Y} \rangle, \langle \mathbf{U} \rangle, \langle \mathbf{V} \rangle, \langle \mathbf{Z} \rangle, \langle \mathbf{V}' \rangle, \langle \mathbf{Z}' \rangle$):

1: $\mathcal{S}_i$ computes $\langle \mathbf{E} \rangle_i = \langle \mathbf{X} \rangle_i - \langle \mathbf{U} \rangle_i$ for $i \in \{0,1\}$. Then parties run $\text{Rec}(\langle \mathbf{E} \rangle_0, \langle \mathbf{E} \rangle_1)$ to obtain $\mathbf{E}$.
2: for $j = 1, \ldots, t$ do
3:     Parties select the mini-batch $\langle \mathbf{X}_{B_j} \rangle, \langle \mathbf{Y}_{B_j} \rangle$.
4:     $\mathcal{S}_i$ computes $\langle \mathbf{F}_j \rangle_i = \langle \mathbf{w} \rangle_i - \langle \mathbf{V}[j] \rangle$ for $i \in \{0,1\}$. Then parties run $\text{Rec}(\langle \mathbf{F}_j \rangle_0, \langle \mathbf{F}_j \rangle_1)$ to recover $\mathbf{F}_j$.
5:     $\mathcal{S}_i$ computes $\langle \mathbf{Y}^*_{B_j} \rangle_i = i \cdot \mathbf{E}_{B_j} \times \mathbf{F}_i + \langle \mathbf{X}_{B_j} \rangle_i \times \mathbf{F}_i + \mathbf{E}_{B_j} \times \langle \mathbf{w} \rangle_i + \langle \mathbf{Z}_j \rangle_i$ for $i \in \{0,1\}$.
6:     $\mathcal{S}_i$ compute the difference $\langle \mathbf{D}_{B_j} \rangle_i = \langle \mathbf{Y}^*_{B_j} \rangle_i - \langle \mathbf{Y}_{B_j} \rangle_i$ for $i \in \{0,1\}$.
7:     $\mathcal{S}_i$ computes $\langle \mathbf{F}'_j \rangle_i = \langle \mathbf{D}_{B_j} \rangle_i - \langle \mathbf{V}'_j \rangle_i$ for $i \in \{0,1\}$. Parties then run $\text{Rec}(\langle \mathbf{F}'_j \rangle_0, \langle \mathbf{F}'_j \rangle_1)$ to obtain $\mathbf{F}'_j$.
8:     $\mathcal{S}_i$ computes $\langle \mathbf{\Delta} \rangle_i = i \cdot \mathbf{E}^T_{B_j} \times \mathbf{F}'_j + \langle \mathbf{X}^T_{B_j} \rangle_i \times \mathbf{F}'_j + \mathbf{E}^T_{B_j} \times \langle \mathbf{D}_{B_j} \rangle_i + \langle \mathbf{Z}'_j \rangle_i$ for $i \in \{0,1\}$.
9:     $\mathcal{S}_i$ truncates its shares of $\mathbf{\Delta}$ element-wise to get $\lfloor \langle \mathbf{\Delta} \rangle_i \rfloor$.
10:     $\mathcal{S}_i$ computes $\langle \mathbf{w} \rangle_i := \langle \mathbf{w} \rangle_i - \frac{\alpha}{|B|} \lfloor \langle \mathbf{\Delta} \rangle_i \rfloor$ for $i \in \{0,1\}$.
11: Parties run $\text{Rec}^A(\langle \mathbf{w} \rangle_0, \langle \mathbf{w} \rangle_1)$ and output $\mathbf{w}$.

*FIG. 5*

Protocol LHE_MT($\langle\mathbf{A}\rangle_0; \langle\mathbf{B}\rangle_1$):

(Let $a_{ij}$ be the $(i,j)$th element in $\langle\mathbf{A}\rangle_0$ and $b_j$ be the $j$th element in $\langle\mathbf{B}\rangle_1$.)

1: $\mathcal{S}_1 \to \mathcal{S}_0$: $\text{Enc}(b_j)$ for $i = 1,\ldots,d$.
2: $\mathcal{S}_0 \to \mathcal{S}_1$: $c_i = \Pi_{j=0}^{d} \text{Enc}(b_j)^{a_{ij}} \cdot \text{Enc}(r_i)$, for $i = 1,\ldots,|B|$.
3: $\mathcal{S}_0$ sets $\langle\langle\mathbf{A}\rangle_0 \times \langle\mathbf{B}\rangle_1\rangle_0 = \mathbf{r}$, where $\mathbf{r} = (-r_1,\ldots,-r_{|B|})^T \mod 2^l$.
4: $\mathcal{S}_1$ sets $\langle\langle\mathbf{A}\rangle_0 \times \langle\mathbf{B}\rangle_1\rangle_1 = (\text{Dec}(c_1),\ldots,\text{Dec}(c_{|B|}))^T$.

*FIG. 6*

Protocol SGD_Logistic($\langle X \rangle, \langle Y \rangle, \langle U \rangle, \langle V \rangle, \langle Z \rangle, \langle V' \rangle, \langle Z' \rangle$):

1: Do step 1–5 as in Figure 4. Both parties obtain the shares $\langle U_{B_i} \rangle = \langle X_{B_i} \times w \rangle$ (it was defined as $\langle Y^*_{B_i} \rangle$ in Figure 4).
2: for every element $\langle u \rangle$ in $\langle U_{B_i} \rangle$ do
3: $(\langle b_3 \rangle^B, \langle b_4 \rangle^B) \leftarrow$ Y2B(GarbledCircuit($\langle u \rangle_0 + \frac{1}{2}, \langle u \rangle_0 - \frac{1}{2}; \langle u \rangle_1, f$)), where $f$ sets $b_1$ as the most significant bit of $(\langle u \rangle_0 + \frac{1}{2}) + \langle u \rangle_1$ and $b_2$ as the most significant bit of $(\langle u \rangle_0 - \frac{1}{2}) + \langle u \rangle_1$. It then outputs $b_3 = \neg b_1$ and $b_4 = b_1 \wedge (\neg b_2)$.
4: $S_0$ sets $m_0 = \langle b_4 \rangle_0^B \cdot \langle u \rangle_0 + r_1$ and $m_1 = (1 - \langle b_4 \rangle_0^B) \cdot \langle u \rangle_0 + r_1$. $S_0$ and $S_1$ run $(\bot; m_{\langle b_4 \rangle_1^B}) \leftarrow$ OT($m_0, m_1; \langle b_4 \rangle_1^B$). $m_{\langle b_4 \rangle_1^B}$ is equal to $(\langle b_4 \rangle_0^B \oplus \langle b_4 \rangle_1^B) \cdot \langle u \rangle_0 + r_1 = b_4 \cdot \langle u \rangle_0 + r_1$.
5: $P_1$ sets $m_0 = \langle b_4 \rangle_1^B \cdot \langle u \rangle_1 + r_2$ and $m_1 = (1 - \langle b_4 \rangle_1^B) \cdot \langle u \rangle_1 + r_2$. $S_1$ and $S_0$ run $(\bot; m_{\langle b_4 \rangle_0^B}) \leftarrow$ OT($m_0, m_1; \langle b_4 \rangle_0^B$). $m_{\langle b_4 \rangle_0^B}$ is equal to $b_4 \cdot \langle u \rangle_1 + r_2$.
6: $S_0$ sets $m_0 = \langle b_3 \rangle_0^B + r_3$ and $m_1 = (1 - \langle b_3 \rangle_0^B) + r_3$. $S_0$ and $S_1$ run $(\bot; m_{\langle b_3 \rangle_1^B}) \leftarrow$ OT($m_0, m_1; \langle b_3 \rangle_1^B$). $m_{\langle b_3 \rangle_1^B}$ is equivalent to $b_3 + r_3$.
7: $S_0$ sets $\langle y^* \rangle_0 = m_{\langle b_4 \rangle_0^B} - r_1 - r_3$ and $S_1$ sets $\langle y^* \rangle_1 = m_{\langle b_4 \rangle_1^B} + m_{\langle b_3 \rangle_1^B} - r_2$.
8: end for
9: Both parties set $\langle Y^* \rangle_i$ as a vector of all $\langle y^* \rangle_i$s computed above and continue to step 6–12 in Figure 4.

*FIG. 8*

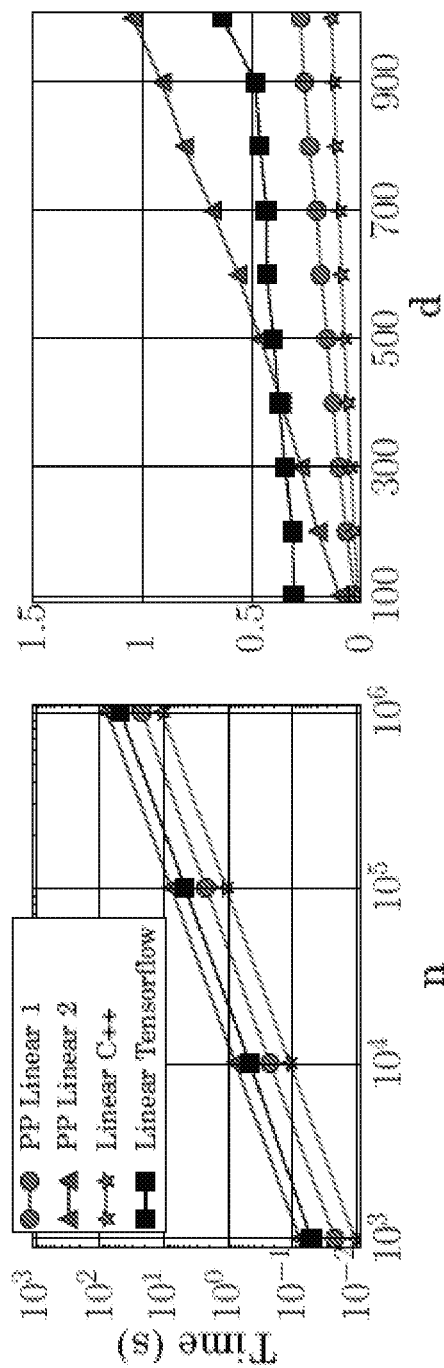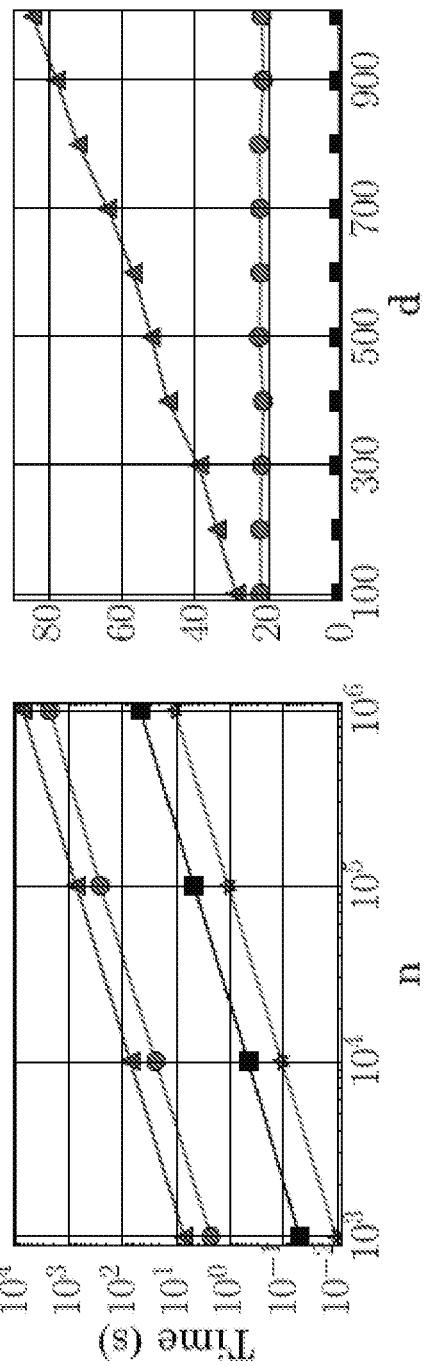
FIG. 11A  FIG. 11B  FIG. 11C  FIG. 11D

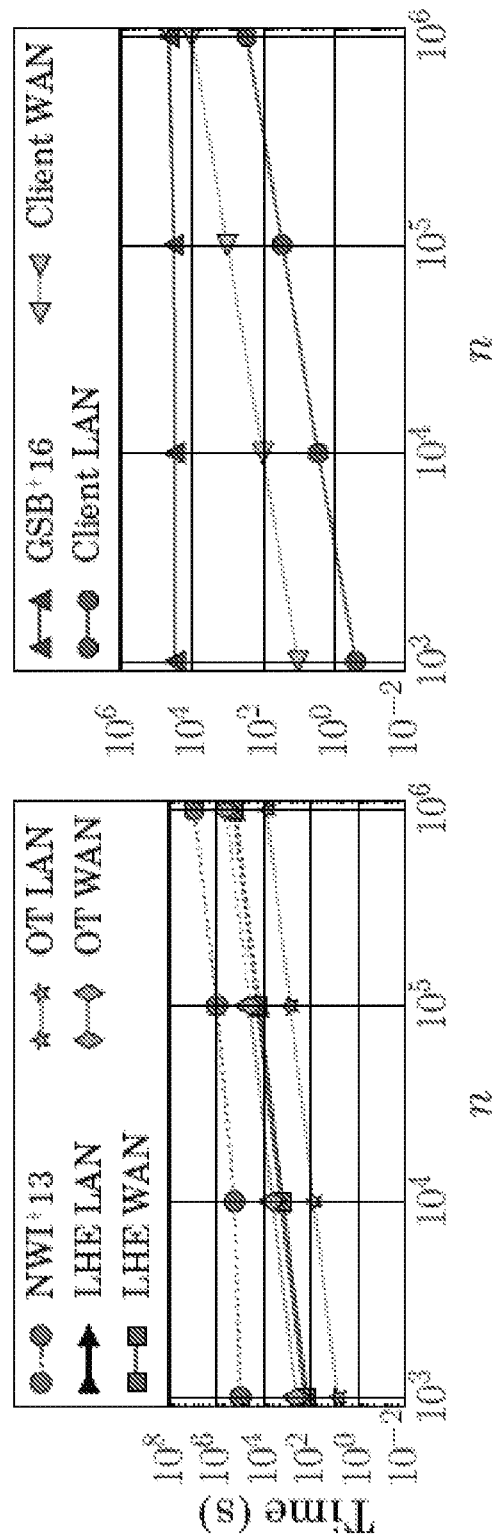

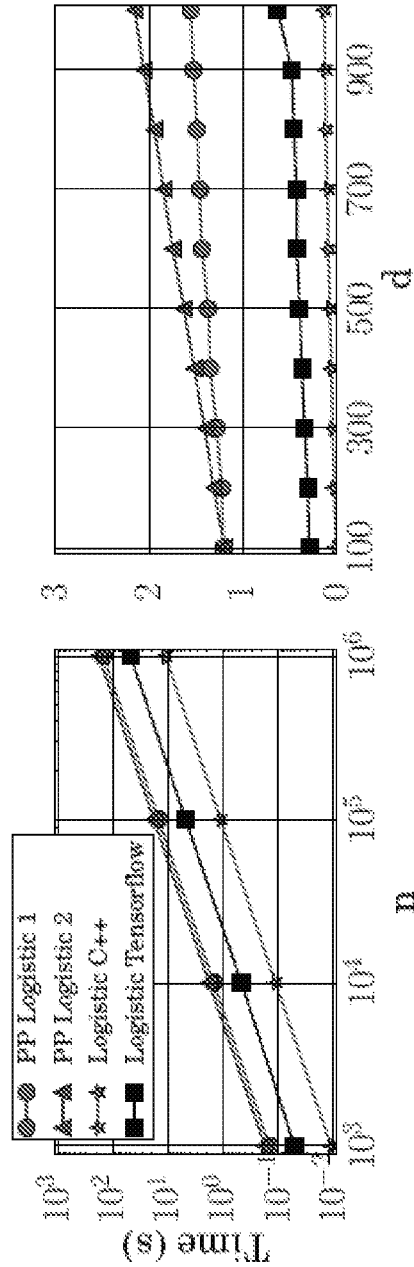
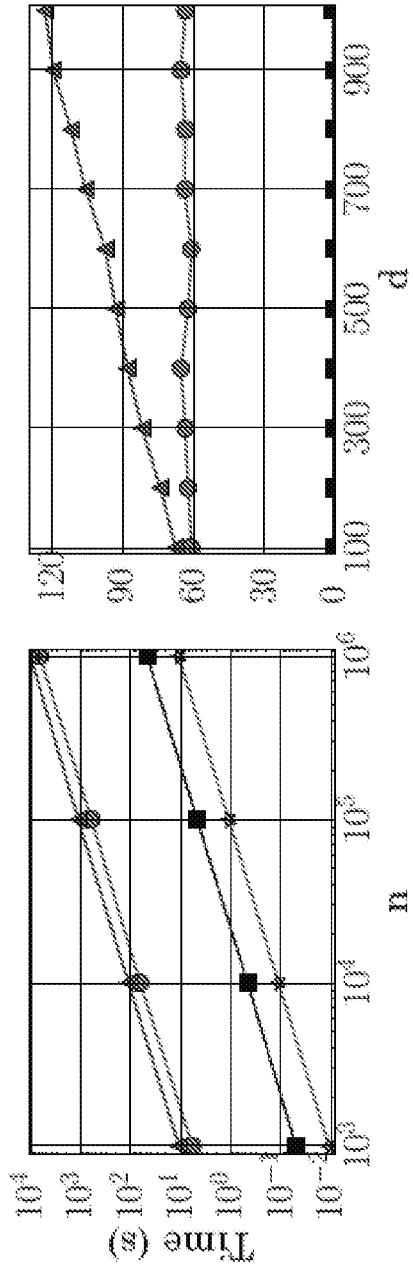
FIG. 14A
FIG. 14B
FIG. 14C
FIG. 14D

PRIVACY-PRESERVING MACHINE LEARNING

This patent application is a 35 U.S.C. 371 patent application which claims priority to PCT Application No. PCT/US2017/023652, with an international filing date of Mar. 22, 2017, which is herein incorporated by reference in its entirety for all purposes.

BACKGROUND

Machine learning techniques are widely used in practice to produce predictive models for use in medicine, banking, recommendation services, threat analysis, and authentication technologies. Large amounts of data collected over time have enabled new solutions to old problems, and advances in deep learning have led to breakthroughs in speech, image, and text recognition.

Large internet companies collect users' online activities to train recommender systems that predict their future interest. Health data from different hospitals and government organizations can be used to produce new diagnostic models, while financial companies and payment networks can combine transaction history, merchant data, and account holder information to train more accurate fraud-detection engines. FIG. 1 shows a high-level diagram depicting a process 100 for training and using a machine learning model. Process 100 starts with training data, shown as existing records 110. The training data can comprise various data samples, where each data sample includes input data and known output data. For an example data sample, the input data can be the pixel values of an image, and the output data can be a classification of what is in the image (e.g., that the image is of a dog).

After training data is obtained, a learning process can be used to train the model. Learning module 120 is shown receiving existing records 110 and providing model 130 after training has been performed. As data samples include outputs known to correspond to specific inputs, a model can learn the type of inputs that correspond to which outputs, e.g., which images are of dogs. Once model 130 has been trained, it can be used to predict the output for a new request 140 that includes new inputs. For instance, model 130 can determine whether a new image is of a dog. Model 130 is shown providing a predicted output 150 based on new request 140. Examples of predictive output 150 include a classification of a threat, a classification of authentication, or a recommendation. In this manner, the wealth of the training data can be used to create artificial intelligence that can be advantageously used for particular problem.

Machine learning is widely used in practice to produce predictive models for applications such as image processing, speech, and text recognition. These models are more accurate when trained on a large amount of data collected from different sources. The use of different sources can provide a greater variance in the types of training samples, thereby making the model more robust when encountering new inputs (e.g., new images, text, vocal intonations in speech, etc.). However, the massive data collection raises privacy concerns.

While recent technological advances enable more efficient storage, processing, and computation on big data, combining data from different sources remains an important challenge. Competitive advantage, privacy concerns and regulations, and issues surrounding data sovereignty and jurisdiction prevent many organizations from openly sharing their data.

Privacy-preserving machine learning via secure multi-party computation (MPC) provides a promising solution by allowing different entities to train various models on their joint data without revealing any information beyond the outcome.

Earlier work on privacy preserving machine learning has focused on decision trees [31], k-means clustering [14, 28], SVM classification [44, 48], linear regression [19, 20, 40], and logistic regression [42]. These papers propose solutions based on secure multiparty computation, but appear to incur high efficiency overheads and lack implementations and evaluations.

Nikolaenko et. al. [37] present a privacy preserving linear regression protocol on horizontally partitioned data using a combination of linearly homomorphic encryption (LHE) and garbled circuits, and evaluate it on datasets with millions of samples. Gascon et. al. [21] extend the results to vertically partitioned data and show improved performance. However, both papers reduce the problem to solving a linear system using Yao's garbled circuit protocol, which introduces a high overhead on the training time and cannot be generalized to non-linear models. Recently, Gilad-Bachrach et. al. [23] propose a framework for secure data exchange, and support privacy preserving linear regression as an application. However, only small datasets are tested and the protocol is implemented purely using garbled circuit, which does not scale for training on larger datasets.

Privacy preserving logistic regression is considered by Wu et. al. [46]. They propose to approximate the logistic function using polynomials, and train the model using LHE. However, the complexity is exponential in the degree of the approximation polynomial, and as shown in experiments described below, the accuracy of the model is degraded compared to using the logistic function. Aono et. al. [10] consider a different security model where an untrusted server collects and combines the encrypted data from multiple clients, and transfers the data to a trusted client to train the model on the plaintext. By carefully approximating the cost function of logistic regression with a degree 2 polynomial, the optimal model can be calculated by solving a linear system. However, in this setting, the plaintext of the aggregated data is leaked to the client who trains the model. We are not aware of any prior work with a practical system for privacy preserving logistic regression in the two-server model.

Privacy preserving machine learning with neural networks is more challenging. Shokri and Shmatikov [41] propose a solution where instead of sharing the data, the two servers share the changes on a portion of the coefficients during the training. Although the system is very efficient (no cryptographic operation is needed), the leakage of these coefficient changes is not well-understood and no formal security guarantees are obtained. In addition, each server should be able to perform the training individually in order to obtain the coefficient changes, which implies each server holds a big portion of a horizontally partitioned data in plaintext. Privacy preserving predictions using neural networks were also studied recently by Gilad-Bachrach et. al. [22]. Using fully homomorphic encryption, the neural network model can make predictions on encrypted data. In this case, it is assumed that the neural network is trained on plaintext data and the model is known to one party who evaluates it on private data of another.

An orthogonal line of work considers the differential privacy of machine learning algorithms [9,16,43]. In this setting, the server has full access to the data in plaintext, but wants to guarantee that the released model cannot be used to infer the data used during the training. A common technique used in differentially private machine learning is to introduce an additive noise to the data or the update function (e.g., [9]). The parameters of the noise are usually predetermined by the dimensions of the data, the parameters of the machine learning algorithm and the security requirement, and hence are data-independent. But, the server still has full access to the data in plaintext.

Accordingly, it is desirable to provide new techniques to more efficiently train a machine learning model while preserving data privacy of various data sources.

BRIEF SUMMARY

Embodiments of the present invention provide methods, apparatuses, and systems for implementing privacy-preserving machine learning. The private data from multiple sources can be secret shared among two or more training computers. Different parts of a single data item of the private data can be stored on different training computer such that the data item is not known to any one of the training computers. As part of the training, the secret-shared parts can be multiplied by weights and functions applied to them in a privacy-preserving manner. Using embodiments, the weights of the model can be efficiently determined in the training, e.g., by performing iterative updates of the weights based on error differences in a current predicted output and the known outputs of the data samples. In various implementations, the error differences can be used to calculate a delta value for updating the weights, where the delta value can correspond to a gradient or a combination of gradients, e.g., as determined using a conjugate or quasi-Newton method.

According to an embodiment, the private input data can be represented as integers (e.g., by shifting bits of floating-point numbers), and the training can involve multiplying these integers (and other intermediate values) and integer-represented weights. The multiplying can involve using random multiplication triplets that are secret shared among the training computers, thereby allowing multiplications at a training computer to operate on the secret-shared parts while sharing random intermediate values. A secret-shared result (e.g., the delta value for updating the weights) can be truncated by truncating the secret-shared parts at the training computers, thereby allowing efficient computation and limiting the amount of memory for storing the integer values.

According to another embodiment, a garbled circuit can be used for implementing an activation function for models (e.g., logistic regression or a neural network) that use activation functions for operating on a input product (e.g., inner product) of an input vector and a set of weights. The activation function may be implemented in determining a predicted output that is to be compared to a known output of a data sample. The activation function can be a piece-wise function that is: a first constant when the input product is less than a first cutoff, a second constant when the input product is greater than a second cutoff, and a monotonically changing function between the first constant and the second constant when the input product is between the first cutoff and the second cutoff.

These and other embodiments of the invention are described in detail below. For example, other embodiments are directed to systems, devices, and computer readable media associated with methods described herein.

A better understanding of the nature and advantages of embodiments of the present invention may be gained with reference to the following detailed description and the accompanying drawings.

BRIEF DESCRIPTION OF THE DRAWINGS

FIG. 5 shows an online phase of privacy-preserving linear regression according to embodiments of the present invention.

FIG. 6 shows an offline protocol based on linearly homomorphic encryption according to embodiments of the present invention.

FIG. 8 shows a privacy-preserving logistic regression protocol according to embodiments of the present invention.

FIGS. 11A-11D shows a comparison of privacy preserving linear regression and plaintext linear regression. |B| is set to 128. FIGS. 11A and 11B are for a LAN network, and FIGS. 11C and 11D are for WAN network. FIGS. 11A and 11C are in log-log scale and for d=784. FIGS. 11B and 11D are in regular scale and for n=10;000.

FIGS. 13A and 13B show an efficiency comparison of embodiments with prior techniques. FIGS. 13A and 13B are in log-log scale, d=500, |B|=128.

FIGS. 14A-14D show a comparison of privacy-preserving logistic regression and the plaintext logistic regression. |B| is set to 128. FIGS. 14A and 14B are for a LAN network, and FIGS. 14C and 14D are for WAN network. FIGS. 14A and 14C are in log-log scale, d 784. FIGS. 14B and 14D are in regular scale, n=10,000.

TERMS

Figure 1:
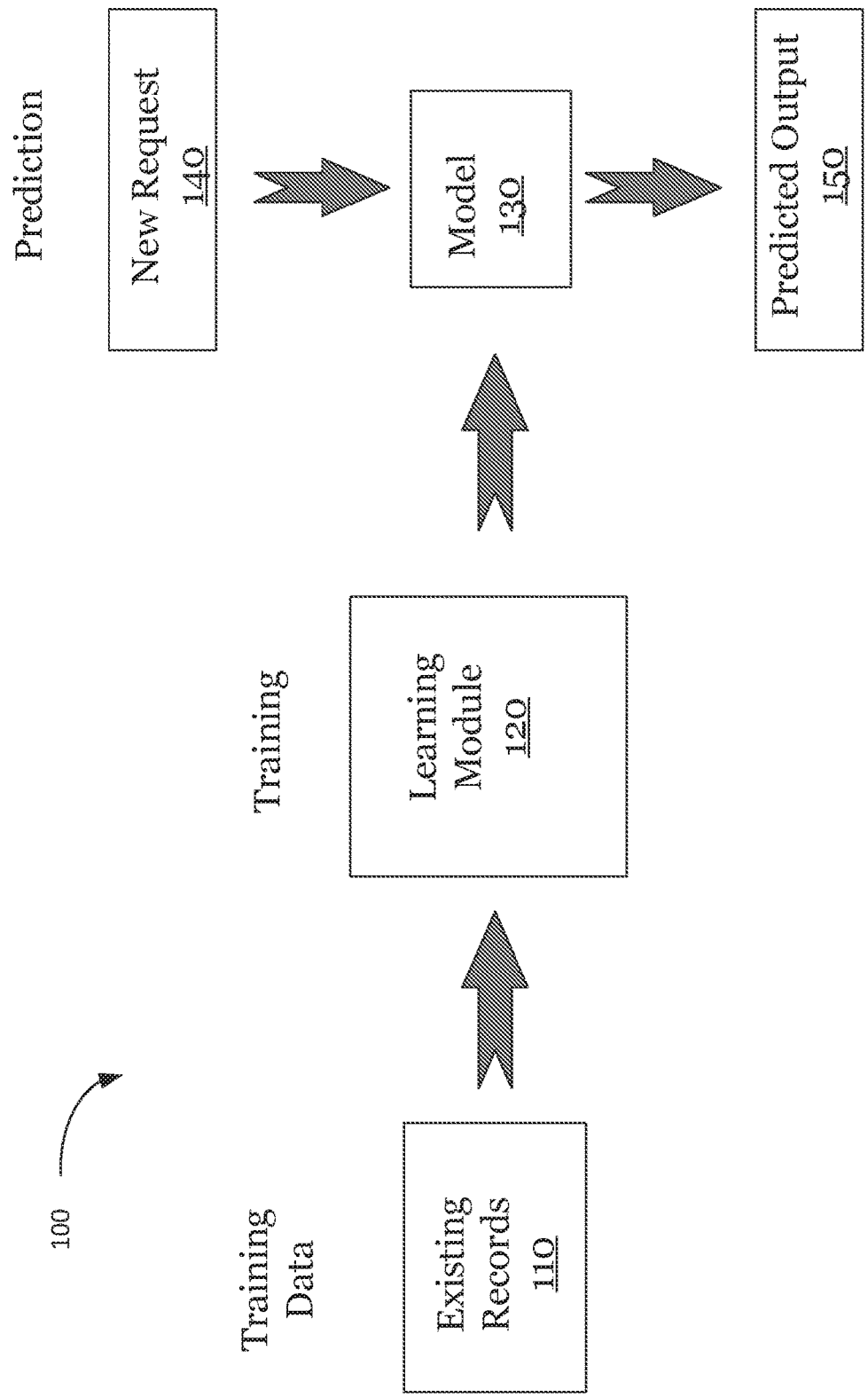
FIG. 1 shows a high-level diagram depicting a process for training and using a machine learning model.

Prior to discussing embodiments of the invention, description of some terms may be helpful in understanding embodiments of the invention.

The term "server computer" may include a powerful computer or cluster of computers. For example, the server computer can be a large mainframe, a minicomputer cluster, or a group of computers functioning as a unit. In one example, the server computer may be a database server coupled to a web server. The server computer may be coupled to a database and may include any hardware, software, other logic, or combination of the preceding for servicing the requests from one or more other computers. The term "computer system" may generally refer to a system including one or more server computers, which may be coupled to one or more databases.

A "machine learning model" can refer to a set of software routines and parameters that can predict an output(s) of a real-world process (e.g., a diagnosis or treatment of a patient, identification of an attacker of a computer network, authentication of a computer, a suitable recommendation based on a user search query, etc.) based on a set of input features. A structure of the software routines (e.g., number of subroutines and relation between them) and/or the values of the parameters can be determined in a training process, which can use actual results of the real-world process that is being modeled.

The term "training computer" can refer to any computer that is used in training the machine learning model. As examples, a training computer can be one of a set of client computers from which the input data is obtained, or a server computer that is separate from the client computers.

The term "secret sharing" can refer to any one of various techniques that can be used to store a data item on a set of training computers such that each training computer cannot determine the value of the data item on its own. As examples, the secret sharing can involve splitting a data item up into shares that require a sufficient number (e.g., all) of training computers to reconstruct and/or encryption mechanisms where decryption requires collusion among the training computers.

DETAILED DESCRIPTION

Privacy-preserving machine learning can be difficult to implement efficiently. The present disclosure provides techniques for efficient implementation that allows multiple client computers (e.g., from different companies, possibly competitors) to use their provide data in creating a machine learning model, without having to expose the private data. The private data from multiple sources can be secret shared among two or more training computers. For example, different parts of a single data item of the private data can be stored on different training computer such that the data item is not known to any one of the training computers.

The training of the model can use iterative techniques that optimize the predicted result based on a set of training data for which the result is known. As part of the training, the secret-shared parts can be multiplied by weights and functions applied to them in a privacy-preserving manner. Such multiplications and secret-sharing can be performed in various ways, e.g., using multiplication triplets and/or a garbled circuit. An offline phase can generate multiplication triplets, where the triplets can be generated in different ways (e.g., using oblivious transfer or linearly homomorphic encryption) depending on the communication speed of the network between the training computers To increase computational efficiency, the private input data can be represented as integers (e.g., by shifting bits of floating-point numbers). To avoid storage of the integers from escalating, a secret-shared result (e.g., the delta value for updating the weights) can be truncated by truncating the secret-shared parts at the training computers, thereby allowing efficient computation and limiting the amount of memory for storing the integer values.

For machine learning models that involve an activation function (e.g., logistic regression or neural networks), a garbled circuit can be used. The activation function may be implemented in determining a predicted output that is to be compared to a known output of a data sample. The activation function can be a piece-wise function that is: a first constant when the input product is less than a first cutoff, a second constant when the input product is greater than a second cutoff, and a monotonically changing function between the first constant and the second constant when the input product is between the first cutoff and the second cutoff.

Results show the increase in efficiency compared to other privacy-preserving techniques, and comparable results for training methods that do not preserve privacy. Implementations were made in C++, and show that it has efficiency comparable to existing software for machine learning on plaintext data (e.g. TensorFlow), when the two servers are hosted in the same local area network. Our experiments validate that our protocols are several orders of magnitude faster than the state of the art implementations for privacy preserving linear and logistic regressions, and scale to millions of data samples with thousands of features. We also implement a privacy-preserving system for training neural networks. In a more general variant of embodiments, even the model can remain private (secret shared).

I. SECURITY MODEL

Aspects of the disclosure focus on machine learning algorithms for training linear regression, logistic regression, and neural networks models. Examples adopt a two-server architecture, commonly used by previous work on privacy-preserving machine learning via multiparty computation (MPC) [21, 36, 37]. Two-party computation is referred to as 2PC.

In MPC, a given number of participating computers, $p_1$, $p_2$, ..., $p_N$, (also referred to as clients) each have private data, respectively $d_1$, $d_2$, ..., $d_N$. Participants want to compute the value of a public function on that private data: $F(d_1, d_2, ..., d_N)$ while keeping their own inputs secret. Embodiments can use various public functions (e.g., multiplication, inner product, activation functions, etc.) in the process of training a machine learning model. A goal of MPC is to design a protocol, where one can exchanges messages only with other participant (or with untrusted servers) to learn F without revealing the private data to any of the participating computers. Ideally, the only information that can be inferred about the private data is whatever could be inferred from seeing the output of the function alone.

A. Architecture

In embodiments, a set of clients $C_1, ..., C_m$ want to train various models on their joint data. No assumptions are made on how the data is distributed among the clients. In particular, the data can be horizontally or vertically partitioned, or be secret-shared among the clients, e.g., as part of a previous computation. Thus, a database table can be distributed among clients before any training of a machine learning model starts. For example, some client may have some rows of the database table while another client has other rows. This is called horizontal partitioning. Or, one client may have some columns while others may have other columns. This is referred to as vertical partitioning. Depending on the application scenario, both such initial states/partitioning may exist. Embodiments can have each client "secret shares" its part of the data between two servers, so the data is never partitioned in this way among the servers and remains fully private from them.

A natural solution is to perform a secure multiparty computation where each client plays the role of one party. While this approach satisfies the desired privacy properties, it has several drawbacks. First, it requires the clients to be involved throughout the protocol. Second, unlike the two-party case, techniques for more than two parties (and a dishonest majority) are significantly more expensive and not scalable to large input sizes or a large number of clients.

Hence, embodiments consider a server-aided setting where the clients outsource the computation to two untrusted but non-colluding servers $S_0$ and $S_1$ (also called training computers). Server-aided MPC has been formalized and used in various previous work (e.g. see [29]). It has also been utilized in prior work on privacy-preserving machine learning [31, 36, 37]. Two important advantages of this setting are that (i) clients can distribute (secret-share) their inputs among the two servers in a setup phase but not be involved in any future computation on the data, and (ii) efficient techniques can be used for Boolean computation (e.g., garbled circuits and OT-extension), and arithmetic computation (e.g., offline/online multiplicative triplet shares).

Depending on the scenario, previous work refers to the two servers as the evaluator and the cryptography service provider (CSP) [37], or the evaluator and a cloud service provider who maintains the data [24]. Although the examples show the servers as being different than the clients, the two servers can be representatives of the clients (e.g., a subset of the clients) or themselves be among the clients who possess data. Regardless of the specific role assigned to the servers, the trust model can be the same and assumes that the two servers are untrusted but do not collude.

Figure 2:
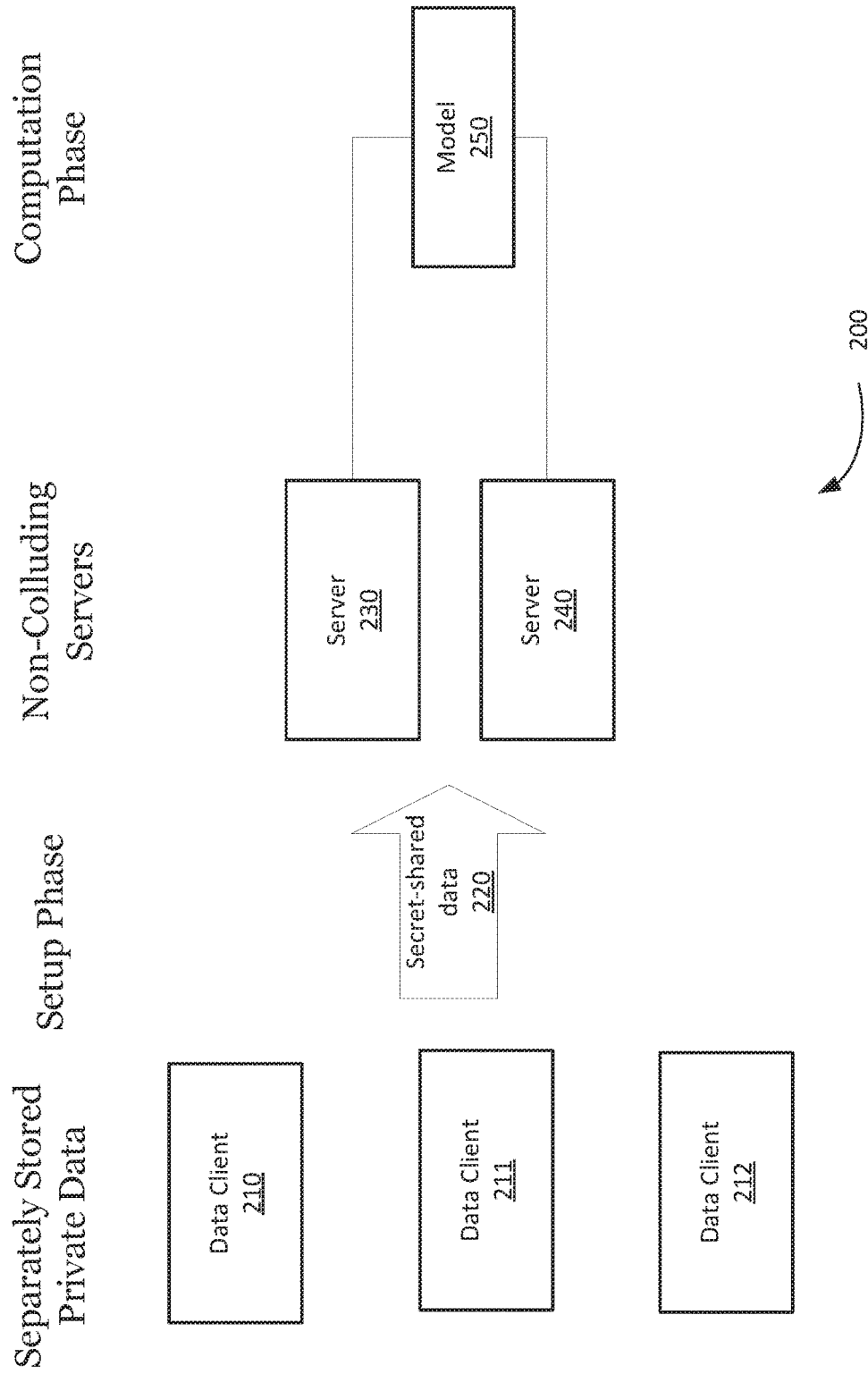
FIG. 2 shows a two-server architecture for use in training a machine learning model using secret shared data from data clients according to embodiments of the present invention.

FIG. 2 shows a two-server architecture 200 for use in training a machine learning model using secret shared data from data clients according to embodiments of the present invention. Although two servers are shown, more servers may be used. Further, one or more of the servers may be selected from the data clients.

Each of data clients 210-212 store private data that they do not wish to share with the other data clients. In a setup phase, data clients 210-212 secret-share their private data among servers 230 and 240. Examples of secret-sharing include additive sharing, Boolean sharing, and Yao sharing, and may involve encryption. Each client can generate shares of its own private data and then send each share to one of the servers. Thus, servers 230 and 240 can collectively store all of the private data, but individually servers 230 and 240 do not have access to the private data. The servers are non-colluding in that they cannot exchange messages to re-create the private data.

In a computation phase, servers 230 and 240 can train a model 250 on the clients' joint data without learning any information beyond the trained model. This competition phase can include multiplication of input the data by weights to obtain a predicted output. Further functions may be applied, such as addition and activation functions. These functions can be performed without the private data being reconstructed on any one of the servers. Various embodiments can use multiplication triplets, garbled circuits, and/or oblivious transfer as mechanisms for performing such functions in a privacy-preserving manner. Later sections describe techniques for efficiently computing such functions in a privacy-preserving manner.

B. Secret Sharing

As mentioned above, a data client can secret-share its private data among training computers (e.g., servers 230 and 240). The secret-sharing of a data item can create separate parts of the data item and allocate each part (share) to a different training computer. The data item can be reconstructed only when a sufficient number t of shares (e.g., all) are combined together. But, since the training computers are non-colluding, the secret parts (shares) are not shared among the training computers, thereby keeping the data item secret. Thus, if the machine learning used profile data of a user to predict actions by the user, each data item in the profile can be split among the two servers.

The sharing can be done in a secure manner. A non-secure example would be to give half the characters (e.g., numbers or letters) of a data item to one server and the other half to the other server. This system is not a "secure" secret sharing scheme, because a server with fewer than t secret-shares is able to reduce the problem of obtaining the secret without first needing to obtain all of the necessary shares.

In some implementations of secure secret-sharing, the sufficient number t of shares is equal to the number N of training computers. An example process is to encode the secret as an arbitrary length binary number s. Give to each server i (except one) a random number $p_i$ with the same length as s. Give to the last server the result of (s XOR $p_1$, XOR $p_2$ XOR . . . XOR $p_{n-1}$) where XOR is bitwise exclusive or. The secret is the bitwise XOR (example of a reconstruction function) of all the servers' numbers. Other examples can use any linear operator in any field. For example, for a secret s that is a 32-bit integer with well-defined overflow semantics (i.e. the correct answer is preserved, modulo 2^32), s can be divided into a vector of M 32-bit integers called $v_{secret}$. Then (n−1) servers are each given a vector of M random integers, server i receiving $v_i$. The remaining server is given $v_n = (v_{secret} - v_1 - v_2 - \ldots - v_{n-1})$. The secret vector can then be recovered by summing across all the server's vectors, which is another example of a reconstruction function. Such examples can be referred to as additive sharing. Other examples of secret-sharing include Boolean sharing and Yao sharing, which may be used for better efficiency for certain computations, e.g., to secure compute an alternative activation function (See section IV-C-1) for logistic function and for a rectified linear unit (RELU) function.

Besides the original input data, intermediate values may be secret-shared. Such intermediate values can occur during the training and/or evaluation of the model. Examples of intermediate values include the output of a node in a neural network, an inner product of input values and weights prior to evaluation by a logistic function, etc. The intermediate values are sensitive because they can also reveal information about the data. Thus, every intermediate value can remain secret-shared. Some embodiments can use multiplication triplets to allow the results of multiplication (which are an example of an intermediate value) to be secret-shared.

C. Security Definition

Recall that the involved parties may include m clients $C_1, \ldots, C_m$ and two servers $S_0, S_1$. Implementations can assume a semi-honest adversary A who can corrupt any subset of the clients and at most one of the two servers. This captures the property that the two servers are not colluding, i.e. if one is controlled by the adversary, the second one behaves honestly. Note that we do not put any restrictions on collusion among the clients and between the clients and the servers. We call such an adversary an admissible adversary. In one particular scenario (see Section IV-B-3), we weaken the security model by requiring that servers do not collude with the clients.

The security definition should require that such an adversary only learns the data of the clients it has corrupted and the final output but nothing else about the remaining honest clients' data. For example, an adversary A who corrupts $C_1$, $C_2$, and $S_1$ should not learn any information about $C_3$'s data beyond the trained model. We define security using the framework of Universal Composition (UC) [15]. A brief overview of a security definition is provided below, and further details can be found in [15].

Accordingly, a target ideal functionality $F_{ml}$ for machine learning protocols involving a trusted $3^{rd}$ party can be defined for a system comprising clients $C_1; : : : ; C_m$ and servers $S_0; S_1$. For uploading data, input $x_i$ from $C_i$ can be stored internally at the trusted third party. For computation, after input of function F from $S_0$ or $S_1$, $(y_1; : : : : ; y_m)$= $f(x_1; : : : : ; x_m)$ can be computed, and $y_i$ sent to $C_i$. This step can be repeated multiple times with different functions.

An execution in the UC framework involves a collection of (non-uniform) interactive Turing machines. In this disclosure, we consider an admissible and semi-honest adversary A as discussed above. The parties exchange messages according to a protocol. Protocol inputs of uncorrupted parties are chosen by an environment machine. Uncorrupted parties also report their protocol outputs to the environment. At the end of the interaction, the environment outputs a single bit. The adversary can also interact arbitrarily with the environment—without loss of generality the adversary is a dummy adversary which simply forwards all received protocol messages to the environment and acts in the protocol as instructed by the environment.

Security is defined by comparing a real and ideal interaction. Let REAL[Z, A, π, λ] denote the final (single-bit) output of the environment Z when interacting with adversary A and honest parties who execute protocol π on security parameter λ. This interaction is referred to as the real interaction involving protocol π.

In the ideal interaction, parties simply forward the inputs they receive to an incorruptible functionality machine and forward the functionality's response to the environment. Hence, the trusted functionality performs the entire computation on behalf of the parties. The target ideal functionality $F_{ml}$ for protocols is described above. Let IDEAL[Z,S,$F_{ml}$,λ] denote the output of the environment Z when interacting with adversary S and honest parties who run the dummy protocol in presence of functionality F on security parameter λ.

A protocol π securely realizes a functionality $F_{ml}$ if for every admissible adversary A attacking the real interaction (without loss of generality, we can take A to be the dummy adversary), there exists an adversary S (called a simulator) attacking the ideal interaction, such that for all environments Z, the following quantity is negligible (in λ):

$|Pr[REAL[Z,A,\pi,\lambda]=1-Pr[IDEAL[Z,S,F_{ml},\lambda]=1|$

Intuitively, the simulator must achieve the same effect (on the environment) in the ideal interaction that the adversary achieves in the real interaction. Note that the environment's view includes (without loss of generality) all of the messages that honest parties sent to the adversary as well as the outputs of the honest parties.

II. PRELIMINARIES ON MACHINE LEARNING AND SECURE COMPUTATION

As described in FIG. 2, the training computers (depicted as servers 230 and 240) can train a model using data samples that are secret-shared among them. The specific implementation of the training can vary depending on the type of machine learning model being used. Some examples are described in section II-A. Some techniques for secure computation are also described.

A. Machine Learning

In this section, we briefly review the machine learning algorithms considered in this paper: linear regression, logistic regression and neural networks. All algorithms we present are classical and can be found in standard machine learning textbooks (e.g., [26]).

1. Linear Regression

Given n training data samples $x_i$ each containing d features and the corresponding output labels (outputs) $y_i$, regression is a statistical process to learn a function g such that $g(x_i) \approx y_i$. Regression has many applications in real life. For example, in medical science, it is used to learn the relationship between a disease and representative features, such as age, weight, diet habits and use it for diagnosing purposes.

In linear regression, the function g is assumed to be linear and can be represented as the inner product of $x_i$ with the coefficient vector w: $g(x_i) = \sum_{j=1}^{d} x_{ij} w_j = x_i \cdot w$, where $x_{ij}$ (resp. $w_j$) is the jth values in vector $x_i$ (resp. w), and "·" denotes the inner product of two vectors. Usually, a bias b is introduced such that $g(x_i) = x_i \cdot w + b$. However, this can be easily achieved by appending a dummy feature equal to 1 for each $x_i$. To simplify the notation, we assume b is already embedded in w in this disclosure.

To learn the coefficient vector w, a cost function C(w) is defined and w is calculated by the optimization argmin wC(w). In linear regression, a commonly used cost function is $$C(w) = \frac{1}{n} \sum C_i(w),$$

where $C_i(w) = \frac{1}{2}(x_i \cdot w - y_i)^2$. In ridge regression, a penalty term $\lambda \|w\|^2$ is added to the cost function to avoid overfitting where λ is the regularization parameter. Embodiments may use such a term, which is omitted from discussion below for simplicity.

The solution for this optimization problem can be computed by solving the linear system $(X^T \times X) \times w = X^T \times Y$, where X is a n×d matrix representing all the input data, and Y is a n×1 matrix for the output labels. However, the complexity of the matrix multiplication $X^T \times X$ is $O(nd^2)$ and the complexity of solving the linear system is $O(d^3)$. Due to its high complexity, it is rarely used in practice except for small values of n and d.

2. Training Model—Stochastic Gradient Descent (SGD)

SGD is an effective approximation algorithm for approaching a local minimum of a function, step by step. As the optimization function for the linear regression described above is convex, SGD provably converges to the global minimum and is typically very fast in practice. In addition, SGD can be generalized to work for logistic regression and neural network training, where no closed-form solution exists for the corresponding optimization problems. As a result. SGD is the most commonly used approach to train such models in practice and the main focus of this work.

The SGD algorithm works as follows: w is initialized as a vector of random values or all 0s. In each iteration, a sample $(x_i, y_i)$ is selected randomly and a coefficient $w_j$ is updated as $$w_j := w_j - \alpha \frac{\partial C_i(w)}{\partial w_j}. \quad (1)$$

where α is a learning rate defining the magnitude to move towards the minimum in each iteration, and the partial derivative provides information about how the cost function changes for a given change in coefficient $w_j$. Substituting the cost function of linear regression, the formula becomes $w_j:=w_j-\alpha(x_i \cdot w-y_i)x_{ij}$. The phase to calculate the predicted output $y^*_i=x_i \cdot w$ is called forward propagation, and the phase to calculate the change $\alpha(y^*_i-y_i)x_{ij}$ is called backward propagation. In some embodiments, all values of coefficient vector w can be updated together in a single vectorized operation.

a) Min-Batch

Instead of selecting one sample of data per iteration, a small batch of samples can be selected randomly, where w is updated by averaging the partial derivatives of all samples on the current w. For instance, multiple partial derivatives from equation (1) can be computed for $w_j$, each partial derivative corresponding to a different sample. We denote the set of indices selected in a mini-batch by B. This is called a mini-batch SGD and |B| denotes the mini-batch size, usually ranging from 2 to 200. A benefit of a mini-batch is that vectorization libraries can be used to speed up the computation such that the computation time for one mini-batch is much faster than running |B| iterations without mini-batch. Besides, it is often the case that with a mini-batch, w converges smoother and faster to the minimum. With a mini-batch, the update function can be expressed in a vectorized form:

$$w := w - \frac{1}{|B|}\alpha X_B^T \times (X_B \times w - Y_B). \quad (2)$$

where $X_B$ and $Y_B$ are B×d and B×1 submatrices of X and Y selected using indices in B, representing |B| samples of data and labels in an iteration. Here w is viewed as a column vector.

b) Learning Rate Adjustment

If the learning rate α is too large, the result of SGD may diverge from the minimum. Therefore, a testing dataset can be used to test the accuracy of the current w. The inner product of w and each data sample in the testing dataset can be calculated as the prediction, and is compared to the corresponding output label. The accuracy can be measured as the percentage of the correct predictions (e.g., correct classification for logistic regression) on the testing dataset, or the value of the cost function. If the accuracy is decreasing (or cost function is increasing), the learning rate can be reduced, and the training can start over with the new learning rate. To balance the overhead spent on testing, one can shuffle all the training samples and select the mini-batch in each iteration sequentially, until all the samples are used once. This is referred to as one epoch (e.g., after all training samples are used once). After one epoch, the accuracy of the current w is tested. At this point, if the accuracy decreases, the learning rate is reduced by half and the training starts over; otherwise the data is reshuffled and the next epoch of training is executed.

c) Termination

When the difference in accuracy compared to the previous epoch is below a small threshold, w is viewed as having converged to the minimum and the algorithm terminates. We denote the number of epochs to train a model as E and denote the total number of iterations as t. Note that we have the following relationship: n·E=|B|·t.

3. Logistic Regression

In classification problems with two classes, the output label y is binary. For example, given some medical features, one may be interested to predict whether the patient is healthy or sick. In this case, it is better to bind the output of the prediction between 0 and 1. Therefore, an activation function $f$ is applied on top of the inner product and the relationship is expressed as: $g(x_i)=f(x_i \cdot w)$. In logistic regression, the activation function is defined as the logistic function $$f(u) = \frac{1}{1+e^{-u}}.$$

Figure 3A:
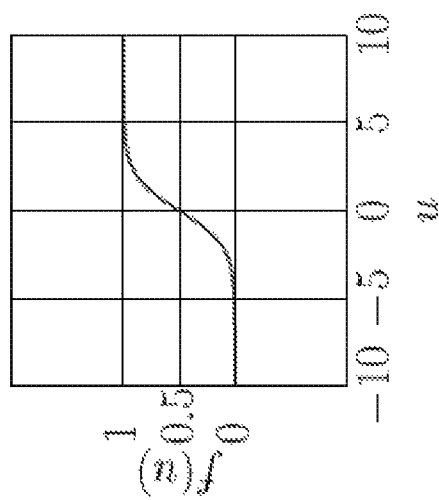
FIG. 3A shows a logistic function.

As shown in FIG. 3A, the two tails of the logistic function converge to 0 and 1.

With this activation function, the original cost function for linear regression is no longer convex, thus applying SGD may give a local minimum instead of the global minimum. Therefore, the cost function can be a cross entropy function:

$$C_i(w) = -y_i \log y_i^* - (1-y_i)\log(1-y_i^*) \text{ and}$$
$$C(w) = \frac{1}{n}\sum C_i(w), \text{ where } y_i^* = f(x_i \cdot w).$$

The mini-batch SGD algorithm for logistic regression updates the coefficients in each iteration as follows:

$$w := w - \frac{1}{|B|}\alpha X_B^T \times (f(X_B \times w) - Y_B). \quad (3)$$

Notice that the backward propagation of logistic regression has exactly the same form as linear regression, yet it is derived using a different activation and cost function. The only difference in the SGD for logistic regression is to apply an extra logistic function on the inner product in the forward propagation.

4. Neural Networks

Figure 3B:
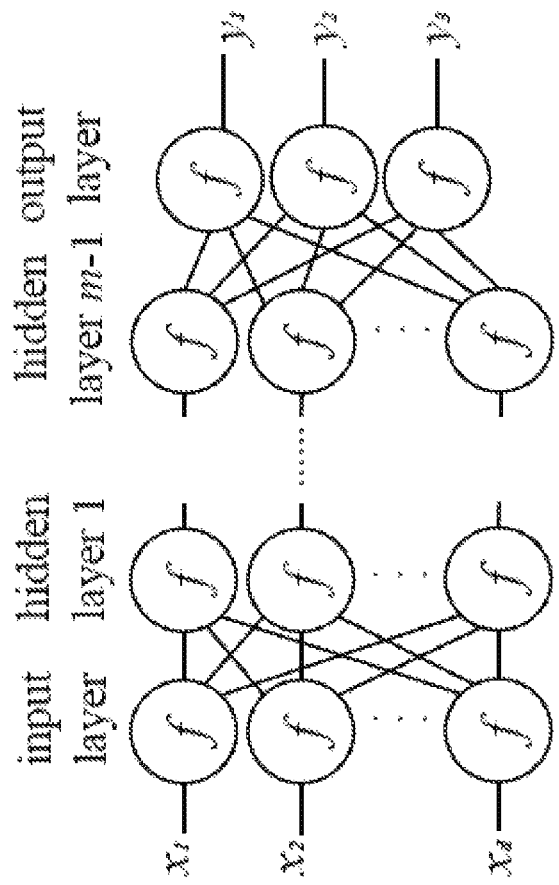
FIG. 3B shows an example of neural network.

Neural networks are a generalization of regression to learn more complicated relationships between high dimensional input and output data. It is extensively used in a wide range of areas such as image processing, voice and text recognition, and even to play the game Go, often leading to breakthroughs in each area. FIG. 3B shows an example of a neural network with m−1 hidden layers. Each node in the hidden layer and the output layer is an instance of regression and is associated with an activation function and a coefficient vector. Nodes are also called neurons. Popular activation functions include the logistic and the RELU function, $f(u)=\max(0,u)$.

For classification problems with multiple classes, usually a softmax function $$f(u_i) = \frac{e^{-u_i}}{\sum_{i=1}^{d_m} e^{-u_i}}$$

is applied at the output layer, where $d_m$ denotes the total number of neurons in the output layer. The insight is that the output after the softmax function is always a probability distribution: each output is between 0 and 1, and all the outputs sum up to 1.

To train a neural network using SGD, Equation (1) is applied in every iteration to update all coefficients of all neurons where each neuron is treated similar to a regression. In particular, let $d_i$ be the number of neurons in layer i and $d_0=d$ be the number of features in the input data. $d_m$ is the dimension of the output. We denote the coefficient matrix of the ith layer as a $d_{i-1} \times d_i$ matrix $W_i$, and the values as a $|B| \times d_i$ matrix $X_i$. $X_0$ is initialized as $X_B$. In the forward propagation for each iteration, the matrix $X_i$ of the ith layer is computed as $X_i = f(X_{i-1} \times W_i)$. In the backward propagation, given a cost function such as the cross entropy function, the update function for each coefficient in each neuron can be expressed in a closed form. To calculate it, we compute the vectors $$Y_i = \frac{\partial C(W)}{\partial U_i}$$

iteratively, where $U_i = X_{i-1} \times W_i \cdot Y_m$ is initialized to $$\frac{\partial C}{\partial X_m} \odot \frac{\partial f(U_m)}{\partial U_m}, \text{ where } \frac{\partial f(U_m)}{\partial U_m}$$

is simply the derivative of the activation function, and $\odot$ is the element-wise product. By the chain rule, $$Y_i = (Y_{i+1} \times W_i^T) \odot \frac{\partial f(U_i)}{\partial U_i}.$$

Finally, the coefficients are updated by letting $$W_i := W_i - \frac{\alpha}{|B|} \cdot X_i \times Y_i,$$

which corresponds to the backward propagation.

In $$Y_i = (Y_{i+1} \times W_i^T) \odot \frac{\partial f(U_i)}{\partial U_i},$$

each $Y_i$ can be considered an error term here. In particular, $Y_m$ for the last layer of the neural network is equal to a difference (error) of the output of forward propagation and the actual output labels. Thus, $Y_m$ is the error for last layer, and the above equation for $Y_i$ can be used to compute the error output of intermediate layers as well. Each error can be used to update the $W_i$ for that layer.

B. Secure Computation

Various embodiments can use various secure computation techniques. Such techniques can be used to perform a function on data that is secret-shared across the servers, without exposing the reconstructed data to a server. How the techniques are combined and used in the over machine learning process is described in later sections.

1. Oblivious Transfer

Oblivious transfer (OT) is a fundamental cryptographic primitive that is commonly used as building block in MPC. In an oblivious transfer protocol, a sender S has two inputs $x_0$ and $x_1$, and a receiver R has a selection bit b and wants to obtain $x_b$ without learning anything else or revealing b to S. The ideal functionality realized by such a protocol can be defined as: on input (SELECT: sid: b) from R and (SEND: sid: x0: x1) from S, return (RECV: sid; xb) to R. We use the notation $(\bot: x_b) \leftarrow OT(x_0, x_1; b)$ to denote a protocol realizing this functionality.

Figure 4:
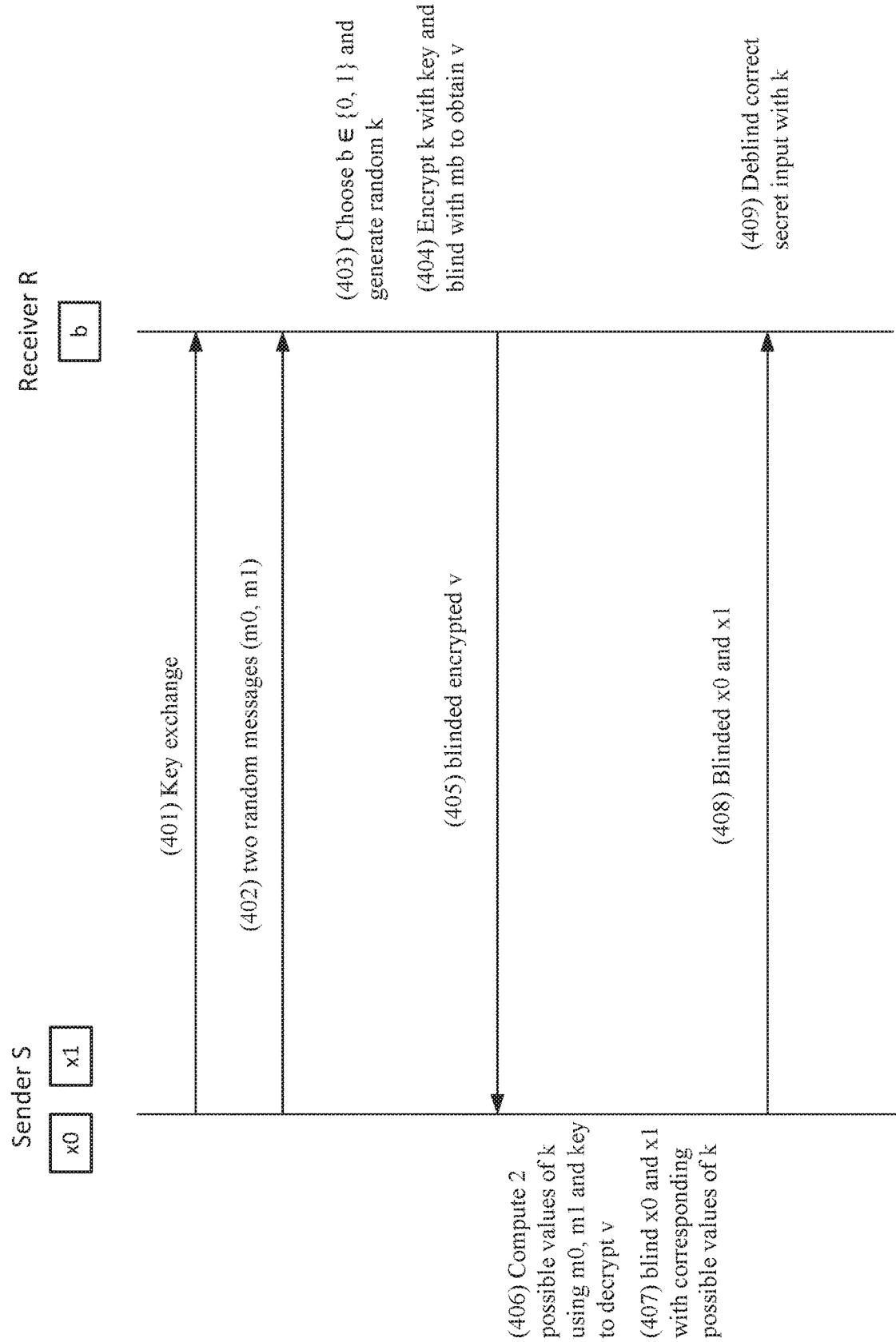
FIG. 4 shows an example of oblivious transfer.

FIG. 4 shows an example of oblivious transfer. At 401, sender S performs a key exchange with receiver R. For example, sender S can generate a private/public key pair and send the public key (e.g., modulus N and exponent e) to receiver R. At 402, sender S generates two random values, m0 and m1, and sends them to receiver R. At 403, receiver R chooses b to be 0 or 1, thereby selecting mb. Receiver R also generates a random number k. At 404, receiver R encrypts the random number k with the key exchanged from sender S, and uses mb to blind the result, thereby obtaining blinded and encrypted v. At 405, receiver R sends the blinded encrypted v to sender S.

At 406, sender S attempts to deblind and decrypt v by applying m0 and m1 and its key to v to derive two possible values for k, one of which will equal the random value generated by receiver R. Sender S does not know (and hopefully cannot determine) which of m0 and m1 that receiver R chose. At 407, x0 and x1 are blinded with the two possible values of k. At 408, the blinded x0 and x1 are sent to receiver R, each can be identified as corresponding to 0 or 1. At 409, receiver R deblinds the blinded value corresponding to the selected b using k.

Accordingly, oblivious transfer can function by sender S generating two keys, m0 and m1. Receiver R can then encrypt a blinding factor using one of the keys. Sender S then decrypts the blinding factor using both of the keys, where one is the correct blinding factor, which is used to blind both the secret inputs. Receiver R can then deblind the correct input.

Embodiments can use OTs both as part of an offline protocol for generating multiplication triplets and in an online phase for logistic regression and neural network training in order to securely compute the activation functions. One-round OT can be implemented using the protocol of [39], but it requires public-key operations by both parties. OT extension [11, 27] minimizes this cost by allowing the sender and receiver to perform m OTs at the cost of $\lambda$ base OTs (with public-key operations) and O(m) fast symmetric-key ones, where $\lambda$ is the security parameter. Some implementations can takes advantage of OT extension for better efficiency. In one embodiment, a special flavor of OT extension called correlated OT extension [11] is used. In this variant which we denote as COT, the sender's two inputs to each OT are not independent. Instead, the two inputs to each OT instance are: a random value $s_0$ and a value $s_1 = f(s_0)$ for a correlation function $f$ of the sender's choice. The communication for a COT of l-bit message, denoted by $COT_l$, is $\lambda + l$, and the computation is hashing, e.g., SHA256, SHA3, or other cryptographic hashing.

2. Garbled Circuit 2PC

Garbled Circuits were first introduced by [47]. A garbling scheme consists of a garbling algorithm that takes a random seed $\sigma$ and a function $f$ and generates a garbled circuit F and a decoding table dec; the encoding algorithm takes input x and the seed $\sigma$ and generates garbled input $\hat{x}$; the evaluation algorithm takes $\hat{x}$ and F as input and returns the garbled output $\hat{z}$; and finally, a decoding algorithm that takes the decoding table dec and $\hat{z}$, and returns $f(x)$. Some embodiment can have the garbling scheme satisfy the standard security properties formalized in [13].

The garbled circuit can be viewed as a Boolean circuit, with inputs in binary of fixed length. A Boolean circuit is a collection of gates connected with three different types of wires: circuit-input wires, circuit-output wires and intermediate wires. Each gate receives two input wires (e.g., one for each party) and it has a single output wire which might be fan-out (i.e. be passed to multiple gates at the next level). Evaluation of the circuit can be done by evaluating each gate in turn. A gate can be represented as a truth table that assigns a unique output bit for each pair of input bits.

The general idea of garbled circuits is that the original circuit of a function is transformed so that the wires only contain random bitstrings. For example, every bit in a truth table is replaced by one of two random numbers (encodings), with the mapping known by the sender. Each gate is encoded so that its output bitstring can be computed from the inputs, and only the random bitstrings of output gates can be mapped back to actual results. The evaluation computes the function, but does not leak information about the values on separate wires. The main drawback of the garbled circuit technique are inefficient evaluation and inability to reuse the circuit. Accordingly, the two parties (sender and receiver) can learn the output of the circuit based on their own input and nothing else, i.e., not learn the other party's input to the circuit.

In some implementations, the sender prepares the garbled circuit by determining a truth table for each gate using the random numbers that replaced the two bits on the input wires. The output values are then encrypted (e.g., using double-key symmetric encryption) with the random numbers from the truth table. Thus, one can only decrypt the gate only if one knows the two correct random numbers for a given output value. The four values for a given table can be randomly permuted (garbled), so there is no relation of row to the output value. The sender can send the garbled tables (sets of encrypted values and the relation between them, i.e., outputs from one to be inputs to another) to the receiver, as well as the sender's input of random values corresponding to the input bits. The receiver can obtain the corresponding random numbers from the sender via oblivious transfer, and thus the sender does not know the receiver's input. The receiver can then compute the output, or potentially get an encoding that needs to be sent back to the sender for decoding. The encoding can be sent to the sender if you want the sender to learn the output. This may not be done for intermediate values of the computation, and may only be done for a final output, which the parties are supposed to learn anyways. If a party is not supposed to learn the output, the encoding does not need to be sent. In some embodiments, the garbled circuits work on intermediate values (e.g., RELU function and logistic functions), so they may not be decoded.

Given such a garbling scheme, it is possible to design a secure two-party computation protocol as follows: Alice generates a random seed $\sigma$ and runs the garbling algorithm for function $f$ to obtain a garbled circuit GC. She also encodes her input $\hat{x}$ using $\sigma$ and x as inputs to the encoding algorithm. Alice sends GC and $\hat{x}$ to Bob. Bob obtains his encoded (garbled) input $\hat{y}$ using an oblivious transfer for each bit of y. While an OT-based encoding is not a required property of a garbling scheme, all existing constructions permit such interacting encodings. Bob then runs the evaluation algorithm on GC, $\hat{x}$, $\hat{y}$ to obtain the garbled output $\hat{z}$. We can have Alice, Bob, or both learn an output by communicating the decoding table accordingly. The above protocol securely realizes the ideal functionality $F_f$ that simply takes the parties inputs and computes $f$ on them. See [32] for a more detailed description and proof of security against a semi-honest adversary. In this disclosure, we denote this garbled circuit 2PC by $(z_a, z_b) \leftarrow$ Garbled Circuit(x; y, $f$).

3. Secret Sharing and Multiplication Triplets

As described above, values are secret-shared between the two servers. In various embodiments, three different sharing schemes can be employed: Additive sharing, Boolean sharing and Yao sharing. We briefly review these schemes but refer the reader to [18] for more details. In some embodiments, all intermediate values are secret-shared between the two servers.

To additively share ($Shr^A(\cdot)$) an $\ell$-bit value a, the first party $P_0$ generates $a_0 \in Z_{2^\ell}$ uniformly at random and sends $a_1 = a - a_0 \bmod 2^\ell$ to the second party $P_1$. We denote the first party's share by $\langle a \rangle_0^A = a_0$ and the second party's by $\langle a \rangle_1^A = a_1$. For ease of composition, we omit the modular operation in the protocol descriptions. This disclosure mostly uses the additive sharing in the examples and is denoted by $\langle \cdot \rangle$, but other sharing techniques may be used. To reconstruct ($Rec^A(\cdot, \cdot)$) an additively shared value $\langle a \rangle$, $P_i$ sends $\langle a \rangle_i$ to $P_{1-i}$ who computes $\langle a \rangle_0 + \langle a \rangle_1$.

Given two shared values $\langle a \rangle$ and $\langle b \rangle$, it is easy to non-interactively add the shares by having $P_i$ compute $\langle c \rangle_i = \langle a \rangle_i + \langle b \rangle_i \bmod 2^\ell$. We overload the addition operation to denote the addition protocol by $\langle a \rangle + \langle b \rangle$.

To multiply ($Mul^A(\cdot, \cdot)$) two shared values $\langle a \rangle$ and $\langle b \rangle$ (i.e., compute $c = a \times b$), we take advantage of Beaver's pre-computed multiplication triplet technique. Let's assume that the two parties already share $\langle u \rangle$, $\langle v \rangle$, $\langle z \rangle$ where u, v are uniformly random values in $Z_{2^\ell}$ and $z = uv \bmod 2^\ell$. This triplet can be pre-computed and shared. Then $P_i$ locally computes $\langle e \rangle_i = \langle a \rangle_i - \langle u \rangle_i$ and $\langle f \rangle_i = \langle b \rangle_i - \langle v \rangle$. Both parties run $Rec(\langle e \rangle_0, \langle e \rangle_1)$ and $Rec(\langle f \rangle_0, \langle f \rangle_1)$. As the e and $f$ are respectively modified by the random numbers u and v, no knowledge of two shared values $\langle a \rangle$ and $\langle b \rangle$ is obtained. Then, $P_i$ computes $\langle c \rangle_i = i \cdot e \cdot f + f \cdot \langle a \rangle_i + e \cdot \langle b \rangle_i + \langle z \rangle$, where i is 0 or 1

Boolean sharing can be seen as additive sharing in $Z_2$ and hence all the protocols discussed above carry over. In particular, the addition operation is replaced by the XOR operation ($\oplus$) and multiplication is replaced by the AND operations (AND($\cdot,\cdot$)). We denote party $P_i$'s share in a Boolean sharing by $\langle a \rangle_i^B$.

Finally, one can also think of a garbled circuit protocol as operating on Yao sharing of inputs to produce Yao sharing of outputs. In particular, in all garbling schemes, for each wire w the garbler ($P_0$) generates two random strings $k_0^w$, $k_1^w$. When using the point-and-permute technique [34], the garbler also generates a random permutation bit $r_w$ and lets $K_0^w = k_0^w \| r_w$ and $K_1^w = k_1^w \| (1-r_w)$. The concatenated bits are then used to permute the rows of each garbled truth table. A Yao sharing of a is $\langle a \rangle_0^Y = K_0^w, K_1^w$ and $\langle a \rangle_1^Y = K_a^w$. To reconstruct the shared value, parties exchange their shares. XOR and AND operations can be performed by garbling/evaluating corresponding gates.

To switch from a Yao sharing $\langle a \rangle_0^Y = K_0^w, K_1^w$ and $\langle a \rangle_1^Y = K_a^w$ to a Boolean sharing. $P_0$ lets $\langle a \rangle_0^B = K_0^w[0]$ and $P_1$ lets $\langle a \rangle_1^B = \langle a \rangle_1^Y[0]$. In other words, the permutation bits used in the garbling scheme can be used to switch to boolean sharing for free. We denote this Yao to Boolean conversion by Y2B($\cdot,\cdot$). We note that we do not explicitly use a Yao sharing in our protocol description as it will be hidden inside garbling scheme, but explicitly use the Y2B conversion to convert the garbled output to a Boolean sharing.

III. PROBLEMS AND EXAMPLE IMPROVEMENTS

The state of the art solutions for privacy preserving linear regression [21,37] are many orders of magnitude slower than plaintext training. The main source of inefficiency in prior implementations is that the bulk of computation for training takes place inside a secure 2PC for Boolean circuits (e.g., Yao's garbled circuit) that performs arithmetic operation on decimal numbers represented as integers. Boolean circuits are not efficient for performing arithmetic operations, but existing techniques for fixed-point or floating-point multiplication require bit-level manipulations that are most efficient using Boolean circuits.

In case of logistic regression and neural networks, the efficiency problem is even more challenging as the training procedure computes many instances of non-linear activation functions, such as sigmoid and softmax, which are expensive to compute inside a 2PC. Indeed, we are not aware of any privacy preserving implementations for these two training algorithms.

To address such problems, embodiments can provide new and efficient protocols for privacy preserving linear regression, logistic regression, and neural networks training in MPC (e.g., in a two-server model). Implementations can work with an arbitrary partitioning of the dataset across the clients. Techniques described herein for privacy-preserving linear regression protocol are several orders of magnitude more efficient than the state of the art solutions for the same problem. For example, for a dataset with samples and features and in a comparable setup, embodiments are faster than the protocols implemented in [21, 37]. Moreover, as our experiments show, we significantly reduce the gap between privacy-preserving and plaintext training, with some scenarios only being a factor of six times slower compared to training using TensorFlow [8], a popular machine learning library.

Techniques are also described for implementing the first privacy preserving protocols for logistic regression and neural networks training with high efficiency. For example, on a dataset of size 60,000 with 784 features, an embodiment of a privacy preserving logistic regression has a total running time of 29 seconds while our privacy-preserving protocol for training a neural network with 3 layers and 266 neurons runs in 21,000 seconds.

Certain embodiments are divided into a data-independent offline phase and a much faster online phase. When excluding the offline phase, the protocols are even more competitive with plaintext training. For instance, for a dataset with 60,000 samples and 784 features, where the training computers are running over a local area network (LAN), a linear regression protocol can run in 1.4 seconds, the logistic regression in 8.9 seconds, and the neural network training in 653.0 seconds. For the same dataset, TensorFlow takes 2.7 seconds for linear regression, 2.7 seconds for logistic regression, and 198.5 seconds for neural network training.

A. Arithmetic Operations on Shared Decimal Numbers

The operations in machine learning algorithms involve real numbers (e.g., represented as floating point numbers with a decimal point). But, typical secret sharing techniques use integers. One can shift the decimal point on all floating point numbers to make them all integers with the decimal point implied at a same location (thus not floating anymore). But, as one multiplies such integers, the numbers keep growing in size, potentially almost doubling after each multiplication. And, as machine learning algorithms involve numerous multiplications, the size of the numbers would continue to grow.

At some point, the field for the integers is constrained to a maximum size, thereby providing a finite field. The finite filed may be reached when after a few multiplications. To impose the finite field, one can truncate the last X digits (i.e., the least significant bits) so as to maintain the size of the integer at N digits, thereby performing a fixed point arithmetic. Such truncation can work fine when the numbers are not secret-shared, but if they are secret-shared, it is not clear how to maintain the numbers in a finite field, let alone to do so when training a machine learning model. For example, it is not clear how to perform such truncation. Thus, previous techniques did not use secret-sharing when truncation was needed, but used garbled circuits to manipulate bits so that the garbled circuit performs a truncation once the result of the multiplication is known. Thus, previous techniques were slow due to the use of garbled circuits, which have a large cryptographic overhead.

If secret-sharing was performed, the shares can be combined inside the circuit, and then the multiplication can occur for the reconstructed numbers. The garbled circuit would output the encrypted shares, with the receiver sending the sender's encrypted share (where the sender can decrypt using the random numbers allocated upon creation of the garbled circuit), and the receiver can obtain the corresponding unencrypted portion via oblivious transfer one bit at a time. Thus, the receiver just learns its random share of the actual result not the result itself.

Accordingly, a major bottleneck in prior work is the computation of fixed-point arithmetic inside a secure 2PC, such as garbled circuits. This is prohibitively expensive, given the large number of multiplications needed for training. Instead of using a garbled circuit, embodiments can use multiplication triplets in combination with truncation operations performed on the shares, as opposed to the reconstructed number.

As described above, multiplication triplets use a random value U and a random value V that are multiplied to get Z, where the multiplications of these random numbers can be performed in an offline phase. The multiplication triplet can be used in an online phase to do the multiplication of two actual data values. Each party (training computer) can locally truncate its own share of the result of the product so no garbled circuits are needed. Such a truncation can introduce some error as the exact multiplication operation is not performed, but this disclosure (theorem 2) shows that the error is insignificant in machine learning algorithms for a reasonably sized field. Thus, although the ideal is to get a truncated C from multiplying A and B, reconstructing after truncating the shares provides a number very close to C. This is much faster than determining C in a garbled circuit, and then truncating C.

For multiplication, our results show that the following strategy is very effective: represent the two shared decimal numbers as shared integers in a finite field: perform a multiplication on shared integers using offline-generated multiplication triplets; and have each party truncate its share of the product so that a fixed number of bits represent the fractional part. We prove that, with high probability, the product when reconstructed from these truncated shares, is at most 1 bit off in the least significant position of the fractional part compared to fixed-point arithmetic. Our experiments on two different datasets, MNIST and Arcene [1,6], confirm that the small truncation error has no effect on accuracy of the trained model (in fact accuracies match those of standard training) when the number of bits representing the fractional part is sufficiently large (e.g., 13 bits), which can depend on the dataset. As a result, the online phase for privacy preserving linear regression may not involve any cryptographic operations and only consist of integer multiplications and bit shifting, while the offline phase consists of generating the necessary multiplication triplets.

B. Secure Computation Friendly Activation Functions

Logistic regression is more computationally intensive than linear regression because there are more operations than multiplication and addition. For example, there are logistic functions, such as a sigmoid function that is a non-linear function. These functions would also be applied to secret-shared values, which can become very expensive, since large garbled circuits have been used. Previous work has used polynomial approximations to a logistic function, but there is a loss of accuracy and can still be computationally expensive for higher order polynomials.

Accordingly, logistic regression and neural network training can require computing the logistic function $$\left(\frac{1}{1+e^{-x}}\right)$$

and the softmax $$\left(\frac{e^{-x_i}}{\sum e^{-x_i}}\right),$$

which are expensive to compute on shared values. We experimentally show that the use of low-degree polynomials to approximate the logistic function is ineffective. In particular, one needs polynomials of degree at least 10 to approach the accuracy of training using the logistic function.

Figure 7:
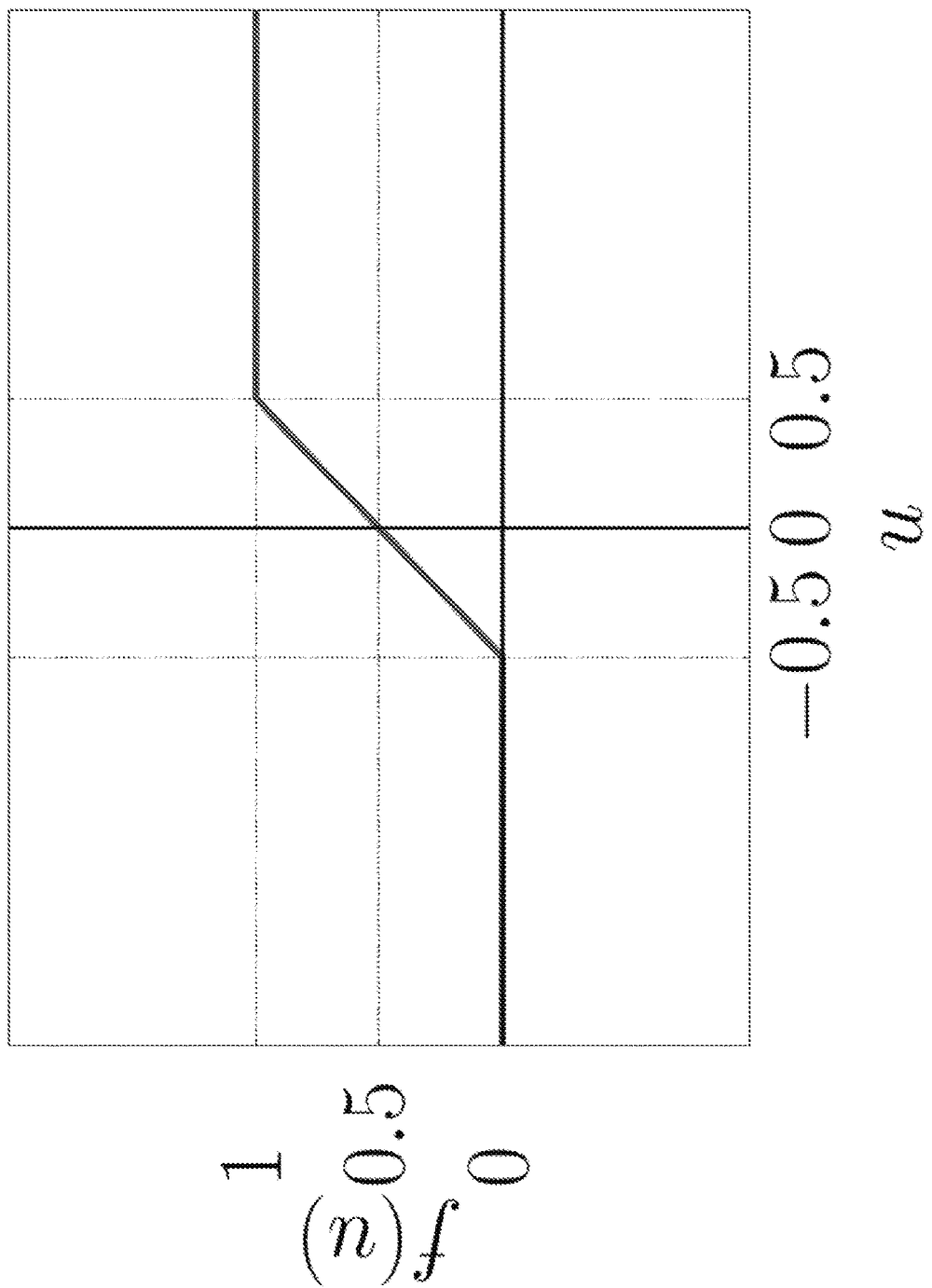
FIG. 7 shows a new activation function according to embodiments of the present invention.

This disclosure proposes a new activation function (see FIG. 7), and can be computed very efficiently using a small garbled circuit. In addition, the softmax function can be replaced with a combination of two RELU functions, additions, and a single division. Our experiments using the MNIST and Arcene datasets confirm that accuracy of the models produced using these new functions either match or are very close (See section IV-C) to those trained using the original functions.

A customized solution for switching between arithmetic sharing (also referred to as additive sharing) and Yao's garbled circuit can significantly reduce the cost by minimizing rounds of interaction and number of invoked oblivious transfers (OT). The same ideas can be used to securely evaluate the RELU functions used in neural networks training, and is used in neural network examples below.

C. Vectorizing the Protocols

Vectorization (i.e. operating on matrices and vectors) can be critical in efficiency of plaintext training. This disclosure describes how to benefit from the same vectorization techniques in a secret-shared setting, e.g., in the online phase described herein. Moreover, for the offline phase of generating many multiplication triplets, solutions are proposed based on linearly homomorphic encryption (LHE) and oblivious transfer. The techniques can be optimized for a vectorized scenario to compute multiplication of shared matrices and vectors. As a result the complexity of our offline protocols are much better than the naive approach of generating independent multiplication triplets for each multiplication.

In a slightly different security model than the two-server model, we also propose a much faster offline phase where clients help generate the multiplication triplets. We discuss the pros/cons of this approach and compare its performance with other embodiments.

IV. PRIVACY PRESERVING MACHINE LEARNING

This section presents protocols for privacy-preserving machine learning using SGD. We first describe a protocol for linear regression in Section IV-A, based solely on arithmetic secret sharing and multiplication triplets. Next, we discuss how to efficiently generate these multiplication triplets in the offline phase in Section IV-B. We then generalize techniques to support logistic regression and neural networks training in Sections IV-C and IV-D. Finally, techniques to support predication, learning rate adjustment, and termination determination are presented in Section IV-E.

A. Privacy Preserving Linear Regression

In some embodiments, the training data is secret shared between two servers $S_0$ and $S_1$. We denote the shares of two values X and Y at the two servers by $\langle X \rangle_0$, $\langle Y \rangle_0$ and $\langle X \rangle_1$, $\langle Y \rangle_1$. In practice, the clients can distribute the shares between the two servers, or encrypt the first share using the public key of $S_0$ and upload both the first encrypted share and the second plaintext share to $S_1$. $S_1$ can then pass the encrypted shares to $S_0$ to decrypt. Herein, both implementations are encompassed by secret sharing.

The weighting coefficients w also be secret shared between the training computers (e.g., the two servers). The weighting coefficients w can be initialized to random values or all 0 s simply by setting $\langle w \rangle_1$ and $\langle w \rangle_1$ to be random or 0s, without any communication between the two servers. The weighting coefficients w can be updated and remain secret shared after each iteration in the SGD, until the end of training when it is reconstructed.

As described in Section II-A, the update function for linear regression is $w_j := w_j - \alpha(\sum_{k=1}^{d} x_{ik} w_k - y_i) x_{ij}$, only consisting of additions and multiplications. The corresponding addition and multiplication algorithms for secret-shared values can be applied to update the coefficients, which is $\langle w_j \rangle := \langle w_j \rangle - \alpha \text{Mul}^A(\sum_{k=1}^{d} \text{Mul}^A(\langle x_{ik} \rangle, \langle w_k \rangle) - \langle y_i \rangle, \langle x_{ij} \rangle)$. The protocol can be separated into two phases: online and offline. The online phase trains the model given the data, while the offline phase consists mainly of multiplication triplet generation. We focus on the online phase in this section, and discuss the offline phase in Section IV-B.

1. Vectorization in the Shared Setting

Embodiments can use the mini-batch and vectorization techniques discussed in Section II-A (see Equation 2). To achieve this, we generalize the addition and multiplication operations on share values to shared matrices. Matrices are shared by applying $\text{Shr}^A$ to every element. Given two shared matrices $\langle A \rangle$ and $\langle B \rangle$, matrix addition can be computed non-interactively by letting $\langle C \rangle_i = \langle A \rangle_i + \langle B \rangle_i$ for $i \in \{0,1\}$. To multiply two shared matrices, instead of using independent multiplication triplets (e.g., just multiplying two numbers), we take shared matrices $\langle U \rangle$, $\langle V \rangle$, $\langle Z \rangle$, where each element in U and V is uniformly random in $\mathbb{Z}_{2^l}$, U has the same dimension as A, V has the same dimension as B, and $Z = U \times V$ mod $2^l$. $S_i$ computes $\langle E \rangle_i = \langle A \rangle_i - \langle U \rangle_i$ and $\langle F \rangle_i = \langle B \rangle_i + \langle V \rangle_i$, and sends them to the other server. Both servers reconstruct E and F and set $\langle C \rangle_i = i \cdot E \times F + \langle A \rangle_i \times F + E \times \langle B \rangle_i + \langle Z \rangle_i$. The idea of this generalization is that each element in matrix A is always masked by the same random element in U, while it is multiplied by different elements in B in the matrix multiplication. Our security proof confirms that this does not affect security of the protocol, but makes the protocol significantly more efficient due to vectorization.

Applying the technique to linear regression, in each iteration, we assume the set of mini-batch indices B is public, and perform the update:

$$\langle w \rangle := \langle w \rangle - \frac{1}{|B|} \alpha Mul^A(X_B^T, Mul^A(\langle X_B \rangle, \langle w \rangle) - \langle Y_B \rangle).$$

We further observe that one data sample will be used several times in different epochs, yet it suffices to mask it by the same random multiplication triplets. Therefore, in the offline phase, one shared n×d random matrix $\langle U \rangle$ is generated to mask the data samples $\langle X \rangle$. At the beginning of the online phase, $\langle E \rangle_i = \langle X \rangle_i - \langle U \rangle_i$ is computed and exchanged to reconstruct E through one interaction (e.g., pair of communications). The number of interactions and iterations are proportional. Iteration refers to iterations of the training, but interaction refers to messages sent/received in the privacy-preserving training, which also grow with number of iterations.

After that, in each iteration, $E_B$ is selected and used in the multiplication protocol, without any further computation and communication. In particular, in the offline phase, a series of min-batch indices $B_1, \ldots, B_t$ are agreed upon by the two servers. This only requires the knowledge of n, d, t, or an upper bound, but not any real data. Then the multiplication triplets $\langle U \rangle, \langle V \rangle, \langle Z \rangle, \langle V' \rangle, \langle Z' \rangle$ are precomputed with the following property: U is an n×d matrix to mask the data X, V is a d×t matrix, each column of which is used to mask w in one iteration (forward propagation), and V' is a |B|×t matrix wherein each column is used to mask the difference vector Y*−Y in one iteration (backward propagation). We then let $Z[i]=U_{B_i} \times V[i]$ and $Z'[i]=U_{B_i}^T \times V'[i]$ for i=1, ..., t, where M[i] denotes the ith column of the matrix M. Using the multiplication triplets in matrix form, the computation and communication in both the online and the offline phase are reduced dramatically. One will notice the re-use of U, and thus the two sets of triplets are not independent of each other, but instead share a matrix.

We denote the ideal functionality realizing the generation of these matrices in the offline phase by $F_{offline}$.

2. Arithmetic Operations on Shared Decimal Numbers

As discussed earlier, a major source of inefficiency in prior work on privacy preserving linear regression stems from computing on shared/encrypted decimal numbers.

Prior solutions either treat decimal numbers as integers and preserve full accuracy after multiplication by using a very large finite field [22], or utilize 2PC for Boolean circuits to perform fixed-point [21] or floating-point [35] multiplication on decimal numbers. The former can only support a limited number of multiplications, as the range (number of binary digits) of the result grows exponentially with the number of multiplications. This is prohibitive for training where the number of multiplications is large. The latter introduces high overhead, as the Boolean circuit for multiplying two-bit numbers has gates, and such a circuit needs to be computed in a 2PC (e.g. Yao's garbled circuits) for each multiplication performed.

We propose an effective solution to support decimal arithmetic in an integer field. Consider the fixed-point multiplication of two decimal numbers x and y with at most $l_D$ bits in the fractional part. We first transform the numbers to integers by letting $x'=2^{l_D}x$ and $y'=2^{l_D}y$ and then multiply them to obtain the product z=x'y'. Note that z has at most $2/l_D$ bits representing the fractional part of the product, so we truncate the last $l_D$ bits of z such that it has at most $l_D$ bits representing the fractional part. Mathematically speaking, if z is decomposed into two parts $z=z_1 \cdot 2^{l_D}+z_2$, where $0 \le z_2 < 2^{l_D}$, then the truncation results in $z_1$. We denote this truncation operations by $\lfloor z \rfloor$.

We show that this truncation technique also works when z is secret shared. In particular, the two servers can truncate their individual shares of: independently. In the theorem 1 (below), for a large enough field, these truncated shares when reconstructed are (with high probability) at most 1 off from the desired $\lfloor z \rfloor$. In other words, we incur a small error in the least significant bit of the fractional part compared to standard fixed-point arithmetic.

If a decimal number z is negative, it will be represented in the field as $2^l-|z|$, where $|z|$ is its absolute value and the truncation operation changes to $\lfloor z \rfloor = 2^l - \lfloor |z| \rfloor$. We prove the following theorem for both positive and negative numbers in section VII-A.

Theorem 1 is as follows. In field $Z_{2^l}$, let $x \in [0, 2^{l_x}] \cup [2^l - 2^{l_x}, 2^l]$, where $l > l_x + 1$ and given shares $\langle x \rangle_0, \langle x \rangle_1$ of x, let $\langle \lfloor x \rfloor \rangle_0 = \lfloor \langle x \rangle_0 \rfloor$ and $\langle \lfloor x \rfloor \rangle_1 = 2^l - \lfloor 2^l - \langle x \rangle_1 \rfloor$. Then with probability $1 - 2^{l_x + 1 - l}$, $Rec^A(\langle \lfloor x \rfloor \rangle_0, \langle \lfloor x \rfloor \rangle_1) \in \{\lfloor x \rfloor - 1, \lfloor x \rfloor, \lfloor x \rfloor + 1\}$, where $\lfloor \cdot \rfloor$ denotes truncation by $l_D \le l_x$ bits.

FIG. 5 shows an online phase of privacy-preserving linear regression according to embodiments of the present invention. FIG. 5 shows a protocol among servers $S_i$. The protocol assumes that the data-independent shared matrices $\langle U \rangle$, $\langle V \rangle, \langle Z \rangle, \langle V' \rangle, \langle Z' \rangle$ are already generated in an offline phase. Besides multiplication and addition of shared decimal numbers, the protocol also multiplies the coefficient vector by $$\frac{\alpha}{|B|}$$

In each iteration. To make this operation efficient, we set $$\frac{\alpha}{|B|}$$

to be a power of 2, i.e., $$\frac{\alpha}{|B|} = 2^{-k}.$$

Then the multiplication with $$\frac{\alpha}{|B|}$$

can be replaced by having the parties truncate k additional bits from their shares of the coefficients.

A proof for the Theorem 2 on security of the online protocol is provided in section VIII. Theorem 2 considers a protocol where clients distribute arithmetic shares of their data among two servers who run the protocol of FIG. 5 and send the output to clients. In the $F_{offline}$ hybrid model, this protocol realizes the ideal functionality $F_{ml}$ for the linear regression function, in presence of a semi-honest admissible adversary mentioned in section I-C.

3. Effect of Truncation Error

Note that when the size of the field is large enough, truncation can be performed once per iteration instead of once per multiplication. In some implementations, the truncation is performed $(|B|+d) \cdot t$ times (e.g., d for multiplication results of X×w and |B| for the multiplication of the forward propagation result with X); and by the union bound, the probability of failure (i.e. Theorem 1 not holding) in the training is $(|B|+d) \cdot t \cdot 2^{l_x+1-l}$, where d is the number of features and t is the number of iterations. In other implementations, the truncation may be performed just $d \cdot t$ times, e.g., when truncation is performed at the $\Delta$ value for updating the weights in step 9 of FIG. 5.

Moreover, even if a failure in the truncation occurs, it is unlikely to translate to a failure in training. Such a failure makes one feature in one sample invalid, yet the final trained model is likely to not be affected by this. In section VII-C, we confirm these observations by running experiments on two different datasets (MNIST [6] and Arcene [1]). In particular, we show that accuracy of the models trained using privacy preserving linear regression with truncation matches those of plaintext training using standard arithmetic.

4. Efficiency

The dominating term in the computation cost of FIG. 5 is the matrix multiplications in steps 5 and 8. In each iteration, each party performs 4 such matrix multiplications, while in plaintext SGD training, according to Equation 2, two matrix multiplications of the same dimensions are performed. Hence, the computation time for each party is only twice the time for training on plaintext data Note that server $S_1$ can simplify the formula to $E \times (F - \langle w \rangle) + \rangle X \langle \times F + \langle Z \rangle$, which has only 2 matrix multiplications.

The to communication of the protocol is also nearly optimal. In step 1, each party sends an n×d matrix, which is of the same size as the input data. In steps 4 and 7, $|B|+d$ elements are sent per iteration. Therefore, the total communication is $$n \cdot d + (|B| + d) \cdot t = nd \cdot \left(1 + \frac{E}{d} + \frac{E}{|B|}\right)$$

for each party. Typically, the number of epochs (e.g., one round of using training samples once) is only a small constant: about 2-3 for linear and logistic regressions and 10-15 for neural networks, which is much smaller than |B| and d. Therefore, the total communication is only a little more than the size of the data. The time spent on the communication can be calculated by dividing the total communication by the bandwidth of the network between the two parties. In practice, this is negligible on wired networks.

B. The Offline Phase

We describe how to implement the offline phase as a two-party protocol between $S_0$ and $S_1$ by generating the desired shared multiplication triplets. As examples, two protocols are provided for doing so based on linearly homomorphic encryption (LHE) and oblivious transfer (OT) [18]. The techniques are optimized for the vectorized scenario for operating on matrices. As a result, the complexity of our offline protocols is much better than the naive approach of generating independent multiplication triplets.

Recall that given shared random matrices $\langle U \rangle$ and $\langle V \rangle$, a |B|×d submatrix can be selected from $\langle U \rangle$, and a column selected from $\langle V \rangle$, followed by computing the shares of their product. This is repeated t times to generate $\langle Z \rangle$. Similarly, $\langle Z' \rangle$ is computed in the same way with the dimensions reversed. Therefore, for simplicity, we focus on this basic step, where given shares of a |B|×d matrix $\langle A \rangle$, and shares of a d×1 matrix $\langle B \rangle$, we want to compute shares of a |B|×1 matrix $\langle C \rangle$ such that C=A×B.

We utilize the following relationship: $C = \langle A \rangle_0 \times \langle B \rangle_0 + \langle A \rangle_0 \times \langle B \rangle_1 + \langle A \rangle_1 \times \langle B \rangle_0 + \langle A \rangle_1 \times \langle B \rangle_1$. It suffices to compute $\langle \langle A \rangle_0 \times \langle B \rangle_1 \rangle$ and $\langle \langle A \rangle_1 \times \langle B \rangle_0 \rangle$ as the other two terms can be computed locally.

1. LHE-Based Generation

To compute the shares of the product $\langle A \rangle_0 \times \langle B \rangle_1$, $S_1$ encrypts each element of $\langle B \rangle_1$, using an LHE and sends them to $S_0$. As examples, the LHE can be initiated using the cryptosystem of Paillier [38] or Damgard-Geisler-Kroigaard (DGK) [17]. So then performs the matrix multiplication on the ciphertexts, with additions replaced by multiplications and multiplications by exponentiations. $S_0$ can mask the resulting ciphertexts by random values, and sends them back to $S_1$ to decrypt. The protocol can be found in FIG. 6.

$S_1$ performs d encryptions, |B| decryptions, and $S_0$ performs |B|×d exponentiations. The cost of multiplications on the ciphertext is non-dominating and is omitted. The shares of $\langle A \rangle_1 \times \langle B \rangle_0$ can be computed similarly, so $S_1$ encrypts $\langle B \rangle_0$ and sends to $S_0$ who multiplies $\langle A \rangle_1$ on the left. Thus, $S_1$ would have a share of $\langle A \rangle_0 \times \langle B \rangle_1$ and a share of $\langle A \rangle_0 \times \langle B \rangle_1$, both as part of $\langle C \rangle_1$. $S_0$ would have a share of $\langle A \rangle_0 \times \langle B \rangle_1$ and a share of $\langle A \rangle_1 \times \langle B \rangle_0$ as part of $\langle C \rangle_0$. This secret sharing can be accomplished through the masking performed by $S_0$, where the mask is one server's share ($S_0$ in this example), and the value+mask is the other server's share ($S_1$ in this example).

Using this basic step, the overall computation performed in the offline phase per party is $(|B|+d) \cdot t$ encryptions, $(|B|+d) \cdot t$ decryptions, and $2|B| \cdot d \cdot t$ exponentiations. The total communication is $2(|B|+d) \cdot t$ ciphertexts, which is much smaller than the size of the data. If we had generated the multiplication triplets independently, the number of encryptions, decryptions and the communication would increase to $2|B| \cdot d \cdot t$. Finally, unlike the online phase, all communication in the offline phase can be done in one interaction.

2. OT-Based Generation

The shares of the product $\langle A \rangle_0 \times \langle B \rangle_1$ can also be computed using OTs. The shares of the product $\langle a_{ij} \cdot b_j \rangle$ can be computed for all $i=1, \ldots, |B|$ and $j=1, \ldots, d$. To do so, $S_1$ uses each bit of $b_j$ to select two values computed from $a_{ij}$ using correlated OTs. In particular, for $k=1, \ldots, l$, $S_0$ sets the correlation function COT to $f_k(x) = a_{ij} \cdot 2^k + x \mod 2^l$; $S_0$ and $S_1$ run $COT(r_k, f_k(x); b_j[k])$. If $b_j[k]=0$, $S_1$ gets $r_k$: if $b_j[k]=1$, $S_1$ gets $a_{ij} \cdot 2^k + r_k \mod 2^l$. This is equivalent to $b_j[k] \cdot a_{ij} \cdot 2^k + r_k \mod 2^l$. Finally, $S_1$ sets $\langle a_{ij} \cdot b_j \rangle_1 = \Sigma_{k=1}^l (b_j[k] \cdot a_{ij} \cdot 2^k + r_k) = a_{ij} \cdot b_j + \Sigma_{k=1}^l r_k \mod 2^l$; and $S_0$ sets $\langle a_{ij} \cdot b_j \rangle_0 = \Sigma_{k=1}^l (-r_k) \mod 2^l$. Thus, each party) gets a share of the cross terms.

To further improve efficiency. [18] observes that for each k, the last k bits of $a_{ij} \cdot 2^k$ are all 0s. Therefore, only the first l-k bits need to be transferred. Therefore, the message lengths are $l, l-1, \ldots, 1$, instead of all being l-bits. This is equivalent to running l instances of $COT_{(l+1)/2}$.

The optimization described above does not improve the computation cost of OTs. The reason is that in OT, each message is XORed with a mask computed from the random oracle applied to the selection bit. In practice, the random oracle is instantiated by a hash function such as SHA256 or AES, which at least has 128 bit output. Hence, the fact that l is only 64 does not reduce time to compute the masks.

Some embodiments further leverage the matrix structure to improve on this. Note that $a_{1j}, \ldots a_{|B|j}$ are all multiplied by $b_j$, which means the same selection bit $b_j[k]$ is used for all $a_{ij}$. Equivalently, $b_j[k]$ can be used to select messages with length $(l-k) \cdot |B|$ bits.

Therefore, they can be masked by $$\left\lceil \frac{(l-k) \cdot |B|}{128} \right\rceil$$

hash outputs. For a reasonable mini-batch size, each multiplication needs $$\frac{l}{4}$$

instances of $COT_{128}$. In this way, the total number of hashes can be reduced by 4 times and the total communication can be reduced by half.

Finally, after computing $\langle a_{ij} \cdot b_j \rangle$, the ith element of $\langle A \rangle_0 \times \langle B \rangle_1$ can be computed by $\langle A \rangle_0 \times \langle B \rangle_1[i] = \Sigma_{j=0}^{d} \langle a_{ij} \cdot b_j \rangle$. The shares of $\langle A \rangle_1 \times \langle B \rangle_0$ can be computed similarly.

In total, both parties perform $$\frac{|B| \cdot d \cdot t \cdot l}{2}$$

instances of $COT_{128}$ and the total communication is $|B| \cdot d \cdot t \cdot l \cdot (1+\lambda)$ bits. In addition, a set of base OTs can be performed at the beginning for OT extension, e.g., by running several initial OTs and then bootstrapping them to many OTs. In the next section, we show that the size of communication (i.e., number of bits communicated) for the OT-based generation is much higher than LHE-based generation, yet the total running time is faster. The reason is that OT extension makes each OT operation very cheap (~$10^6$ OTs per second).

3. Client-Aided Offline Protocol

As expected and shown by the experiments discussed later, a bottleneck in a privacy-preserving machine learning protocol can be the offline phase. It involves a large number of cryptographic operations such as OT or LHE (e.g., as many as the number of triplets needed), which are much slower than simple addition and multiplication in a finite field in the online phase. An alternative way of generating multiplication triplets is desired. In some embodiments, the clients generate the multiplication triplets. Since the clients need to secretly share their data in the first place, it is suitable to have them secretly share some extra multiplication triplets. These multiplication triplets can be generated in a trusted way with no heavy cryptographic operations, which improves the efficiency significantly. However, despite its benefits, it changes the trust model and introduces some overhead for the online phase. A detailed discussion of the client-aided triplet generations and the analysis of the overhead can be found in section XI (Appendix F).

The security model can also change with the client-aided offline phase, thereby providing a new security model. Previously, a client may only responsible to upload his own data, and thus the server clearly cannot learn any extra information when he colludes with a subset of clients. Now, as the clients are also generating multiplication triplets, if a subset of clients are colluding with one server, they may reconstruct the coefficient vector in an iteration, which indirectly leaks information about the data from honest clients. Therefore, in the client-aided scenario, the security model can be changed to not allow collusion between a server and a client. Similar but inferior models have appeared in prior work. For example, in [21], one server (e.g., the one labeled CSP) provides multiplication triplets to the clients to securely compute inner products of their data. If a client is colluding with the CSP, he can immediately learn others' data. In contrast, the above client-aided protocols are secure under the new model because the clients learn no extra information after uploading the data and the multiplication triplets. As long as the multiplication triplets are correct, which is the case for semi-honest clients, the training is correct and secure.

In describing the client-aided multiplication triplets, we start with the linear regressions for simplicity. Note that in the whole training, each feature in each data sample can be used exactly in two multiplications per epoch: one in the forward propagation and the other in the backward propagation. Therefore, it suffices for the client holding this value to generate 2E multiplication triplets, where E is the number of epochs. In particular, for each feature of each sample, the client possessing the data generates a random value u to mask the data, and generates random values $v_k$, $v'_k$ for $k=1, \ldots, E$ and computes $z_k = u \cdot v_k$, $z'_k = u \cdot v'_k$. Finally, the client distributes shares of $\langle u \rangle, \langle v_k \rangle, \langle v'_k \rangle, \langle z_k \rangle, \langle z'_k \rangle$ to the two servers.

Notice that we do not assume the clients know the partitioning of the data possession when generating the triplets. This means that we can no longer utilize the vectorized equation for the online phase. For example, in Section IV-A, in the forward propagation at step 3 of FIG. 4, where we compute $X_B \times w$, we use precomputed matrix multiplication triplets of $U \times V = Z$ with exactly the same dimensions as the online phase. Now, when the multiplication triplets are generated by the clients, the data in the mini-batch $X_B$ may belong to different clients who may not know they are in the same mini-batch of the training, and thus cannot agree on a common random vector V to compute Z.

Instead, for each data sample x in $X_B$, the two parties compute $\langle y^* \rangle = Mul^A(\langle x \rangle, \langle w \rangle)$ using independently generated multiplication triplets, and set $\langle Y^* \rangle$ to be a vector of $\langle y^* \rangle$s. Because of this, the computation, communication of the online phase and the storage of the two servers are increased.

The client-aided multiplication triplets generation significantly improves the efficiency of the offline phase, as there is no cryptographic operation involved. However, it introduces overhead to the online phase. The matrix multiplications are replaced by vector inner products. Though the total number of multiplications performed is exactly the same, matrix multiplication algorithms are in general faster using matrix libraries in modern programming languages. This is the major overhead introduced by the client-aided approach as depicted in the experiments.

The communication is also increased. Previously, the coefficient vector is masked by a single random vector to compute a single matrix multiplication, while now it is masked multiple times by different random vectors for each inner products. These masked values are transferred between the two parties in the secure computation protocol. In particular, the overhead compared to the protocols in Section IV is for linear and logistic regressions. this is not significant in the LAN setting but becomes important in the WAN setting.

Finally, the storage is also increased. Previously, the matrix V and Z is much smaller than the data size and the matrix U is of the same size as the data. Now, as the multiplication triplets are generated independently, the size of V becomes $|B|\cdot d\cdot t = n\cdot d\cdot E$, which is larger than the size of the data by a factor of E. The size of U is still the same, as each data is still masked by one random value, and the size of Z is still the same because the values can be aggregated once the servers collect the shares from all the clients.

Despite of all these overheads, the online phase is still very efficient, while the performance of the offline phase is improved dramatically. Therefore, the privacy preserving machine learning with client-aided multiplication triplets generation is likely the most promising option for deployment in existing machine learning frameworks.

C. Privacy Preserving Logistic Regression

This section presents a protocol to support privacy preserving logistic regression. Besides issues addressed for linear regression, an additional challenge is to compute the logistic function $$f(u) = \frac{1}{1+e^{-u}}$$

on shared numbers. Note that the division and the exponentiation in the logistic function are computed on real numbers, which are hard to support using a 2PC for an arithmetic or Boolean circuit. Hence, prior work approximated the function using polynomials [10]. It can be shown that approximation using a high-degree polynomial is very accurate [33]. However, for efficiency reasons, the degree of the approximation polynomial in secure computation is set to 2 or 3, which results in a large accuracy loss of the trained model compared to logistic regression.

1. Secure Computation Friendly Activation Functions.

Instead of using polynomials to approximate the logistic function, we propose a new activation function that can be efficiently computed using secure computation techniques. The function is described in Equation 4 and drawn in FIG. 7.

$$f(x) = \begin{cases} 0, & \text{if } x < -\frac{1}{2} \\ x + \frac{1}{2}, & \text{if } -\frac{1}{2} \leq x \leq \frac{1}{2} \\ 1, & \text{if } x > \frac{1}{2} \end{cases} \quad (4)$$

A justification for this choice of activation is as follows, and its effectiveness has been confirmed with experiments. As mentioned in section II-A, the main reason logistic regression works well for classification problems is that the prediction is bounded between 0 and 1. Therefore, it is important for the two tails of the activation function to converge to 0 and 1, and both the logistic function and the function in Equation 4 have such behavior. In contrast, approximations with low degree polynomials fail to achieve this property. The polynomial might be close to the logistic function in certain intervals, but the tails are unbounded. If a data sample yields a very large input u to the activation function, $f(u)$ will be far beyond the [0,1] interval which affects accuracy of the model significantly in the backward propagation.

With the new activation function, computing the backward propagation can be performed in a variety of ways. For example, embodiments can use the same update function as the logistic function (i.e. continue to compute the partial derivative using the logistic function, which is not computationally intensive since the partial derivative of logistic function is a linear function). As another example, embodiments can compute the partial derivative of the new function and substitute it into the update function. We test both options and find that the first approach yields better accuracy matching that of using the logistic function. Therefore, we will use the first approach in the rest of the disclosure, except as noted below in table 1. One reason for lower accuracy of the second approach may be that by replacing the activation function, the cross entropy cost function is no longer convex; using the first approach, the update formula is very close to training using the distance cost function, which might help produce a better model.

We compare the accuracy of the produced model using the new activation function and polynomial approximation with different degrees. For the polynomial approximation, we fix the constant to ½ so that $f(0)=$½, although other values may be used. Then, we select as many points on the logistic function as the degree of the polynomial. The points are symmetric to the original, and evenly spread in the range of the data value (e.g., [0,1] for MNIST, [0,1000] for Arcene). The unique polynomial passing through all these points is selected for approximation. The test is run on the MNIST data with mini-batch size $|B|=128$. The series of random mini-batches are the same for all approaches. Here we train the models on plaintext data only.

As shown in Table 1, the performance of our approaches are much better than polynomial approximation. In particular, our first approach reaches almost the same accuracy (98.62%) as logistic regression, and our second approach performs slightly worse. On the contrary, when a degree 3 polynomial is used to approximate the logistic function, the accuracy can only reach 42.17%, which is even worse than a linear regression. The reason is that the tails diverge even faster than a linear activation function. When the degree is 5, the accuracy can reach 84%; when the degree is 10, the accuracy finally matches that of logistic regression. However, computing a polynomial of degree 10 in secure computation introduces a major overhead for privacy preserving training. Similar effects are also verified by experiments on the Arcene dataset.

TABLE 1

Accuracy (%) comparison of different approaches for logistic regression.

| | | Our approaches | | Polynomial Approx. | | |
|---|---|---|---|---|---|---|
| | Logistic | first | second | deg. 2 | deg. 5 | deg. 10 |
| MNIST | 98.64 | 98.62 | 97.96 | 42.17 | 84.64 | 98.54 |
| Arcene | 86 | 86 | 85 | 72 | 82 | 86 |

The function in the middle region, e.g., [−½,1/2] in this example, can be referred to as a the non-constant function. Other middle regions between two other constants, and thus a first constant can be a number other than −½ and a second constant can be a number other than ½. The activation function can take various forms in the region where the function is not a constant. For example, a slope other than 1 can be used. The non-constant function could be something besides linear in the middle region, between −½ and ½ in equation (4). For example, a quadratic could be used. This differs from the polynomial of degree 2 in table 1, as the other regions are still forced to be constant. The activation function can be constrained to be piecewise continuous, and thus reach the constant values at the boundaries of the middle (center) region. Further, the constants could be values other than 0 and 1, but this is still equivalent as there would be a simple scaling between the constants and 0 and 1.

2. The Privacy Preserving Protocol

The new activation function proposed above is circuit friendly. It only involves testing whether the input is within the [−½,1/2] interval. If the input is in the interval, then the non-constant function can be evaluated; but if the input is outside of the interval, then one of the two constants can be selected. This initial comparative test can be performed in a garbled circuit by shifting the input by ½ and using a particular bit to determine whether the result is positive or negative.

Applying Yao's garbled circuit protocol naively to the whole logistic regression would result in a huge circuit that is very inefficient. Instead, embodiments can take advantage of techniques to switch between arithmetic sharing and Yao sharing, as proposed in [18]. The observation is that as mentioned in Section II-A, the only difference between the SGD for logistic regression and linear regression is the application of an extra activation function in each forward propagation. Therefore, following the same protocol for privacy preserving linear regression, after computing the inner product of the input data and the coefficient vector, embodiments can switch the arithmetic sharing to a Yao sharing and evaluate the activation function using a garbled circuit. Then, embodiments can switch back to arithmetic sharing and continue the backward propagation.

Further implementations propose a more involved protocol to further optimize the circuit size, the number of interactions, and the number of multiplication triplets used. For example, only certain steps are put into a garbled circuit, and the rest is done using OT. A garbled circuit can be constructed as follows. Let $b_1=0$ if $u+½≥0$, where $b_1=1$ otherwise. Let $b_2=0$ if $u−½≥0$, where $b_2=1$ otherwise. Then, the activation function can be expressed as $f(u)=(\neg b_2)+(b_2 \wedge (\neg b_1))u+½$, where "$\wedge$" corresponds to a Boolean AND operation, and "$\neg$" corresponds to a bit negation. Thus, if u is greater than ½, then $b_2$ is 0 and the first term $(\neg b_2)$ will be 1; the second term will be zero since $b_2$ is 0, thereby providing $f(u)=1$. If u is less than −½, then $b_1$ is 1 and the second term will be 0 since $b_2$ will be 0; the second term will be zero since $b_2$ is 0 and $(\neg b_1)$ is 0, thereby providing $f(u)=0$. If u is greater than −½, then $b_1$ is 0 and if u is less than ½, then $b_2$ is 1, and thus the first term is 0 and the second term $(b_2 \wedge (\neg b_1))$ is 1, thereby providing $f(u)=u+½$.

To determine $b_1$, embodiments can construct a garbled circuit that takes the bits of $\langle u+½ \rangle_0$ and $\langle u \rangle_1$ as input, adds them, and sets $b_1$ as the most significant bit (msb) of the result (the msb indicates whether a value is positive or negative). To be more precise, the "+½" value is represented in the field and scaled to have the same number of bits representing the fractional part as u. In particular, since u is the product of two values (i.e., the input features and the weights) before truncation, "+½" is expressed as ½·$2^{l_u}$, where $l_u$ is the sum of bit-length of the decimal part in the data x and the coefficient w; we use +½ for ease of presentation.

$b_2$ can be computed in a similar fashion. For example, a garbled circuit can take the bits of $\langle u−½ \rangle_0$ and $\langle u \rangle_1$ as input, adds them, and sets $b_1$ as the most significant bit (msb) of the result (the msb indicates whether a value is positive or negative).

In some embodiments, instead of computing the rest of the function in the garbled circuit which would require a linear number of additional AND gates, the garbled circuit can output the Yao sharing (output labels) of the bits $(\neg b_2)$ and $b_2 \wedge (\neg b_1)$. A switch can be made to Boolean sharing (XOR sharing of two bits) of these bits and use them in two OTs to compute $\langle (\neg b_2)+(b_2 \wedge (\neg b_1))u \rangle$ and continue with the rest of the training. In particular, given Boolean shares of $b_2 \wedge (\neg b_1)$, the two servers perform one OT where one server plays the role of receiver in OT with its input being its share, while the other one plays the role of sender with two inputs $u_0$, and $u_0+r$ for a random r and its share of u, denoted $u_0$. The two servers perform another OT with the roles switched and then locally add their shares to obtain their share of the desired output. The detailed protocol is described in FIG. 8.

3. Efficiency Discussion.

The additional overhead of the logistic regression is very small. Most of the steps are the same as the linear regression protocol in Section IV-A. In addition, one garbled circuit protocol and 3 extra OTs are performed in each forward propagation. The garbled circuit performs two additions and one AND, yielding a total 2l−1 AND gates for each value u. The base OT for OT extension can be performed in the offline phase. Therefore, the total communication overhead is $|B|·t·((2l−1)·2\lambda+3l)$ for each party. Note that the garbled circuit and the messages in OTs from $S_0$ can be sent simultaneously to $S_1$. Thus, the logistic regression only introduces one more interaction per iteration, and yields a total of 3t interactions between the two parties. No extra multiplication triplets are required since there are no arithmetic operations for the activation function.

D. Privacy Preserving Neural Network Training

The techniques for linear and logistic regression extend to support privacy-preserving neural network training. The RELU function can be used as the activation function in each neuron, and the cross entropy function can be used as the cost function. The update function for each coefficient in each neuron can be expressed in a closed form as discussed in Section II-A. All the functions in both forward and backward propagation, other than evaluating the activation function and its partial derivative, involve only simple additions and multiplications, and are implemented using the same techniques discussed for linear regression. To evaluate the RELU function $f(u)=(u>0)·u$ (i.e., max(0,u)) and its derivative $f'(u)=(u>0)$, embodiments can use the same approach for logistic regression by switching to Yao sharing. A garbled circuit can add the two shares of u and output the most significant bit, which is simpler than the circuit used for the alternative logistic function discussed above. Note that both the RELU function and its derivative can be evaluated together in one interaction (e.g., the evaluations performed in parallel), and the result of the latter is used in the backward propagation.

We also propose an alternative to the softmax function $$f(u_i) = \frac{e^{-u_i}}{\sum_{i=1}^{d_m} e^{-u_i}}.$$

Each exponentiation can be replaced with a new piecewise function such that the results remain non-negative as intended by $e^{-u_i}$. For example, each piecewise function can be linear when exceeding a cutoff value, and a constant when exceeding the cutoff value in the other direction. In one embodiment, the piecewise function can be equal to 0 for $u_i > 1$, and $1-u_i$ for $u_i < 1$, where 1 is the cutoff value. Other cutoff values can be used, and the direction for the constant can be different, e.g., constant for less than the cutoff. More generally, there can be a numerator function and a denominator function. The numerator function can be a first constant when u, exceeds a first cutoff in one direction (e.g., less than) and is linear when u, exceeds the first cutoff in the opposite direction (e.g., greater than). The two directions can also be reversed. The denominator function can be a sum of all of the numerator functions of M nodes, each providing a value $u_i$.

The total sum can be computed by adding the outputs of all the piecewise functions, and dividing each output by the total sum using a division garbled circuit. In this way, the output is guaranteed to be a probability distribution. If the sum is 0, which means all the results of the piecewise functions are 0s, we assign the same probability to each output. This can be done using a garbled circuit. In the experiment section, we show that using an example neural network and training on the MNIST dataset, the model trained by TensorFlow (with softmax) can reach 94.5% accuracy on all 10 classes, while we reach 93.4% using our proposed function.

As we observe in our experiments, the time spent on garbled circuits to compute the RELU functions dominates the online training time of this protocol. Therefore, we also consider replacing the activation function with the square function $f(u)=u^2$, as recently proposed in [22] but for prediction only. The piecewise functions can still be used for approximating softmax. With this modification, we still can reach 93.1% accuracy. In this implementation, a garbled circuit computing a piecewise function can be replaced by a multiplication on shared values, and thus the online efficiency is improved dramatically. However, this approach consumes more multiplication triplets and increases cost of the offline phase.

1. Efficiency Discussion

In the online phase, the computation complexity is twice that of the plaintext training for the matrix arithmetic operations, plus the overhead of evaluating the RELU functions and divisions using garbled circuits and OTs. The experiments discussed below use the division circuit from the EMP toolkit [3], which has $O(l^2)$ AND gates for l-bit numbers. The total communication is the sum of the sizes of all matrices involved in the matrix multiplication and element-wise multiplication, which is $O(t \cdot \Sigma_{i=1}^{m}(|B| \cdot d_{i-1} + d_{i-1} \cdot d_i))$. The total number of iterations is $5m \cdot t$.

In the offline phase, the total number of multiplication triplets is increased by a factor of $O(\Sigma_{i=1}^{m} d_m)$ compared to regression, which is exactly the number of neurons in the neural network. Some of the multiplication triplets can be generated in the matrix form to perform online matrix multiplication. Others need to be generated independently for element-wise multiplications. We show the cost experimentally in Section IV-C.

E. Predictions and Accuracy Testing

The techniques developed so far can also be used to securely make predictions, since the prediction is the forward propagation component of one iteration in the training. Embodiments can hide the data, the model, the prediction, or any combinations of them, as they can all be secret shared.

Similarly, embodiments can also test the accuracy of the current model after each epoch securely, as the accuracy can be computed as an aggregated result of the predictions on testing data. This accuracy can be used to adjust the learning rate or decide when to terminate the training, instead of using a fixed learning rate and training the model by a fixed number of epochs. A detailed discussion can be found below.

1. Prediction

Privacy-preserving predictions can be performed the same as computing the predicted value for linear regression, logistic regression, and neural networks: the cost is only half of one iteration. If either the input data or the model can be revealed (i.e., not hidden, as mentioned above), the efficiency can be further improved. For example, if the model is in plaintext, the multiplications of the input data with the coefficients can be computed directly on the shares without precomputed multiplication triplets.

In classification problems, the prediction is usually rounded to the closest class. For example, in logistic regression, if the predicted value is 0.8, the data is likely to be classified as 1, and the exact result may reveal extra information on the input. This rounding can be viewed as testing whether a secret shared value minus ½ is larger than 0, and can be supported by applying an extra garbled circuit, similar to how the logistic function in equation (4) can be computed. The garbled circuit can add the two shares and output the most significant bit.

2. Accuracy Testing

One way to decide the learning rate is to test it on some insensitive data of the same category beforehand, and set it to a constant without any adjustment throughout training. Similarly, the number of iterations can be fixed in advance.

At the cost of some leakage (mentioned at end of this section), another implementation can enable adjusting the rate and number of iteration in the same fashion as plaintext training. To do so, embodiments can test the accuracy of the current model after each epoch on a testing dataset. A privacy-preserving prediction can be determined for each testing data sample. Then, it can be determined whether the prediction is the same as the label (output value of the training sample), e.g., a difference (accuracy) result between the predicted output and the actual output can be determined. The difference can be binary (e.g., 0 or 1, equivalent to True or False), a fraction (rational number), or a real number. The individual results can be aggregated to provide an aggregated result (e.g., by summing, which may be a weighted sum with different weights for different training samples).

A difference result can be determined using a simple garbled circuit to perform the equality test, in which the number of gates is linear in the bit length of the values. Finally, each training computer can sum up all the secret-shared results of the equality tests as a shared accuracy. The cost of the equality tests is only half of an iteration, plus some extra garbled circuits for any rounding and the equality testing. As the size of the testing data is usually significantly smaller than the training data, the time spent on the accuracy testing is only a small portion of the training.

To adjust the learning rate, the shared accuracy of two epochs can be compared using a garbled circuit. The learning rate can be reduced if the accuracy is decreasing. The aggregated accuracy result can be compared to a threshold (e.g., using a garbled circuit), and the training can be terminated if the accuracy result is less than the threshold, thereby confirming convergence of the model. The aggregated accuracy result can be a single value per epoch and be independent of the number of the training and testing data samples, thus the overhead is negligible. In each epoch, whether or not the learning rate is adjusted or the training is terminated, one extra bit of information is leaked, hence providing a trade-off between the efficiency (reduced number of epochs) and security, as compared to using a fixed learning rate and a fixed number of iterations.

V. EXAMPLE METHODS

Example methods are described for making privacy-preserving machine learning more efficient. For example, a method of truncation for multiplications in privacy-preserving machine learning is provided. And, methods of using various activations that are computationally efficient are provided.

A. Truncation

Figure 9:
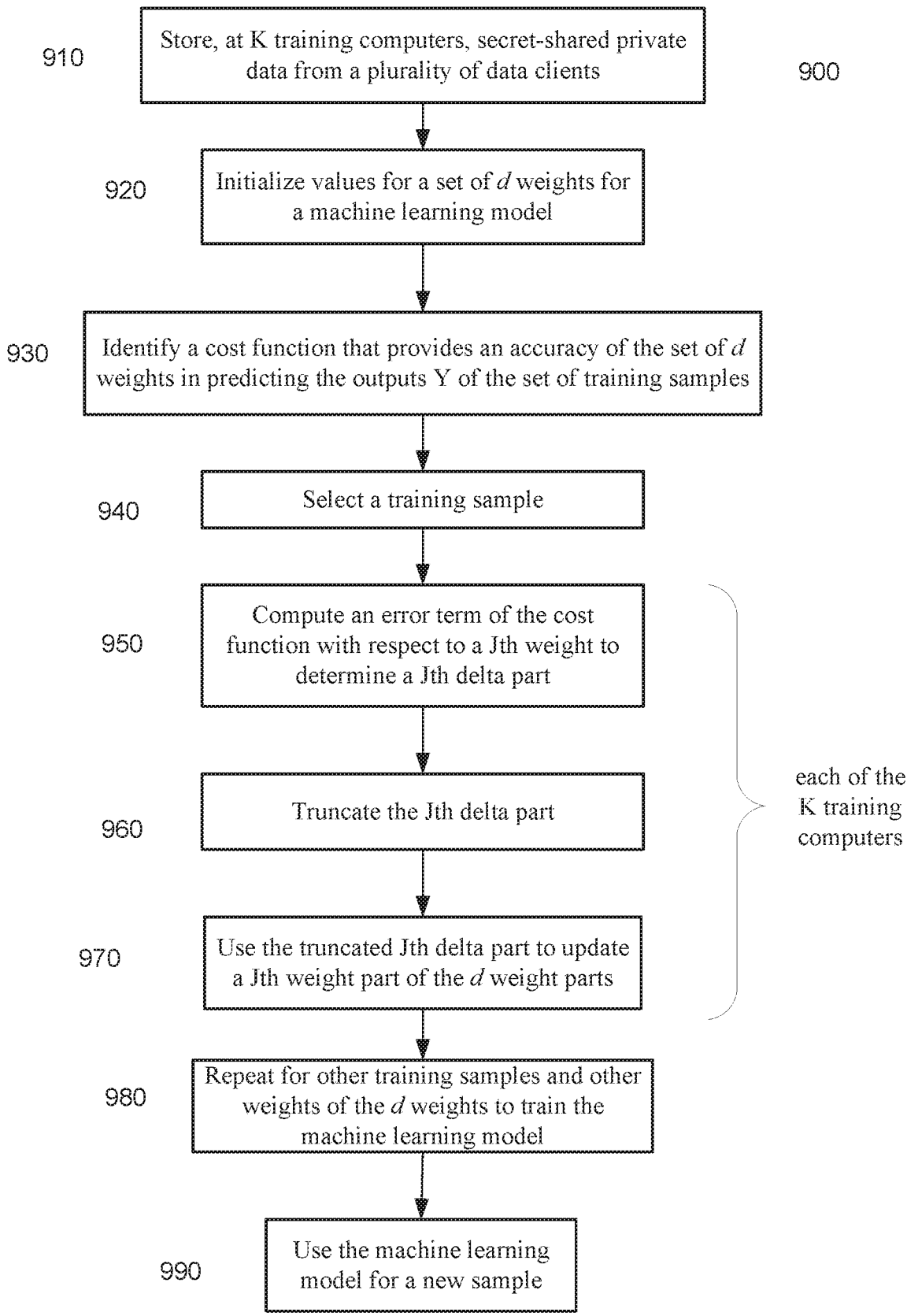
FIG. 9 shows a flowchart of a method of performing privacy-preserving machine learning using secret-sharing, multiplication triplets, and truncation according to embodiments of the present invention.

FIG. 9 is a flowchart of a method 900 of performing privacy-preserving machine learning according to embodiments of the present invention. Method 900 can be performed by training computers, e.g., servers 230 and 240 in FIG. 2. Method 900 can use secret-sharing, multiplication triplets, and truncation according to embodiments of the present invention.

At block 910, K training computers store secret-shared private data from a plurality of data clients, where K is two or more. The data clients can be as described in FIG. 2. In some embodiments, one or more of the data clients can be a training computer. The K training computer can store the secret-shared private data after generation of the shares of the private data. For example, each client can generate shares of its own private data and then send each share to one of the servers.

Various types of secret-sharing private data can be used, e.g., additive sharing, Boolean sharing, and Yao sharing. Each data item of the private data can be represented by K parts when secret-shared. For training the model, the secret-shared private data includes a set of training samples, each having d features and an output Y. The d features can be measured or otherwise obtained from a training sample, e.g., an event (e.g., a cyberattack), a physical sample (e.g., a patient), or electronic communications relating to accessing a resource (e.g., an account, a building, a database record, or an account). The output Y of a training sample can correspond to a known classification that is determined by a separate mechanism, e.g., based on information that is obtained after the d features (e.g., that a patient did have a disease or a transaction was fraudulent) or done manually.

In some embodiments, at least some of the d features are decimal values that are shifted to generate integers. Other features may originally be integers. These integers can be multiplied as part of a training process. Such multiplication can create a result that has more digits than the numbers being multiplied. Later steps can truncate the results so as to reduce storage size and computational effort, but while not significantly reducing accuracy.

At block 920, values for a set of d weights are initialized for a machine learning model. For example, the weights can be initialized to random values or all 0s. As another example, the weights can be set to values from a previous training iteration using the same or different training samples. In this manner, an estimate can be made as to that the final weights might be, thereby reducing the overall time for training the model. In some embodiments, the weights can be secret-shared among the K training computers, and thus the model can be kept secret as well as the private data. In other embodiments, the weights are not secret-shared. The weights and the features can be stored as integers, which can provide greater efficiency than using floating point numbers.

In some embodiments, the d weights can be all of the weights of the model, e.g., for linear regression. In other embodiments, the d weights can be the weights for a particular node of a particular layer of a neural network. Thus, other weights can exist in the model. The model can have at least d features.

At block 930, a cost function is identified that provides an accuracy of the set of d weights in predicting the outputs Y of the set of training samples. The type of cost function can depend on the machine learning model used. Examples of cost functions are provided in section II, and include a sum of the squared error and a cross entropy function. The identification of the cost function can be implicit by use of code that updates the weights according to a particular technique. As described in section II, the different cost functions can result in different formula for updating the weights. The cost function can be selected from a set of cost functions, e.g., by selecting a definition of the cost function or by selecting the code that uses a cost function. In some implementations, a definition of the cost function can be provided in a file (e.g., in the code or read from an input file), and the cost function can be evaluated across the training samples, e.g., to provide a current accuracy of the model for the set of training samples.

At block 940, a training sample is selected. The training sample can be selected randomly, and then used for updating the weights. After weights are updated based on the selected training sample, another training sample can be selected. In some embodiments, each of the training samples can be used to update the weights in a single pass (epoch) of the training process. In some implementations, more than one sample can be used at a time for updating the weights.

Blocks 950-970 are performed by each of the K training computers. Blocks 950-970 can be used to update a Jth weight, or more specifically to update K weight parts (one weight part for each training computer) of the Jth weight. Blocks 950-970 can be repeated for other weights of the set of d weights. The Jth weight can be any one of the d weights.

At block 950, an error term of the cost function is computed with respect to a Jth weight to determine a Jth delta part. The error term can provide information about the error of a current version of the model (i.e., at a current state of training) with respect to the expected output Y for the selected training sample. This error term can provide information about how to update the Jth weight, as well as other weights. The error term can include a gradient, which can correspond to all or part of a backward propagation term. Non-gradient techniques can also be used, such as the Rosenbrock algorithm, Nelder Mead Algorithm, genetic algorithms, simulated annealing, and ant colony algorithms.

The Jth delta part can correspond to the share of a Jth delta term of a particular training computer. The Jth delta term can correspond to a backpropagation term. The Jth delta term can be used to update the Jth weight Multiple weights can be updated at once, e.g., in a mini-batch mode, as described in section II-A-2.

Section II-A-1 provides an example error term of $(y_i^* - y_i)$, which may be part of a larger term of $\alpha(y_i^* - y_i)x_{ij}$, which can be the Jth delta term. Section II-A-3 provides another example error term of $(f(X_B \times w) - Y_B)$, where the Jth delta term can be provided in $X_B^T \times (f(X_B \times w) - Y_B)$. Section II-A-4 provides another example error term of $$Y_i = (Y_{i+1} \times W_i^T) \odot \frac{\partial f(U_i)}{\partial U_i},$$

where the Jth delta term can be provided as $X_i \times Y_i$.

Accordingly, computing the error term can include performing a first multiplication using d feature parts of the selected training sample and d weight parts in determining a forward part (e.g., one of K forward parts). As examples, the forward part can correspond to $y_i^* = x_i \cdot w$, $f(X_B \times w)$, and $X_i = f(X_{i-1} \times W_i)$. The first multiplication can be performed using a first multiplication triplet of random integers, as described herein. Collectively, the forwards parts can comprise a secret-shared forward propagation result from a product of the d features and the d weights.

In some embodiments, determining the Jth delta part further includes determining a difference part as the error term (e.g., $(f(X_B \times w) - Y_B)$ or step 6 in FIG. 5) using the forward part and an output Y part. The difference parts can comprise a secret-shared difference. A second multiplication can multiply the difference part and a Jth feature part of a Jth feature to obtain a Jth delta part, e.g., $(y_i^* - y_i) x_{ij}$ or step 8 in FIG. 5. The second multiplication can use a second multiplication triplet of random integers, e.g., as described herein.

In FIG. 5, the forward part can be computed in step 5. In FIG. 8, additional steps may be performed, e.g., steps 2-8 to obtain the forward parts for logistic regression. In FIG. 5, the Jth delta parts can be determined in step 8.

At block 960, the Jth delta part is truncated. The truncation can be performed as described herein. The truncation can be performed at various times. For example, the truncation can be performed every time a delta part is determined. In other embodiments, the truncation can be performed periodically for every Nth time a particular delta part is determined, where N is greater than 1. Truncation is shown at step 9 in FIG. 5.

The truncation can be performed in various ways. For example, a difference part can be truncated before a second multiplication. This can be accomplished by truncating the forward result at step 5 of FIG. 5. Such truncation can also control the size of the delta part.

At block 970, the truncated Jth delta part is used to update a Jth weight part of the d weight parts. The updating can include using a learning step α, e.g., as depicted in step 10 of FIG. 5. A normalization factor |B| can be used when more than one training sample is used per iteration, e.g., a described herein for a mini-batch mode.

In some embodiments, multiple weights can be updated in one operation. For example, a delta part vector can be generated for updating the weight vector of d weights. A second multiplication (e.g., step 8 in FIG. 5 or $(Y_i^* - Y_i) \times X$) can include multiplying the difference part by each of the d feature parts to obtain d delta parts of the delta part vector. The d delta parts can be truncated, and the truncated delta parts used to update the d weight parts.

As part of a batch mode, the training sample can be selected as part of a batch of B training samples that is selected randomly. The first multiplication can uses a matrix X of B×d dimensions and an output Y vector of B outputs to form a forward part vector. The second multiplication can use the matrix X and a difference part vector of length d to form the delta part vector.

At block 980, blocks 940-980 can be repeated for other training samples and other weights of the d weights to train the machine learning model. The training process can proceed until one or more convergence criteria are met. Often, no more than two epochs are required for reaching convergence. Once the machine learning model is generated, it can be used in a production mode.

At block 990, the machine learning model is used for a new sample. The model can provide an output label for the new sample based on d features of the new sample. The new sample having d features (e.g., indicated as X herein) can be received from any one of the clients used for training, or a new client. The client can secret-share the features of the new sample with the training computers, each of which can apply the final (optimized) weight parts of the model to the d feature and intermediate values to obtain output parts. The predicted output Y' for the new sample can be reconstructed from the parts stored at the training computers. Other intermediate values can be reconstructed, but some embodiments may only reconstruct the final output Y'. Other embodiments can reconstruct the d weights using the d weight parts at each of the K training computers to obtain the model, which can then be used by a single computer to determine a predicted output for a new sample.

B. Piecewise Activation Functions

Figure 10:
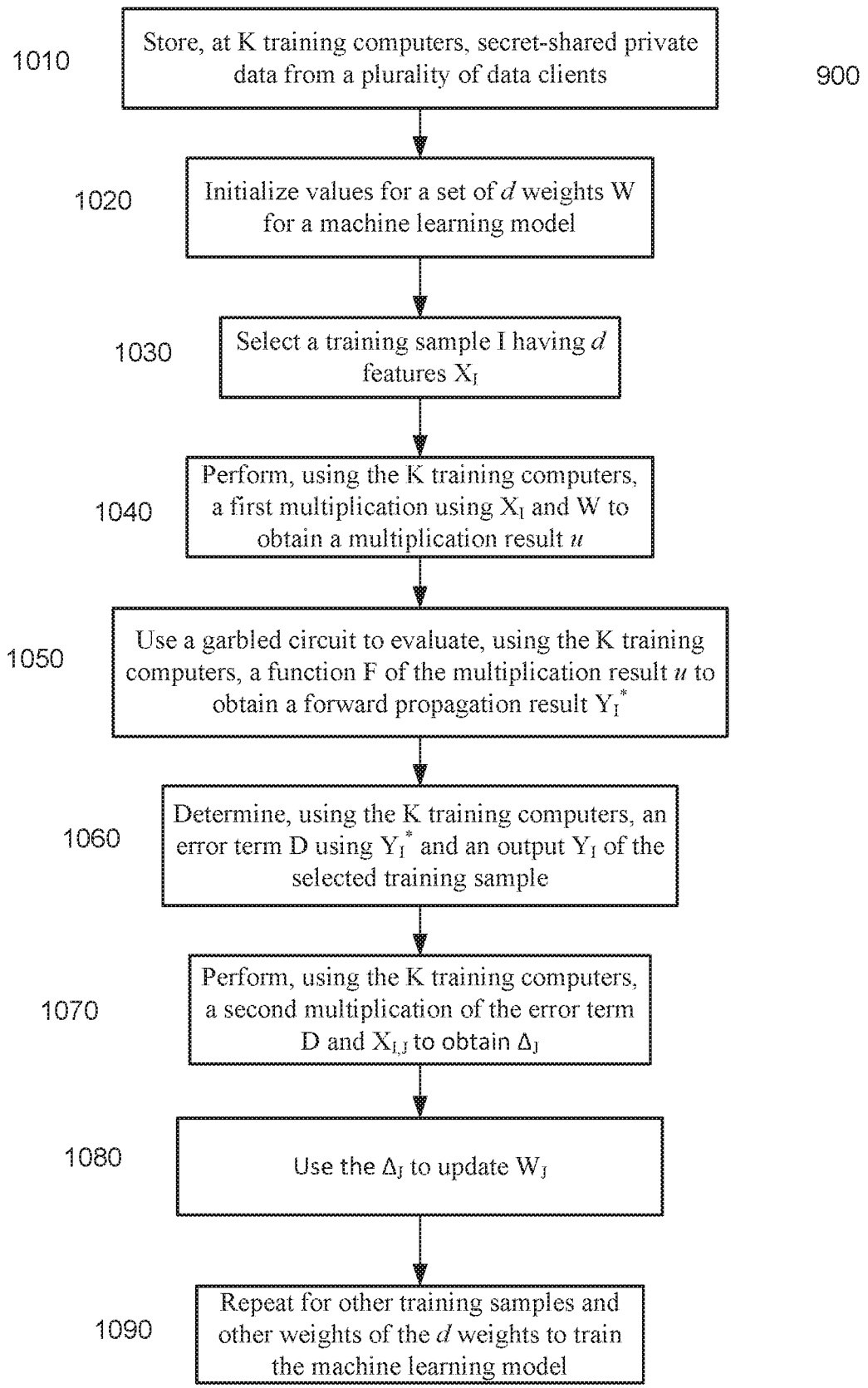
FIG. 10 shows a flowchart of a method of performing privacy-preserving machine learning using secret-sharing and a piecewise activation function according to embodiments of the present invention.

FIG. 10 is a flowchart of a method 1000 of performing privacy-preserving machine learning according to embodiments of the present invention. Method 1000 can be performed by training computers, e.g., servers 230 and 240 in FIG. 2. Method 1000 can use secret-sharing and a piecewise activation function according to embodiments of the present invention.

At block 1010, K training computers store secret-shared private data from a plurality of data clients, where K is two or more. Block 1010 may be performed in a similar manner as block 910.

At block 1020, values for a set of d weights are initialized for a machine learning model. Block 1020 may be performed in a similar manner as block 920.

At block 1030, a training sample I having d features $X_I$ is selected. Block 1030 may be performed in a similar manner as block 940. $X_I$ can be a vector when just one training sample is selected, but can be a matrix when more than one training sample is selected, e.g., when operating in a batch mode.

At block 1040, the K training computers perform a first multiplication using $X_I$ and W to obtain a multiplication result u. The first multiplication can be performed in various ways, e.g., using oblivious transfer, garbled circuits, and/or multiplication triplets. Thus, parts of the multiplication result u can be secret-shared across the K training computers. Examples of such multiplications are provided in section II and for method 900.

At block 1050, the K training computers evaluate, using a garbled circuit, a function F of the multiplication result u to obtain a forward propagation result $Y_I^*$. The garbled circuit can be used to keep the shared parts of the data to be secret. As an example, the forward propagation result can correspond to $f(X_I \times W)$. Examples functions F are provided in sections IV-C and IV-D. For instance, a function in equation (4) can be used or an alternative to a softmax function can be used, as provided in section IV-D.

In the example of FIG. 5, the forward propagation result $Y_I^*$ can be computed in step 5. In FIG. 8, additional steps may be performed, e.g., steps 2-8 to obtain the forward parts for logistic regression. In the forward propagation for layers of a neural network, the matrix $X_i$ of the ith layer can be computed as $X_i = f(X_{i-1} \times W_i)$.

At block 1060, the K training computers determine an error term D using $Y_I^*$ and an output $Y_I$ of the selected training sample. Examples of an error term are provided for method 900 as well as in section II-A-3 and section II-A-4. Section II-A-3 provides an example error term of $(f(X_B \times w) - Y_B)$. Section II-A-4 provides another example error term of $$Y_i = (Y_{i+1} \times W_i^T) \odot \frac{\partial f(U_i)}{\partial U_i}.$$

In some embodiments, a difference term can be determined as the error term (e.g., $(f(X_B \times w) - Y_B)$ or step 6 in FIG. 5) using the forward propagation result $Y_I^*$ and an output Y part. The difference parts can comprise a secret-shared difference.

At block 1070, the K training computers perform a second multiplication of the error term D and a Jth element $X_{I,J}$ of $X_I$ to obtain a Jth delta $\Delta_J$. Section II-A-3 provides an example, where $\Delta_J$ can include $X_B^T \times (f(X_B \times w) - Y_B)$. Section II-A-4 provides another example, where $\Delta_J$ can include $X_i \times Y_i$. The second multiplication can be performed using one or more multiplication triplets.

At block 1080, the delta $\Delta_J$ is used to update $W_J$. The updating can include using a learning step $\alpha$, e.g., as depicted in step 10 of FIG. 5. A normalization factor |B| can be used when more than one training sample is used per iteration, e.g., a described herein for a mini-batch mode.

At block 1090, blocks 1030-1080 can be repeated for other training samples and other weights of the d weights to train the machine learning model. The training process can proceed until one or more convergence criteria are met. Often, no more than two epochs are required for reaching convergence. Once the machine learning model is generated, it can be used in a production mode. Therefore, the model can be used for a new sample, e.g., as described for block 990.

1. Efficient logistic-like function

One example of an activation function F is: a first constant when the multiplication result u is less than a first cutoff, a second constant when the multiplication result u is greater than a second cutoff, and a monotonically changing function between the first constant and the second constant when u is between the first cutoff and the second cutoff. The first cutoff and the second cutoff can be various values, with the second cutoff being greater than the first cutoff. The first constant and the second constant can be various values, and the monotonically changing function can be increasing or decreasing monotonically. Thus, either one of the first constant and the second constant can be higher than the other.

The garbled circuit may be implemented as described in section IV-C-2. As an example, the garbled circuit can determine whether $Y_I^*$ is less than the first cutoff by receiving $Y_I^*$ parts with one part added to the first constant (e.g., $\langle u+\frac{1}{2}\rangle_0$. The $Y_I^*$ parts (e.g., $\langle u+\frac{1}{2}\rangle_0$ and $\langle u\rangle_1$) to obtain a first result. It can be determined that $Y_I^*$ is less than the first cutoff when the most significant bit of the first result is 0.

It can be determined whether $Y_I^*$ is less than the second cutoff in the following manner. $Y_I^*$ parts can have the first constant subtracted from one part (e.g., $\langle u-\frac{1}{2}\rangle_0$. The $Y_I^*$ parts ($\langle u-\frac{1}{2}\rangle_0$ and $\langle u\rangle_1$) can be added to obtain a second result. It can be determined that $Y_I^*$ is greater than the second cutoff when the most significant bit of the second result is 1. The garbled circuit can use two variables $b_1$ and $b_2$ to evaluate the function F as $(\neg b_2)+(b_2 \wedge (\neg b_1))Y_I^*+C$. C corresponds to constant, which may be zero, depending on the cutoff values and the two constants. For example, C can correspond to a vertical intercept (commonly referred to as a y-intercept) of the monotonically changing function, and can be $\frac{1}{2}$ in the example above. In this example, $b_1$ can equal the most significant bit of the first result, and $b_2$ can equal the most significant bit of the second result.

In some embodiments, the monotonically changing function can be linear (e.g., as in equation 4). F include a constant C (e.g., $\frac{1}{2}$) as a vertical intercept, and wherein F is provided as $(\neg b_2)+(b_2 \wedge (\neg b_1))Y_I^*+C$.

As mentioned in section IV-C-2, a switch can be made between Yao sharing (oblivious transfer) and another type of sharing, e.g., Boolean sharing. Accordingly, in some implementations, the garbled circuit can output $(\neg b_2)$ and $(b_2 \wedge (\neg b))$, and F can be evaluated using oblivious transfer.

2. Efficient Activation Function for Multiple Classifications

In some embodiments, the activation function may receive more than one value u, e.g., receiving values from a plurality of nodes. Such nodes might be a last hidden layer of a neural network, or effectively as an output layer, with the activation function being applied by each node. Such an activation function can be suited for models that can accommodate more than two classification. In such instances, a probability can be provided for each classification (e.g., where each node of the last layer corresponds to one of the classifications).

As described in section IV-D, the activation function can be a ratio of a numerator function and a denominator function. The numerator function can have an input of a multiplication result $u_1$ of an Lth node (e.g., as determined from a multiplication of X and $W_L$—the weights of the Lth node), and the denominator can received multiplication results of other nodes, which may be in a same layer. The numerator function can be a first constant when the multiplication result $u_1$ exceeds a first cutoff in one direction and is monotonically changing function (e.g., a linearly increasing function) when u, exceeds the first cutoff in the opposite direction. The denominator function can be a sum of all of the numerator functions of the M nodes.

For embodiments that involve multiple nodes and such an activation function, block 1040 of method 1000 can determine a multiplication result u, corresponding to an Lth node of M nodes of the machine learning model. In block 1050, the corresponding forward propagation result $Y_{I,L}^*$ can be specific to that node. In block 1060, the error term D for the Lth node can be determined using $Y_{I,L}^*$ and an output $Y_i$ of the selected training sample.

VI. EXPERIMENTAL RESULTS

We provide experimental results of various implementations of privacy preserving machine learning systems and methods. The settings and techniques used to determine the experimental results are merely examples of various embodiments.

A. Implementation

The system is implemented in C++. In all our experiments, the field size is set to $2^{64}$. Hence, we observe that the modulo operations can be implemented using regular arithmetic on the unsigned long integer type in C++ with no extra cost. This is significantly faster than any number-theoretic library that is able to handle operations in arbitrary fields. For example, we tested that an integer addition (multiplication) is 100× faster than a modular addition (multiplication) in the same field implemented in the GMP [5] or the NTL [7] library. More generally, any element in the finite field $Z_{2^l}$ can be represented by one or several unsigned long integers and an addition (multiplication) can be calculated by one or several regular additions (multiplications) plus some bit operations. Such an implementation enjoys the same order of speedup compared to using general purpose number theoretic libraries. We use the Eigen library [2] to handle matrix operations. OTs and garbled circuits are implemented using the EMP toolkit [3]. The example system implements the OT extension of [11], and applies free XOR [30] and fixed-key AES garbling [12] optimizations for garbled circuits. Details can be found in [45]. We use the cryptosystem of DGK [17] for LHE, implemented by Demmler et. al. in [18].

Regarding experimental settings, the experiments are executed on two Amazon EC2 c4.8xlarge machines running Linux, with 60 GB of RAM each. For the experiments on a LAN network, we host the two machines in the same region. The average network delay is 0.17 ms and the bandwidth is 1 GB/s. The setting is quite representative of the LAN setting, as we further tested that two computers connected by a cable have similar network delay and bandwidth. For the experiments on a WAN network, we host the two machines in two different regions, one in the US east and the other in the US west. The average network delay is 72 ms and the bandwidth is 9 MB/s. We collected 10 runs for each data point in the results and report the average.

Regarding data sets in the experiments, we use the following datasets. The MNIST dataset [6] contains images of handwritten digits from "0" to "9". It has 60,000 training samples, each with 784 features representing 28×28 pixels in the image. Each feature is a grayscale between 0-255. (It can be scaled to be within 0 and 1, but the number of bits to represent the data remains unchanged.) To show the scalability of our system when increasing the feature vector, we also use the Gisette dataset [4], [25], which contains images of digits "4" and "9". It has 13,500 samples and 5,000 features between 0~1,000. To further justify the accuracy of our protocols, we also use the Arcene dataset [1], 1251. It contains mass-spectrometric data and is used to determine if the patient has cancer. There are 200 data samples with 10,000 features. Each value is between 0 and 1000. All of the datasets are drawn from the real world.

B. Experiments for Linear Regression

We start with the experimental results for our privacy-preserving linear regression protocols in different settings, and compare it with plaintext training and previous privacy-preserving solutions.

1. Online Phase

To examine how the online phase scales, we run experiments on datasets with size n (number of training samples) from 1,000 to 1,000,000 and d (number of input features per training sample) from 100 to 1,000. When n≤60000 and d≤784, the samples are directly drawn from the MNIST dataset. When n and d are larger than that of MNSIT, we duplicate the dataset and add dummy values for missing features. Note that when n,d,E are fixed, the actual data used in the training does not affect the running time.

FIG. 9A shows the results in the LAN setting. "PP Linear 1" denotes privacy-preserving linear regression with multi-plication triplets in matrix form, and "PP Linear 2" denotes the online phase of the client-aided variant. The running time reported is per server, and the two servers take roughly the same time based on our experiments. The learning rate is predetermined, and we do not count the time to find an appropriate learning rate in the figures. "Linear C++" is the plaintext linear regression we implemented in C++, and "Linear TensorFlow" is the plaintext linear regression implemented using the TensorFlow library [8] in Python. The number of features is fixed to 784 and n varies from 1,000 to 1,000,000.

As shown in FIG. 9A, in the LAN setting, the running time for one server in our standard version of linear regression is only twice slower than training on plaintext data. In particular, it only takes 22.3 seconds to train a linear model securely on 1 million data samples with 784 features each, while the plaintext training takes 10.9 seconds. This overhead is even smaller than the gap between implementations in C++ and Python as it takes 47.6 seconds to train the model using TensorFlow, a highly optimized machine learning framework implemented in Python. From 22.3 seconds needed for privacy preserving training, only a small portion, namely less than 2 seconds, is spent on the network delay for the interactions. The communication time to transfer the data is negligible given the high bandwidth of the LAN network. PP Linear 2 using client-generated multiplication triplets has an overhead of roughly 3.5×. In particular, it takes 77.6 seconds to train the model with n=1,000,000 and d=784. As shown in FIGS. 9A and 9B, the running time of the protocols scale linearly with both n and d. We also observe that the SGD for linear and logistic regressions on all the datasets we tested always converge within the first epoch, and terminate after the second epoch, which confirms that the SGD is very effective and efficient in practice.

Implementations may not beat TensorFlow if implemented in Python, as TensorFlow incorporates various optimizations including parallelization, distributed training, and GPU optimizations, which are not enabled in our experiments. Instead, our experiments show the potential for our techniques to be scalable and applicable in practice, and to be integrated into existing machine learning tools such as TensorFlow.

FIG. 9C shows the corresponding performance on a WAN network. The performance of the plaintext training algorithms remain unchanged as they are executed on a single machine with no interaction. However, the running time of the privacy-preserving protocols increase significantly. In particular, PP Linear 1 takes 2291.8 seconds to train the model when n=1,000,000 and d=784. The reason is that now the network delay is the dominating factor in the training time. The computation time is exactly the same as the LAN setting, which is around 20 seconds; the communication time is still negligible even under the bandwidth of the WAN network. The total running time is almost the same as the network delay times the number of iterations.

PP Linear 1 is still roughly 3.3× slower than PP Linear 2, but the reason is different from the LAN setting. In the WAN setting, this overhead comes from the increment of the communication, as explained in Section IV-B-3. Even under this big network delay in the WAN network, as we will show later, the performance of our privacy preserving machine learning is still orders of magnitude faster than the state of the art. Besides, it is also shown in FIG. 9C that the training time grows linearly with the number of the samples in WAN networks. However, in FIG. 9D, when fixing n=10,000, the training time of PP Linear 1 only grows slightly when d increases, which again has to do with the fact that number of iterations is independent of d. The overhead of PP Linear 2 compared to PP Linear 1 increases with d, because the communication grows linearly with d in the second protocol. When d=100, the training time is almost the same as the first protocol, as it is dominated by the interaction; when d=1000, the training time is 4× slower because of the overhead on communication.

Embodiments can improve the performance in the WAN setting by increasing the mini-batch size, in order to balance the computation time and the network delay. FIG. 10 shows the result of this parameter tweaking. We let n=10,000 and d=784 and increase |B| to measure its effect on performance. As shown in FIG. 10, the running time decreases when the mini-batch size is increased. In particular, it takes 6.8 seconds to train the model in PP Linear 1 when |B|=512, which is almost 4 times faster than the time needed when |B|=128. This is because when the number of epochs is the same, the number of iterations (or interactions) is inversely proportional to the mini-batch size. When the mini-batch size increases, the computation time remains roughly unchanged, while the time spent on interaction decreases. However, the running time cannot always keep decreasing when |B| is further increased. When the computation time dominates, the running time will remain unchanged. Furthermore, if |B| is set too large, the number of iterations is too small in an epoch such that the model may not reach the optimum weights (or other parameters) as fast as before, which may result in an increase in the number of necessary epochs E, which itself can affect the performance. Mini-batch size can be determined based on the speed up of vectorization, parallelization, and robustness of the model in plaintext training. In the privacy-preserving setting, the network condition (e.g., LAN or WAN) should also be taken into consideration and find an appropriate mini-batch size to optimize the training time.

2. Offline Phase

The performance of the offline phase is summarized in Table 2. We report the running time on LAN and WAN networks and the total communication for OT-based and LHE-based multiplication triplets generation. For the client-aided setting, we simulate the total computation time by generating all the triplets on a single machine. We report its total time and total communication, but do not differentiate between the LAN and WAN settings, since in practice the data would be sent from multiple clients with different network conditions. As a point of reference, we also include the dataset size assuming each value is stored as 64-bit decimal number. We vary n from 1000 to 100,000 and d from 100 to 1000. The mini-batch size is set to 128 and the number of epochs is set to 2, as we usually only need 2 epochs in the online phase. If more epochs are needed, all the results reported in the table would grow linearly with the number of epochs.

3 ms, which is around 10,000× slower than one OT (when using OT extension). However, the LHE-based approach yields the best communication. As calculated in Section IV-B, the asymptotic complexity is much smaller than the dataset size. Taking the large ciphertext (2048 bits) into consideration, the overall communication is still on the same order as the dataset size. This communication introduces almost no overhead when running on both LAN and WAN networks. Unlike the online phase, the offline phase only requires 1 interaction, and hence the network delay is negligible.

The performance of the OT-based multiplication triplets generation is much better in the LAN setting. In particular, it only takes 80.0 seconds for n=10,000 and d=1,000. It introduces a huge overhead on the communication, namely 19 GB, while the data is only 76 MB. This communication overhead makes the running time much slower on WAN networks. Because of this communication overhead, which is the major cost of OT, the total running time is even slower than the LHE-based generation on WAN networks.

Finally, the client-aided multiplication triplets generation is the fastest because no cryptographic operation is involved. It only takes 4.0 seconds for n=10,000 and d=1,000. The overhead on the total communication is only around 9 times the dataset size which is acceptable in practice.

It is also shown in Table 2 that all the running times grow roughly linearly with both n and d, which agrees with the asymptotic complexity derived in Section IV-B. The number of encryptions and decryptions in the LHE-based generation is O(|B|+d). As |B| is fixed to 128, its running time does not grow strictly linearly with d, as reflected in Table 2.

Combining the results presented for both the online and the offline phase, embodiments are still quite efficient. For example, in the LAN setting, when client-aided multiplication triplets are used, it only takes 1.0 second for privacy-preserving linear regression in the online phase, with n=10,000 and d=1,000. The total time for the offline phase is only 4.0 seconds, which would be further distributed to multiple

TABLE 2

Performance of the offline phase.

| | | LHE-based | | | OT-based | | | Client aided | | Dataset size |
|---|---|---|---|---|---|---|---|---|---|---|
| | | LAN | WAN | Communication | LAN | WAN | Communication | Time | Communication | |
| *n = 1,000 | d = 100 | 23.9 s | 24.0 s | 2 MB | 0.86 s | 43.2 s | 190 MB | 0.028 s | 7 MB | 0.8 MB |
| | d = 500 | 83.9 s | 84.8 s | 6 MB | 3.8 s | 210.6 s | 1 GB | 0.16 s | 35 MB | 3.8 MB |
| | d = 1000 | 158.4 s | 163.2 s | 10 MB | 7.9 s | 163.2 s | 1.9 GB | 0.33 s | 69 MB | 7.6 MB |
| *n = 10,000 | d = 100 | 248.4 s | 252.9 s | 20 MB | 7.9 s | 420.2 s | 1.9 GB | 0.33 s | 69 MB | 7.6 MB |
| | d = 500 | 869.1 s | 890.2 s | 60 MB | 39.2 s | 2119.1 s | 9.5 GB | 1.98 s | 344 MB | 38 MB |
| | d = 1000 | 1600.9 s | 1627.0 s | 100 MB | 80.0 s | 4097.1 s | 19 GB | 4.0 s | 687 MB | 76 MB |
| *n = 100,000 | d = 100 | 2437.1 s | 2478.1 s | 200 MB | 88.0 s | 4125.1 s | 19 GB | 3.9 s | 687 MB | 76 MB |
| | d = 500 | 8721.5 s | 8782.4 s | 600 MB | 377.9 s | 20000 s* | 95 GB | 20.2 s | 3435 MB | 380 MB |
| | d = 1000 | 16000 s* | 16100 s* | 1000 MB | 794.0 s | 40000 s* | 190 GB | 49.9 s | 6870 MB | 760 MB |

|B| = 128 and E = 2.
*means estimated.

As shown in table, the LHE-based multiplication triplets generation is the slowest among all approaches. In particular, it takes 1600.9 seconds for n=10,000 and d=−1,000. The reason is that each basic operation in LHE, i.e., encryption, decryption, and exponentiation is very slow, which makes the approach impractical. For example, one encryption takes clients in practice. When OT-based generation is used, the online phase takes 0.28 seconds and the offline phase takes 80.0 seconds. In comparison, the plaintext training implemented using TensorFlow takes 0.64 seconds. The overhead always remains the same as both our algorithms and the plaintext training scales linearly in n and d.

TABLE 3

Comparison of accuracy for SGD and Chekosky.

|  | MNIST | Gisette | Arcene |
|---|---|---|---|
| Chekosky | 92.02% | 96.7% | 87% |
| SGD | 91.95% | 96.5% | 86% |

3. Comparison with Prior Work

As mentioned herein, privacy preserving linear regression was also considered by [37] (NWI[+] 13) and [21] (GSB[+] 16) in a similar two-server setting. Instead of using the SGD method, these two papers propose to calculate the optimum by solving a linear system we described in Section II-A. We first show that the model trained by the SGD method can reach the same accuracy in Table 3, using the MNIST, Gisette and Arcene datasets for this experiment.

The protocols in NWI[+] 13 and GSB[+] 16 can be decomposed into two steps. In the first step, the d×d matrix $X^T X$ is constructed securely, which defines a linear system. In the second step, the Cholesky algorithm or its variants are implemented using a garbled circuit. In NWI[+]13, the first step is implemented using LHE. Each client needs to encrypt a d×d matrix, which we implemented using Paillier's encryption [38] with batching, similar to NWI[+]13.

In GSB[+] 16, the first step is computed using multiplication triplets generated by the CSP, which is faster than NWI[+] 13. However, now the clients cannot collude with the CSP. Using garbled circuits, NWI[+] 13 implements the Cholesky algorithm while GSB[+] 16 implements an approximation algorithm called CGD. As the codes for these implementations are not available, we use the numbers reported in [21, Table 1, FIG. 6] which only include the computation time. For the first step in GSB[+] 16, we use the result for two clients only, which is the fastest: for the second step in GSB[+] 16, we use the result for CGD with 15 iterations. We sum up the running time of our offline and online phase, and sum up the running time of the first and the second step in NWI[+] 13 and GSB[+] 16, and report the total running time of all parties in all the schemes.

In FIG. 11A, we compare the performance of the scheme in NWI[+] 13 and present techniques with OT-based and LHE-based multiplication triplets generation, executed in both LAN and WAN settings. As shown in FIG. 11A, the performance is improved significantly. For example, when n=100,000 and d=500, even our LHE-based protocol in both LAN and WAN settings has a 54× speedup. The OT-based protocol is 1270× faster in the LAN setting and 24× faster in the WAN setting. We could not execute the first step of NWI[+] 13 for n≥10,000, and the dotted line in FIG. 11A is our extrapolation.

In FIG. 11B, we further compare the performance of the scheme in GSB[+] 16 and an embodiment with client-generated multiplication triplets, as they are both secure under the assumption that servers and clients do not collude. As shown in FIG. 11B, when n=100,000 and d=500, our scheme has a 31×speedup in WAN setting and a 1110×speedup in LAN setting. As FIG. 11B is in log-log scale, the larger slope of the growth of the running time for our schemes does not mean we will be slower eventually with large enough n. It means that the relative speedup is decreasing, but, in fact, the absolute difference between the running time of our scheme and GSB[+] 16 keeps increasing.

The reason why the cost of NWI[+] 13 and GSB[+] 16 are so high when n is small is that the size of the garbled circuit to solve the linear system only depends on d. Even if there is only 1 data sample, the time of the second step for d=500 is around 90,000 seconds in NWI[+] 13 and 30,000 seconds in GSB[+] 16.

Note that the gap between our scheme and prior work will become even larger as d increases, as the running time is linear in d in our schemes and quadratic or cubic in the two prior schemes. In addition, all the numbers reported for the two prior techniques only include the computation time. Indeed, the garbled circuit introduces a huge communication and storage overhead. As reported in [21, FIG. 4], the garbled circuits for d=500 in both schemes have more than $10^{11}$ gates, which is at least 3000 GB. The communication time to transfer such a huge circuit would be at least 3000 seconds on a LAN network, and 33,0000 seconds on a WAN network. We do not incorporate this in the figures, while the performance of our schemes already include the communication and interaction time.

Finally, NWI[+] 13 only supports horizontally partitioned data, where each client holds one or multiple rows of the data matrix; GSB16 only supports vertically partitioned data with 2~5 clients, where each client holds one entire column of the data. Embodiments can support arbitrary partitioning of the data. Besides, the offline phase of our protocols is data independent. The servers and the clients can start the offline phase with basic knowledge on the bounds of the dataset size, while the bulk of the computation in the two prior techniques need to be performed after obtaining the data.

C. Experiments for Logistic Regression

In this section, we review experimental results for our privacy preserving logistic regression protocol. Since this protocol does not require any additional multiplication triplets, the offline has the exact same cost as linear regression.

As shown in FIGS. 12A-12D, the plaintext training for logistic regression is almost as fast as linear regression while our privacy-preserving training introduces some overhead. Specifically, in FIG. 12A, when n=1,000,000 and d=−784, our protocol 1 using OT-based or LHE-based multiplication triplets takes 149.7 seconds, while the privacy-preserving linear regression only took 22.3 seconds as shown in FIG. 9A. This overhead is introduced purely by the extra garbled circuit to compute our logistic function. The fact that a small additional garbled circuit introduces a 7×overhead, serves as evidence that the running time would be much larger if the whole training was implemented in garbled circuits.

Our protocol 2 (using client-generated multiplication triplets) takes 180.7 seconds as no extra multiplication triplet is used in logistic regression and the garbled circuit is an additive overhead, no matter which type of multiplication triplet is used. Despite this overhead, the training time is still comparable with the plaintext training. The plaintext logistic regression takes 47.8 seconds when implemented in Tensor-Flow, and takes 11.2 seconds when implemented in C++. The training time grows linearly with both n and d, as presented in FIGS. 12A and 12B.

Figure 12:
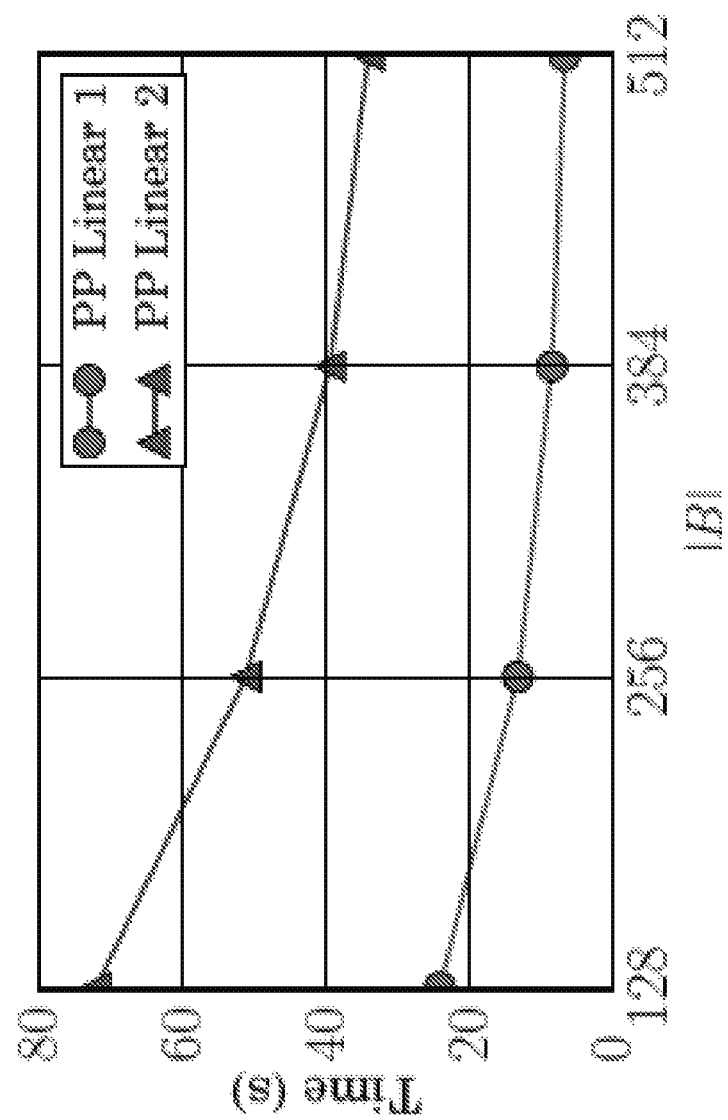
FIG. 12 shows the performance of privacy preserving linear regression on WAN with different mini-batch sizes (n=10,000, d=784) according to embodiments of the present invention.
Figure 15:
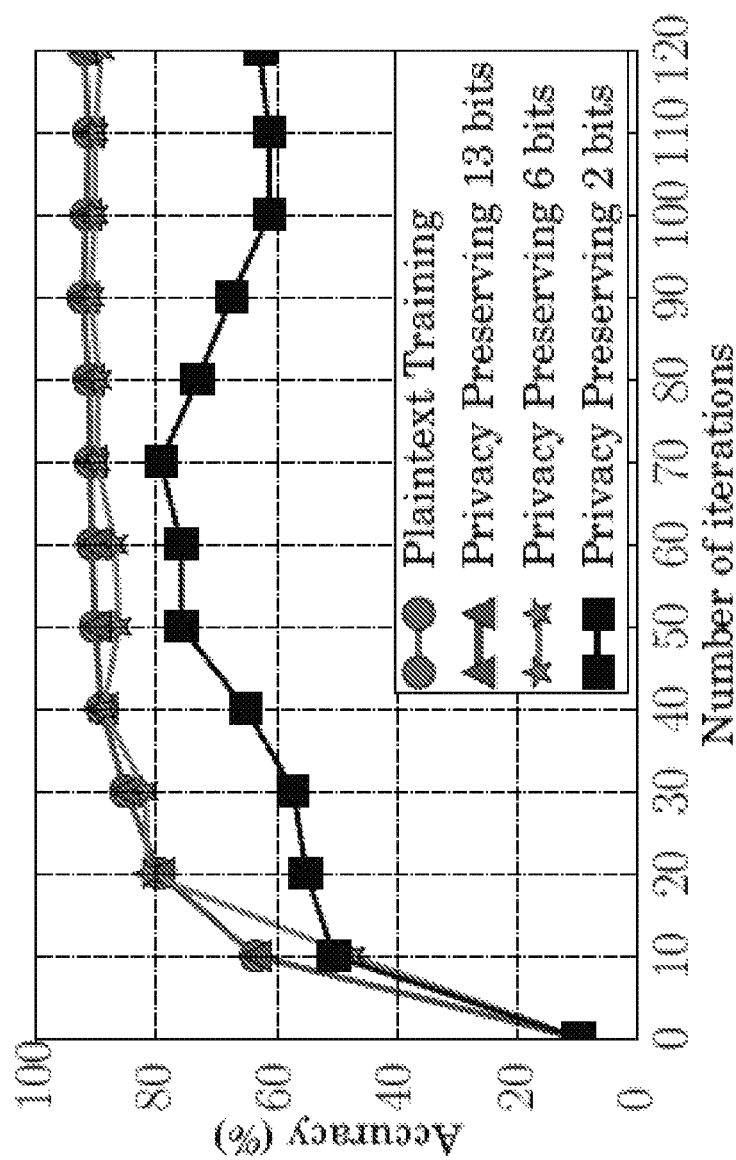
FIG. 15 shows a comparison of accuracy of privacy preserving linear regression with truncation and plaintext training on decimal numbers.
Figure 16:
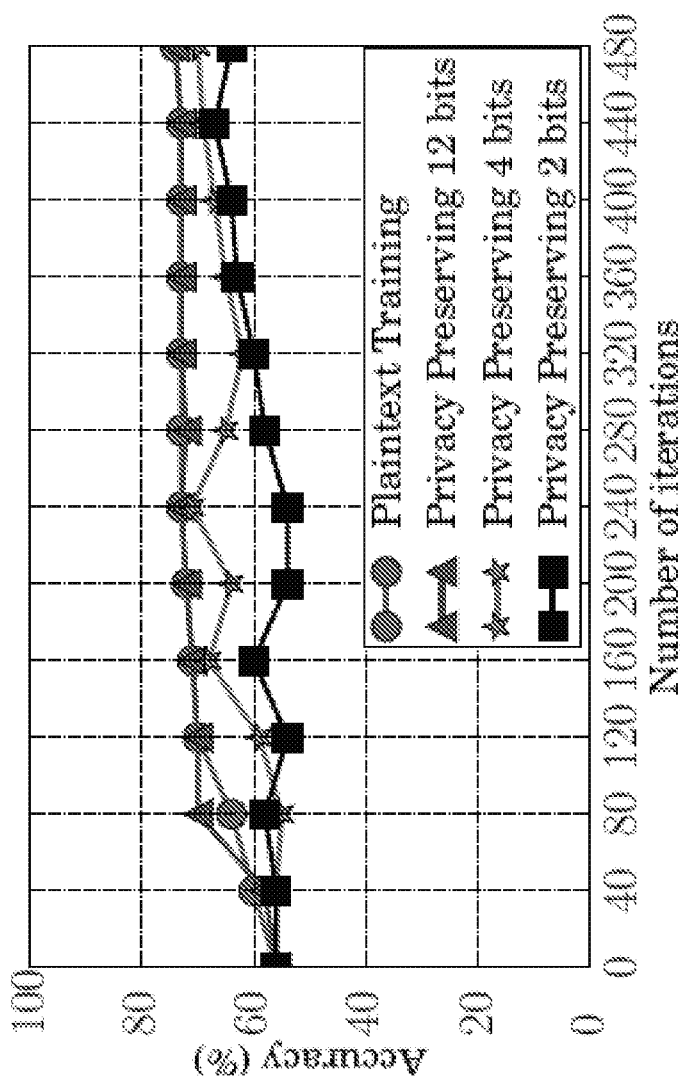
FIG. 16 shows a comparison of accuracy between privacy preserving linear regression with truncation and plaintext training on decimal numbers, on the Arcene dataset. |B|=32.

FIGS. 12C and 12D show the results on a WAN network. The time spent on the interactions is still the dominating factor. When n=100,000 and d=784, it takes around 6,623 seconds for our first protocol, and 10,213 seconds for the second protocol. Compared to privacy-preserving linear regression, one extra interaction and extra communication for the garbled circuit is added per iteration. We can also increase the mini-batch size |B| to balance the computation and interactions and improve the performance.

To further show the scalability of example systems, we run the privacy-preserving logistic regression on the Gisette dataset with 5,000 features and up to 1,000,000 samples on a LAN network, and the result is summarized in Table 4.

TABLE 4

Performance on the Gisette dataset in the LAN setting.
n = 1,000,000, d = 5000.

| Privacy Preserving | | | Plaintext | | |
|---|---|---|---|---|---|
| Protocol 1 | Protocol 2 | Accuracy | TensorFlow | C++ | Accuracy |
| .9 s | 623.5 s | 97.9% | 175.2 s | 71.2 s | 97.9% |

D. Experiments for Neural Networks

We also implemented a privacy-preserving protocol for training an example neural network on the MNIST dataset. The neural network has two hidden layers with 128 neurons in each layer. We experiment with both the RELU and the square function as the activation function in the hidden layers, and our proposed alternative to softmax function in the output layer. The neural network is fully connected, and the cost function is the cross entropy function. The labels are represented as hot vectors with 10 elements, where the element indexed by the digit is set to 1 while others are 0s. We run our system on a LAN network and the performance is summarized in Table 5. |B| is set to 128 and the training converges after 15 epochs.

TABLE 5

Performance of privacy preserving neural networks training on
MNIST in LAN setting. n = 60,000, d = 784.

| | Protocol 1 | | Protocol 2 | |
|---|---|---|---|---|
| | OT-based offline | Online | Offline | Online |
| RELU | 290,000 s | 4239.7 s | 14951.2 s | 10332.3 s |
| Square | 320,000 s | 653.0 s | 16783.9 s | 4260.3 s |
| Tensorflow | | 198.5 s | | |

As shown in table 5, when RELU function is used, the performance gap between our privacy preserving protocol and the plaintext training increases compared to logistic regression. Namely, the online phase of our first protocol (using OT-based or LHE-based multiplication triplets) takes 4,239.7 seconds, which is 21× slower than the plaintext training implemented in Tensorflow. The reason is that we cannot take advantage of vectorization techniques to the same extent. Taking the first layer as an example, there are 128 neurons and the coefficients for this layer are represented as a 785×128 matrix. When multiplying the data with these coefficients, because of efficient matrix multiplication algorithms, the running time for this step in the neural network is only about 12× slower than multiplying with a 785×1 column vector, though the dimension grows by 128×. The effect of this optimization is that the running time of the plaintext training grows sublinearly with the size of the neural network. We also benefit from such optimizations using the Eigen library. However, the garbled circuit costs grow exactly linearly. For example, after the multiplication, we end up with a |B|×128 matrix and need to compute the RELU function on each element of the matrix, hence needing exactly |B|×128 garbled circuits. Because of this, 98.6% of the time is spent on garbled circuits and OTs, while recall that only 85% is for garbled circuits in privacy-preserving logistic regression.

Similarly, the OT-based offline phase, and both the online and the offline phase for our second protocol (using client-generated multiplication triplets) grow linearly with the size of the neural network, as they cannot benefit from vectorization to the same extent.

When the square function is used, the performance of the online phase is improved significantly, as most of the garbled circuits are replaced by multiplications on secret-shared values. In particular, it only takes 653.0 seconds for the online phase of our first protocol, which is only 3.3× slower than TensorFlow. However, the running time of the offline phase is increased, showing a trade-off between the two phases.

In terms of the accuracy, the model trained by TensorFlow can reach 94.5% on all 10 classes, while we can reach 93.4% using RELU and 93.1% using the square function. In practice, there are other types of neural networks that can reach better accuracy. For example, the convolutional neural networks are believed to work better for image processing tasks. In such neural networks, the neurons are not fully connected and the inner product between the data and the coefficients (weights) is replaced by a 2-D convolution. Embodiments can also support such neural networks, as the convolution can be computed using additions and multiplications. However, matching efficiency of plaintext training using techniques, such as Fast Fourier Transform inside secure computation, may be more difficult.

VII. TRUNCATION ERROR

A proof of a small effect of the truncation error is provided, and results for a dataset are provided.

A. Proof of Small Truncation Error

Theorem. In field $Z_{2^l}$, let $x \in [0, 2^{l_x}] \cup [2^l - 2^{l_x}, 2^l]$, where $l > l_x + 1$ and given shares $\langle x \rangle_0$, $\langle x \rangle_1$ of x, let $\langle \lfloor x \rfloor \rangle_0 = \lfloor \langle x \rangle_0 \rfloor$ and $\langle \lfloor x \rfloor \rangle_1 = 2^l - \lfloor 2^l - \langle x \rangle_1 \rfloor$. Then with probability $1 - 2^{l_x+1-l}$, $Rec^A(\langle \lfloor x \rfloor \rangle_0, \langle \lfloor x \rfloor \rangle_1) \in \{\lfloor x \rfloor - 1, \lfloor x \rfloor, \lfloor x \rfloor + 1\}$, where $\lfloor \bullet \rfloor$ denotes truncation by $l_D \leq l_x$ bits.

Proof Let $\langle x \rangle_0 = x + r \mod 2^l$, where r is uniformly random in $Z_{2^l}$, then $\langle x \rangle_1 = 2^l - r$. We decompose r as $r_1 \cdot 2^{l_D} + r_2$, where $0 \leq r_2 < 2^{l_D}$ and $0 \leq r_1 < 2^{l - l_D}$. We prove that if $2^{l_x} \leq r < 2^l - 2^{l_x}$, $Rec^A(\langle \lfloor x \rfloor \rangle_0, \langle \lfloor x \rfloor \rangle_1) \in \{\lfloor x \rfloor - 1, \lfloor x \rfloor, \lfloor x \rfloor + 1\}$. Consider the following two cases.

Case 1: If $0 \leq x \leq 2^{l_x}$, then $0 < x + r < 2^l$ and $\langle x \rangle_0 = x + r$, without modulo. Let $x = x_1 \cdot 2^{l_D} + x_2$, where $0 \leq x_2 < 2^{l_D}$ and $0 \leq x_1 < 2^{l_x - l_D}$. Then we have $x + r = (x_1 + r_1) \cdot 2^{l_D} + (x_2 + r_2) = (x_1 + r_1 + c) \cdot 2^{l_D} + (x_2 + r_2 - c \cdot 2^{l_D})$, where the carry bit $c = 0$ if $x_2 + r_2 < 2^{l_D}$ and $c = 1$ otherwise. After the truncation, $\langle \lfloor x \rfloor \rangle_0 = \lfloor x + r \rfloor = x_1 + r_1 + c$ and $\langle \lfloor x \rfloor \rangle_1 = 2^l - r_1$. Therefore, $Rec^A(\langle \lfloor x \rfloor \rangle_0, \langle \lfloor x \rfloor \rangle_1) = x_1 + c = \lfloor x \rfloor + c$.

Case 2: If $2^l - 2^{l_x} \leq x < 2^l$, then $x + r \geq 2^l$ and $\langle x \rangle_0 = x + r - 2^l$. Let $x = 2^l - x_1 \cdot 2^{l_D} - x_2$, where $0 \leq x_2 < 2^{l_D}$ and $0 \leq x_1 < 2^{l_x - l_D}$. We have $x + r - 2^l = (r_1 - x_1) \cdot 2^{l_D} + (r_2 - x_2) = (r_1 - x_1 - c) \cdot 2^{l_D} + (r_2 - x_2 + c \cdot 2^{l_D})$, where the carry bit $c = 0$ if $r_2 > x_2$ and $c = 1$ otherwise. After the truncation, $\langle \lfloor x \rfloor \rangle_0 = \lfloor x + r - 2^l \rfloor = r_1 - x_1 - c$ and $\langle \lfloor x \rfloor \rangle_1 = 2^l - r_1$. Therefore, $Rec^A(\langle \lfloor x \rfloor \rangle_0, \langle \lfloor x \rfloor \rangle_1) = 2^l - x_1 - c = \lfloor x \rfloor - c$.

Finally, the probability that our assumption holds, i.e. the probability of a random r being in the range $(2^{l_x}, 2^l - 2^{l_x})$ is $1 - 2^{l_x + 1 - l}$.

The above theorem can be extended to a prime field Z in a natural way by replacing $2^l$ with p in the proof. We also note that the truncation does not affect security of the secret sharing as the shares are truncated independently by each party without any interaction.

B. Effect of Truncation for MNIST and Arcene Dataset

We run our privacy preserving linear regression protocol with the truncation technique on the MNIST dataset [6] consisting of images of handwriting digits and compare accuracy of the trained model to plaintext training with standard decimal numbers operations. The mini-batch size is set to |B|=128, and the learning rate is $\alpha = 2^{-7}$. The input data has 784 features, each a gray scale of a pixel scaled between 0 and 1, represented using 8 decimal bits. We set the field to $Z_{2^{64}}$. For a fair comparison, coefficients are all initialized to 0s and the same sequence of the mini-batch indices are used for all trainings. To simplify the task, we change the labels to be 0 for digit "0'" and 1 for non-zero digits.

In FIG. 13, the x-axis is the number of iterations of the SGD algorithm, and the y-axis is the accuracy of the trained model on the testing dataset. Here, we reconstruct the coefficient vector after every iteration in our protocol to test the accuracy. As shown in FIG. 13, when we use 13 bits for the fractional part of w, the privacy preserving training behaves almost exactly the same as the plaintext training. This is because we only introduce a small error on the 13th bit of the decimal part of w. Our experiments never triggered the failure condition in theorem 1.

However, when we use 6 bits for the decimal part of w, the accuracy of our protocol oscillates during the training. This is because now the error is on the 6th bit, which has a larger effect and may push the model away from the optimum. When the distance to the optimum is large enough, the SGD will move back towards the optimum again. Finally, when we use 2 bits for the fractional part, the oscillating behavior is more extreme.

We observe a similar effect when training on another dataset called Arcene [1] as shown in FIG. 14. In other words, when sufficient bits are used to represent the fractional part of the coefficients, our new approach for fixed-point multiplication of shared decimal numbers has little impact on accuracy of the trained model.

VIII. PROOF OF SECURITY FOR PRIVACY PRESERVING LINEAR REGRESSION

We repeat the theorem of security for privacy preserving linear regression here and provide a proof sketch. Theorem 2 considers a protocol where clients distribute arithmetic shares of their data among two servers who run the protocol of FIG. 5 and send the output to clients. In the $F_{offline}$ hybrid model, this protocol realizes the ideal functionality $F_{ml}$ for the linear regression function, in presence of a semi-honest admissible adversary mentioned in section I-C.

An admissible adversary in our model can corrupt one server and any subset of the clients. Given that the protocol is symmetric with respect to the two servers, we simply need to consider the scenario where the adversary corrupts $S_0$ and all but one of the clients, i.e. $C_1, \ldots, C_{m-1}$.

We describe a simulator S that simulates the above adversary in the ideal world. S submits the corrupted clients' inputs data to the functionality and receives the final output of the linear regression, i.e., the final value of the coefficients w back.

S then runs A (the adversary). On behalf of the honest client(s), S sends a random share in $Z_{2^l}$ to A for each value being held by that client. This is the only message where clients are involved. A remainder of the protocol can generate random matrices and vectors corresponding to the honest server s shares of $\langle X \rangle$, $\langle Y \rangle$, $\langle U \rangle$, $\langle V \rangle$, $\langle Z \rangle$, $\langle V' \rangle$, $\langle Z' \rangle$, and play the role of the honest server in interactions with A using those randomly generated values.

In a last step where w is to be recovered, S adjusts the honest servers' share of w such that the recovered value is indeed the coefficient vector it received from the functionality. This concludes the simulation.

We briefly argue that the A's view in the real and ideal worlds (and as a result, the environment's view in the two worlds) is indistinguishable. This immediately follows from the security of the arithmetic secret sharing and the fact that the matrices/vectors generated in the offline phase are indeed random. In particular, all messages sent and received and reconstructed in the protocol (with the exception of w) are generated using uniformly random shares in both the real protocol and the simulation described above, so indeed the view are both identically distributed.

We note that this argument implicitly explains why using one mask matrix U is sufficient to hide the data matrix X. The reason is that the adversary only gets to see the masked value once in the first interaction, and the rest of the computation on X takes place without interactions between the honest and the corrupted server.

IX. COMPUTER SYSTEM

Any of the computer systems mentioned herein may utilize any suitable number of subsystems. In some embodiments, a computer system includes a single computer apparatus, where the subsystems can be the components of the computer apparatus. In other embodiments, a computer system can include multiple computer apparatuses, each being a subsystem, with internal components. A computer system can include desktop and laptop computers, tablets, mobile phones and other mobile devices.

The subsystems may be interconnected via a system bus. Additional subsystems can include a printer, keyboard, storage device(s), monitor, which can be coupled to display adapter. Peripherals and input/output (I/O) devices, which couple to I/O controller, can be connected to the computer system by any number of means known in the art such as input/output (I/O) port (e.g., USB, FireWire*). For example, an I/O port or external interface (e.g. Ethernet. Wi-Fi, etc.) can be used to connect the computer system to a wide area network such as the Internet, a mouse input device, or a scanner. The interconnection via system bus can allow the central processor to communicate with each subsystem and to control the execution of a plurality of instructions from system memory or the storage device(s) (e.g., a fixed disk, such as a hard drive, or optical disk), as well as the exchange of information between subsystems. The system memory and/or the storage device(s) may embody a computer readable medium. Another subsystem is a data collection device, such as a camera, microphone, accelerometer, and the like. Any of the data mentioned herein can be output from one component to another component and can be output to the user.

A computer system can include a plurality of the same components or subsystems, e.g., connected together by external interface, by an internal interface, or via removable storage devices that can be connected and removed from one component to another component. In some embodiments, computer systems, subsystem, or apparatuses can communicate over a network. In such instances, one computer can be considered a client and another computer a server, where each can be part of a same computer system. A client and a server can each include multiple systems, subsystems, or components.

Aspects of embodiments can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, units, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of example embodiments of the invention has been presented for the purposes of illustration and description. It is not intended to be exhaustive or to limit the invention to the precise form described, and many modifications and variations are possible in light of the teaching above.

A recitation of "a", "an" or "the" is intended to mean "one or more" unless specifically indicated to the contrary. The use of "or" is intended to mean an "inclusive or," and not an "exclusive or" unless specifically indicated to the contrary. Reference to a "first" component does not necessarily require that a second component be provided. Moreover reference to a "first" or a "second" component does not limit the referenced component to a particular location unless expressly stated. The term "based on" is intended to mean "based at least in part on."

All patents, patent applications, publications, and descriptions mentioned herein are incorporated by reference in their entirety for all purposes. None is admitted to be prior art.

X. REFERENCES

[1] Arcene data set. https://archive.ics.uci.edu/ml/datasets/Arcene. Accessed: 2016 Jul. 14.
[2] Eigen library. http://eigen.tuxfamily.org/.
[3] EMP toolkit. https://github.com/emp-toolkit.
[4] Gisette data set. https://archive.ics.uci.edu/ml/datasets/Gisette. Accessed: 2016 Jul. 14.
[5] GMP library. https://gmplib.org/.
[6] MNIST database. http://yann.lecun.com/exdb/mnist/. Accessed: 2016 Jul. 14.
[7] NTL library. http://www.shoup.net/ntl/.
[8] Tensorflow. https://www.tensorflow.org/.
[9] ABADI, M. et al., *In Proceedings of the* 2016 *ACM SIGSAC Conference on Computer and Communications Security* (2016), ACM, pp. 308-318.
[10] AONO, Y. et al., *In Proceedings of the Sixth ACM Conference on Data and Application Security and Privacy* (2016), ACM, pp. 142-144.
[11] ASHAROV, G. et al., *In Proceedings of the ACM CCS* 2013 (2013).
[12] BELLARE, M. et al., *In Security and Privacy* (*SP*), 2013 *IEEE Symposium on* (2013), IEEE, pp. 478-492.
[13] BELLARE, M. et al., *In Proceedings of the* 2012 *ACM conference on Computer and communications security* (2012), ACM, pp. 784-796.
[14] BUNN, P., AND OSTROVSKY, R., *In Proceedings of the* 14*th ACM conference on Computer and communications security* (2007). ACM, pp. 486-497.
[15] CANETTI, R., *In Foundations of Computer Science,* 2001. *Proceedings.* 42*nd IEEE Symposium on* (2001), IEEE, pp. 136-145.
[16] CHAUDHURI, K., AND MONTELEONI, C., *In Advances in Neural Information Processing Systems* (2009), pp. 289-296.
[17] DAMGARD, I., GEISLER, M., AND KROIGARD, M., *International Journal of Applied Cryptography,* 1, 1 (2008), 22-31.
[18] DEMMLER, D., SCHNEIDER. T., AND ZOHNER. M., *In NDSS* (2015).
[19] DU, W., AND ATALLAH, M. J., *In csfw* (2001), vol. 1, Citeseer, p. 273.
[20] DU, W., HAN, Y. S., AND CHEN, *In SDM* (2004), vol. 4, SIAM, pp. 222-233.
[21] GASCON, A. et al., Secure linear regression on vertically partitioned datasets.
[22] GILAD-BACHRACH, R. et al., *In Proceedings of The* 33*rd International Conference on Machine Learning* (2016), pp. 201-210.
[23] GILAD-BACHRACH, R. et al., *Secure data exchange: A marketplace in the cloud. Cryptology ePrint Archive,* Report 2016/620, 2016. http://eprint.iacr.org/2016/620.
[24] GILAD-BACHRACH, R. et al., *Secure data exchange: A marketplace in the cloud.*
[25] GUYON, I. et al., *In Advances in neural information processing systems* (2004), pp. 545-552.
[26] HASTIE, T., TIBSHIRANI, R., AND FRIEDMAN, J. The elements of statistical learning—data mining, inference, and prediction.

[27] ISHAI, Y. et al., *Advances in Cryptology-CRYPTO 2003* (2003), 145-161.
[28] JAGANNATHAN, G., AND WRIGHT, R. N., *In Proceedings of the eleventh ACM SIGKDD international conference on Knowledge discovery in data mining* (2005), ACM, pp. 593-599.
[29] KAMARA, S., MOHASSEL, P., AND RAYKOVA, M., *IACR Cryptology ePrint Archive* (2011), 272.
[30] KOLESNIKOV, V., AND SCHNEIDER, T., *In International Colloquium on Automata. Languages, and Programming* (2008). Springer, pp. 486-498.
[31] LINDELL. Y., AND PINKAS. B., *In Annual International Cryptology Conference* (2000), Springer, pp. 36-54.
[32] LINDELL, Y., AND PINKAS, B., *Journal of Cryptology* 22, 2 (2009), 161-188.
[33] LIVNI, R., SHALEV-SHWARTZ, S., AND SHAMIR. O., *In Advances in Neural Information Processing Systems* (2014), pp. 855-863.
[34] MALKHI, D. et al., Fairplaysecure two-party computation system.
[35] NAYAK. K. et al., In 2015 *IEEE Symposium on Security and Privacy* (2015), IEEE, pp. 377-394.
[36] NIKOLAENKO, V. et al., *In Proceedings of the 2013 ACM SIGSAC conference on Computer & communications security* (2013), ACM. pp. 801-812.
[37] NIKOLAENKO, V. et al., *In Security and Privacy (SP)*, 2013 *IEEE Symposium on* (2013), IEEE, pp. 334-348.
[38] PAILLIER, P., *In International Conference on the Theory and Applications of Cryptographic Techniques* (1999), Springer, pp. 223-238.
[39] PEIKERT, C., VAIKUNTANATHAN. V., AND WATERS, B., *Advances in Cryptology-CRYPTO 2008* (2008), 554-571.
[40] SANIL, A. P. et al., *In Proceedings of the tenth ACM SIGKDD international conference on Knowledge discovery and data mining* (2004), ACM. pp. 677-682.
[41] SHOKRI, R., AND SHMATIKOV, V., *In Proceedings of the 22nd ACM SIGSAC Conference on Computer and Communications Security* (2015), ACM, pp. 1310-1321.
[42] SLAVKOVIC, A. B., NARDI, Y., AND TIBBITS, M. M., *In Seventh IEEE International Conference on Data Mining Workshops (ICDMW 2007)* (2007), IEEE, pp. 723-728.
[43] SONG, S., CHAUDHURI, K., AND SARWATE, A. D., *In Global Conference on Signal and Information Processing (GlobalSIP)*, 2013 *IEEE* (2013), IEEE, pp. 245-248.
[44] VAIDYA. J., YU, H., AND JIANG, X., *Knowledge and Information Systems*, 14, 2 (2008), 161-178.
[45] WANG, X., MALOZEMOFF, A. J., AND KATZ, Cryptology ePrint Archive. Report 2016/762, 2016. http://eprint.iacr.org/2016/762.
[46] WU. S. et al., *The 27th Annual Conference of the Japanese Society for Artificial Intelligence.* 27 (2013), 1-4.
[47] YAO, A. C, *In Foundations of Computer Science.* 1982. *SFCS '08. 23rd Annual Symposium on* (1982), IEEE, pp. 160-164.
[48] YU, H., VAIDYA, J., AND JIANG, X., *In Pacific-Asia Conference on Knowledge Discovery and Data Mining* (2006), Springer, pp. 647-656.

What is claimed is:

1. A method of performing privacy-preserving machine learning, the method comprising:
   storing, at K training computers, secret-shared private data from a plurality of data clients, K being equal to two or more, wherein each data item of the secret-shared private data is represented by K parts when secret-shared, and wherein the secret-shared private data includes a set of training samples, each having d features and an output Y;
   initializing values for a set of d weights for a machine learning model, the weights being secret-shared among the K training computers, wherein the weights and the features are stored as integers;
   identifying a cost function that provides an accuracy of the set of d weights in predicting the outputs Y of the set of training samples;
   selecting a training sample;
   at each of the K training computers:
     computing an error term of the cost function with respect to a Jth weight to determine a Jth delta part, wherein computing the error term includes:
       performing a first multiplication using d feature parts of the selected training sample and d weight parts in determining a forward part, the forward parts comprising a secret-shared forward propagation result from a product of the d features and the d weights, the first multiplication using a first multiplication triplet of random integers;
     truncating the Jth delta part;
     using the truncated Jth delta part to update a Jth weight part of the d weight parts;
   repeating for other training samples and other weights of the d weights to train the machine learning model.

2. The method of claim 1, wherein at least some of the d features are decimal values that are shifted to generate integers.

3. The method of claim 1, further comprising:
   receiving a new sample having d features;
   applying, by each of the K training computers, weights parts of the machine learning model to obtain output parts; and
   reconstructing, by the K training computers, the output parts to obtain a predicted output for the new sample.

4. The method of claim 1, wherein the machine learning model includes more weights than the set of d weights.

5. The method of claim 1, wherein determining the Jth delta part further includes:
   determining a difference part as part of the error term using the forward part and an output Y part, the difference parts comprising a secret-shared difference; and
   performing a second multiplication of the difference part and a Jth feature part of a Jth feature to obtain a Jth delta part, the second multiplication using a second multiplication triplet of random integers.

6. The method of claim 5, further comprising:
   truncating the difference part before the second multiplication.

7. The method of claim 5, wherein the second multiplication includes multiplying the difference part by each of the d feature parts to obtain d delta parts of a delta part vector, the method further comprising:
   truncating the d delta parts; and
   using the truncated delta parts to update the d weight parts.

8. The method of claim 7, wherein the training sample is selected as part of a batch of B training samples that is selected randomly, wherein the first multiplication uses a matrix X of B×d dimensions and an output Y vector of B outputs to form a forward part vector, and wherein the second multiplication uses the matrix X and a difference part vector of length d to form the delta part vector.

9. The method of claim 8, further comprising:
generating multiplication triplets as matrices using linearly homomorphic encryption (LHE) or oblivious transfer (OT), and wherein the first multiplication triplet and the second multiplication triplet share a matrix.

10. The method of claim 8, wherein using the truncated Jth delta part to update the Jth weight part of the d weight parts includes using a learning step of $\alpha/|B|$.

11. The method of claim 1, further comprising:
reconstructing the d weights using the d weight parts at each of the K training computers.

12. A method of performing privacy-preserving machine learning, the method comprising:
storing, at K training computers, secret-shared private data from a plurality of data clients, K being equal to two or more, wherein each data item of the secret-shared private data is represented by K parts when secret-shared, and wherein the secret-shared private data includes a set of training samples, each having d features X and an output Y;
initializing values for a set of d weights W for a machine learning model, the weights being secret-shared among the K training computers, wherein the weights and the features are decimal values that are shifted and stored as integers;
selecting a training sample I having d features $X_I$;
performing, using the K training computers, a first multiplication using $X_I$ and W to obtain a multiplication result u;
using a garbled circuit to evaluate, using the K training computers, a function F of the multiplication result u to obtain a forward propagation result $Y_I^*$, where the Function F is:
a first constant when u is less than a first cutoff,
a second constant when u is greater than a second cutoff, and
a monotonically changing function between the first constant and the second constant when u is between the first cutoff and the second cutoff;
determining, using the K training computers, an error term D using $Y_I^*$ and an output $Y_I$ of the selected training sample;
performing, using the K training computers, a second multiplication of the error term D and a Jth element $X_{I,J}$ of $X_I$ to obtain a Jth delta $\Delta_J$;
using the delta $\Delta_J$ to update $W_J$; and
repeating for other training samples and other weights of the d weights to train the machine learning model.

13. The method of claim 12, wherein the training sample I is selected as part of a batch of B training samples that is selected randomly, wherein the first multiplication uses a matrix X of B×d dimensions and an output Y vector of B outputs, wherein the error term D is a vector of B values, and wherein the second multiplication uses the matrix X and the error term D to form a delta vector $\Delta$ for updating the d weights.

14. The method of claim 12, wherein using the garbled circuit to evaluate a function F of the forward propagation result $Y_I^*$ includes:
determining whether $Y_I^*$ is less than the first cutoff by:
receiving $Y_I^*$ parts with one part added to the first constant;
adding the $Y_I^*$ parts to obtain a first result;
determining that $Y_I^*$ is less than the first cutoff when the most significant bit of the first result is 0.

15. The method of claim 14, wherein using the garbled circuit to evaluate a function F of the forward propagation result $Y_I^*$ includes:
determining whether $Y_I^*$ is less than the second cutoff by:
receiving $Y_I^*$ parts with the first constant subtracted from one part;
adding the $Y_I^*$ parts to obtain a second result;
determining that $Y_I^*$ is greater than the second cutoff when the most significant bit of the second result is 1.

16. The method of claim 15, wherein the garbled circuit outputs values based on:
$b_1$=the most significant bit of the first result, and
$b_2$=the most significant bit of the second result, and
wherein F includes $(\neg b_2)+(b_2 \wedge (\neg b_1))Y_I^*$.

17. The method of claim 16, wherein the monotonically changing function is linear, where F include a constant C as a vertical intercept, and wherein F is provided as $(\neg b_2)+(b_2 \wedge (\neg b_1))Y_I^*+C$.

18. The method of claim 16, wherein the garbled circuit outputs $(\neg b_2)$ and $(b_2 \wedge (\neg b_1))$, and wherein F is evaluated using oblivious transfer.

19. A method of performing privacy-preserving machine learning, the method comprising:
storing, at K training computers, secret-shared private data from a plurality of data clients, K being equal to two or more, wherein each data item of the secret-shared private data is represented by K parts when secret-shared, and wherein the secret-shared private data includes a set of training samples, each having d features X and an output Y;
initializing values for M sets of d weights W for a machine learning model, each set of d weights W corresponding to one of M nodes of a layer of the machine learning model, the weights being secret-shared among the K training computers, wherein the weights and the features are decimal values that are shifted and stored as integers;
selecting a training sample I having d features $X_I$;
performing, using the K training computers, a first multiplication using $X_I$ and W to obtain a multiplication result $u_L$ corresponding to a Lth node of M nodes of the machine learning model;
using a garbled circuit to evaluate, using the K training computers, a function F of multiplication result $u_L$ to obtain a forward propagation result $Y_{I,L}^*$, where the Function F is a ratio of:
a numerator function that is a first constant when $u_L$ exceeds a cutoff value C in one direction and is a monotonically changing function when $u_L$ exceeds the cutoff value C in the opposite direction; and
a denominator function that is a sum of all of the numerator functions of the M nodes;
determining, using the K training computers, an error term D using $Y_{I,L}^*$ and an output $Y_I$ of the selected training sample;
performing, using the K training computers, a second multiplication of the error term D and a Jth element $X_{I,J}$ of $X_I$ to obtain a Jth delta $\Delta_J$;
using the delta $\Delta_J$ to update $W_J$; and
repeating for other training samples and other weights of the d weights to train the machine learning model.

20. The method of claim 19, wherein the M nodes are of a same layer of a neural network.

* * * * *